United States Patent
Broadus et al.

(10) Patent No.: US 7,687,123 B2
(45) Date of Patent: Mar. 30, 2010

(54) SHRINK FILM CONTAINING SEMI-CRYSTALLINE POLYAMIDE AND PROCESS FOR MAKING SAME

(75) Inventors: Michael E. Broadus, Mauldin, SC (US); Richard M. Dayrit, Simpsonville, SC (US); Brian P. Rivers, Simpsonville, SC (US); Roger D. Vrooman, Greer, SC (US); Marvin R. Havens, Greer, SC (US); Emmet Austin, Greer, SC (US); Frank M. Hofmeister, Simpsonville, SC (US); Matthew D. Dawe, Simpsonville, SC (US); Nathanael R. Miranda, Spartanburg, SC (US); Christopher K. Robinson, Moore, SC (US); Bryan E. Freeman, Enoree, SC (US); Josh E. Johnston, Louisville, KY (US)

(73) Assignee: Cryovac, Inc., Duncan, SC (US)

( * ) Notice: Subject to any disclaimer, the term of this patent is extended or adjusted under 35 U.S.C. 154(b) by 453 days.

(21) Appl. No.: 11/801,902

(22) Filed: May 11, 2007
(Under 37 CFR 1.47)

(65) Prior Publication Data

US 2008/0182053 A1    Jul. 31, 2008

Related U.S. Application Data

(63) Continuation-in-part of application No. 11/699,121, filed on Jan. 29, 2007, and a continuation-in-part of application No. 11/699,154, filed on Jan. 29, 2007, and a continuation-in-part of application No. 11/699,532, filed on Jan. 29, 2007.

(51) Int. Cl.
*B65B 53/00* (2006.01)
*F16B 4/00* (2006.01)

(52) U.S. Cl. ............... 428/34.9; 428/474.4; 428/475.5; 428/36.6; 428/36.7

(58) Field of Classification Search .............. 428/474.4, 428/475.5, 36.6, 36.7, 34.9
See application file for complete search history.

(56) References Cited

U.S. PATENT DOCUMENTS 3,456,044 A    7/1969   Pahlke
(Continued)

FOREIGN PATENT DOCUMENTS

DE    199 16 428    10/2000
(Continued)

OTHER PUBLICATIONS

U.S. Appl. No. 11/084,534, filed Mar. 17, 2005, Bekele.
(Continued)

*Primary Examiner*—Michael C Miggins
(74) *Attorney, Agent, or Firm*—Rupert B. Hurley, Jr.

(57) ABSTRACT

A multilayer, heat-shrinkable film contains at least one semi-crystalline polyamide selected from the group consisting of polyamide 6, polyamide 66, polyamide 6/66, and polyamide 6/12. The film may have a total semi-crystalline polyamide content of at least 35 volume percent, based on total film volume, and a total free shrink at 185° F. of at least 35 percent. The film may have an FTIR Transmission Absorbance $A_{1199}/A_{1170}$ ratio of up to 1.65. The film may be a retortable film, capable of being used in a process for preparing a retorted packaged product. A process for making a heat-shrinkable annular film containing the semi-crystalline polyamide comprises extruding an annular extrudate downward from an annular die, quenching the annular extrudate by applying a quenching liquid to the annular extrudate, reheating the extrudate to an orientation temperature, and orienting the reheated annular extrudate while the reheated annular extrudate is in the solid state, the orientation being carried out with a total orientation factor of at least 2, to produce a film having a total free shrink at 185° F. of at least 10 percent.

35 Claims, 8 Drawing Sheets

U.S. PATENT DOCUMENTS

| | | | |
|---|---|---|---|
| 3,741,253 A | 6/1973 | Brax et al. |
| 4,064,296 A | 12/1977 | Bornstein et al. |
| 4,095,012 A | 6/1978 | Schirmer |
| 4,165,356 A | 8/1979 | Heider |
| 4,278,738 A | 7/1981 | Brax et al. |
| 4,287,151 A | 9/1981 | Esakov et al. |
| 4,379,117 A | 4/1983 | Baird et al. |
| 4,477,407 A | 10/1984 | Hetherington et al. |
| 4,557,780 A | 12/1985 | Newsome et al. |
| 4,589,247 A | 5/1986 | Tsuruta et al. |
| 4,615,922 A | 10/1986 | Newsome et al. |
| 4,687,688 A | 8/1987 | Curie et al. |
| 4,735,855 A | 4/1988 | Wofford et al. |
| 4,762,748 A | 8/1988 | Oberle |
| 4,855,183 A | 8/1989 | Oberle |
| 4,862,675 A | 9/1989 | Curie et al. |
| 4,879,124 A | 11/1989 | Oberle |
| 4,892,765 A | 1/1990 | Hisazumi et al. |
| 4,911,963 A | 3/1990 | Lustig et al. |
| 5,053,259 A | 10/1991 | Vicik |
| 5,213,900 A | 5/1993 | Friedrich |
| 5,232,767 A | 8/1993 | Hisazumi et al. |
| 5,298,326 A | 3/1994 | Norpoth et al. |
| 5,344,679 A | 9/1994 | Vicik |
| 5,443,765 A | 8/1995 | Yoshimura et al. |
| 5,480,945 A | 1/1996 | Vicik |
| 5,534,277 A | 7/1996 | Ramesh |
| 5,549,943 A | 8/1996 | Vicik |
| 5,688,456 A | 11/1997 | Kuriu et al. |
| 5,698,279 A | 12/1997 | Vicik |
| 5,759,648 A | 6/1998 | Idlas |
| 5,843,502 A | 12/1998 | Ramesh |
| 5,914,164 A | 6/1999 | Ciocca et al. |
| 6,068,933 A | 5/2000 | Shepard et al. |
| 6,274,228 B1 | 8/2001 | Ramesh et al. |
| 6,287,613 B1 | 9/2001 | Childress et al. |
| 6,294,264 B1 | 9/2001 | Piper et al. |
| 6,436,495 B1 | 8/2002 | Tsukamoto et al. |
| 6,447,860 B1 | 9/2002 | Mueller et al. |
| 6,500,505 B2 | 12/2002 | Piper et al. |
| 6,500,559 B2 | 12/2002 | Hofmeister et al. |
| 6,562,443 B1 | 5/2003 | Espinel et al. |
| 6,565,985 B2 | 5/2003 | Ueyama et al. |
| 6,581,359 B1 | 6/2003 | Van den Broek |
| 6,586,026 B1 | 7/2003 | Ramesh et al. |
| 6,599,639 B2 | 7/2003 | Dayrit et al. |
| 6,699,549 B1 | 3/2004 | Ueyama et al. |
| 6,764,729 B2 | 7/2004 | Ramesh et al. |
| 6,777,046 B1 | 8/2004 | Tatarka et al. |
| 6,790,468 B1 | 9/2004 | Mize, Jr. et al. |
| 6,815,023 B1 | 11/2004 | Tatarka et al. |
| 6,858,313 B2 | 2/2005 | Musco et al. |
| 6,979,494 B2 | 12/2005 | Berrier et al. |
| 6,984,442 B2 | 1/2006 | Brebion et al. |
| 2003/0139497 A1 | 7/2003 | Odorisio et al. |
| 2004/0173491 A1 | 9/2004 | Buelow et al. |
| 2004/0173932 A1 | 9/2004 | Douglas et al. |
| 2004/0175464 A1 | 9/2004 | Blemberg et al. |
| 2004/0175466 A1 | 9/2004 | Douglas et al. |
| 2004/0175467 A1 | 9/2004 | Mueller et al. |
| 2004/0175491 A1 | 9/2004 | Hagemeyer et al. |
| 2004/0175592 A1 | 9/2004 | Douglas et al. |
| 2005/0069719 A1 | 3/2005 | Blemberg et al. |
| 2005/0118373 A1 | 6/2005 | Blemberg et al. |
| 2005/0244553 A1 | 11/2005 | Schief et al. |
| 2006/0083875 A1 | 4/2006 | Weaver |
| 2006/0188619 A1 | 8/2006 | Vimini et al. |
| 2006/0210743 A1 | 9/2006 | Bekele |
| 2007/0092744 A1 | 4/2007 | Di Tella |
| 2007/0154668 A1 | 7/2007 | Rhee et al. |
| 2008/0095960 A1 | 4/2008 | Schell et al. |

FOREIGN PATENT DOCUMENTS

| | | |
|---|---|---|
| DE | 100 48 178 | 11/2002 |
| EP | 0 358 038 | 3/1990 |
| EP | 0 408 390 | 1/1991 |
| EP | 0 465 931 A2 | 1/1992 |
| EP | 1 060 077 | 6/2003 |
| EP | 1 034 076 B1 | 2/2004 |
| EP | 1 410 902 B1 | 4/2006 |
| WO | 2004/080799 A2 | 9/2004 |
| WO | 2004/080804 A2 | 9/2004 |
| WO | 2004/080805 A3 | 9/2004 |
| WO | 2005/092611 | 10/2005 |
| WO | 2006/063208 | 6/2006 |
| WO | 2006/063283 | 6/2006 |

OTHER PUBLICATIONS

U.S. Appl. No. 11/084,535, filed Mar. 17, 2005, Bekele.
U.S. Appl. No. 11/084,536, filed Mar. 17, 2005, Bekele.
U.S. Appl. No. 11/084,537, filed Mar. 17, 2005, Bekele.
U.S. Appl. No. 11/084,589, filed Mar. 17, 2005, Bekele.
U.S. Appl. No. 11/699,154, filed Jan. 29, 2007, Broadus et al.
U.S. Appl. No. 11/699,121, filed Jan. 29, 2007, Rivers et al.
U.S. Appl. No. 11/699,532, filed Jan. 29, 2007, Broadus et al.
ASTM D 1003-00, "Standard Test Method of Haze and Luminous Transmittance of Transparent Plastics", pp. 1-6, ASTM International, Jul. 2000.
ASTM D 1746-97, "Standard Test Method for Transparency of Plastic Sheeting", pp. 1-4, ASTM International, Apr. 1998.
ASTM D 2457-97, "Standard Test Method for Specular gloss of Plastic Films and Solid Plastics", pp. 1-5, ASTM International, May 1997.
ASTM D 2732, "Standard Test Method for Unrestrained Linear Thermal Shrinkage of Plastic Film and Sheeting", pp. 368-391, 1990.
N. Vasanthan and D.R. Salem, "Infrared Spectroscopic Characterization of Oriented Polyamide 66: Band Assignment and Crystallinity Measurement", *Journal of Polymer Science*: Part B: Polymer Physics, vol. 38, 516-524 (2000).
M.I. Kohan, *Nylon Plastics Handbook*, Chapter 4, Characterization, section 4.4 Infrared and Raman Spectroscopy, Table 4.6.
Before Applicants' filing date, a non-heat-shrinkable multilayer film has been made in a commercial process that uses cascading water to quench a multilayer, polyamide-containing annular extrudate, with the water contacting the extrudate at a distance from 5 to 12 inches downstream of the annular die.
Broadus et al PCT/US2008/001122: PCT International Search Report, 4 pages, Jun. 2008.
Broadus et al PCT/US2008/001122: PCT Written Opinion of the International Searching Authority, 6 pages.
Office Action mailed Oct. 2, 2009 in U.S. Appl. No. 11/699,154 (13 pages).
Office Action mailed Nov. 28, 2008 in U.S. Appl. No. 11/699,154 (16 pages).
Office Action mailed Apr. 23, 2009 in U.S. Appl. No. 11/699,532 (16 pages).
Office Action mailed Dec. 1, 2008 in U.S. Appl. No. 11/699,121 (17 pages).

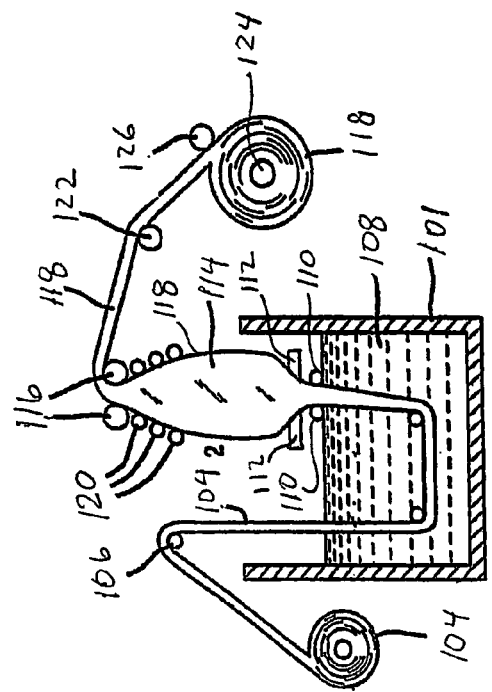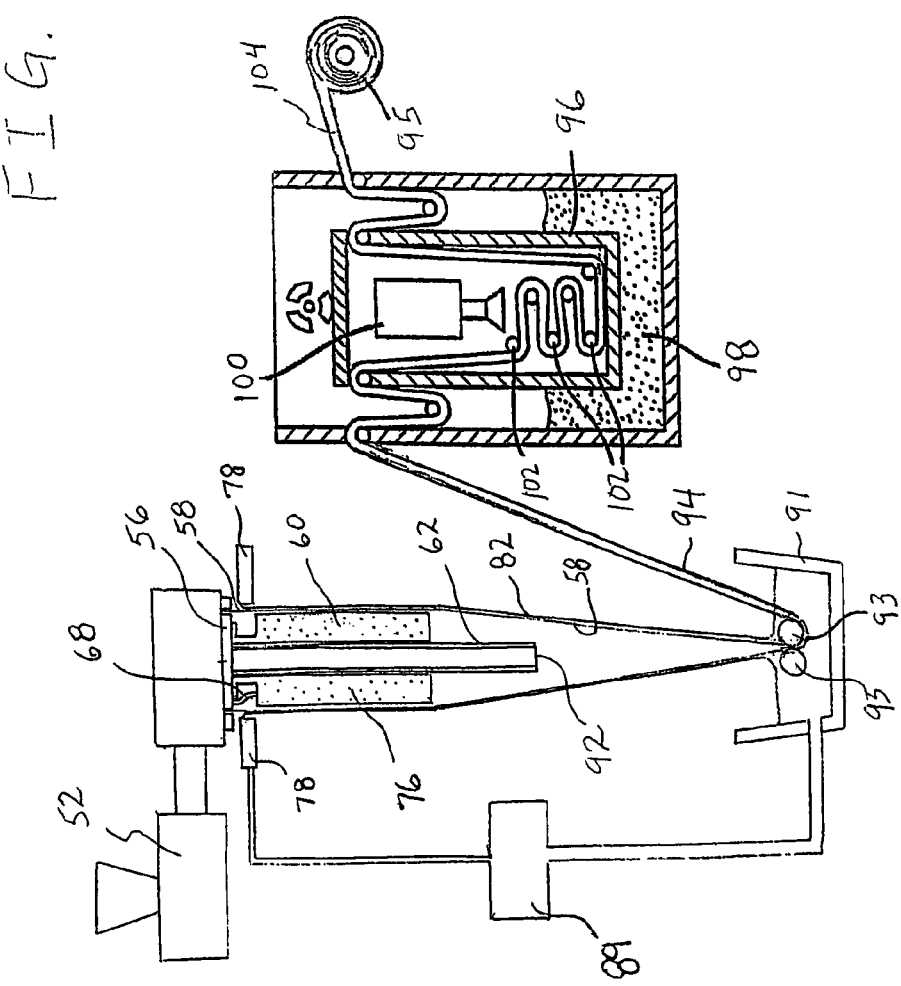
FIG. 1

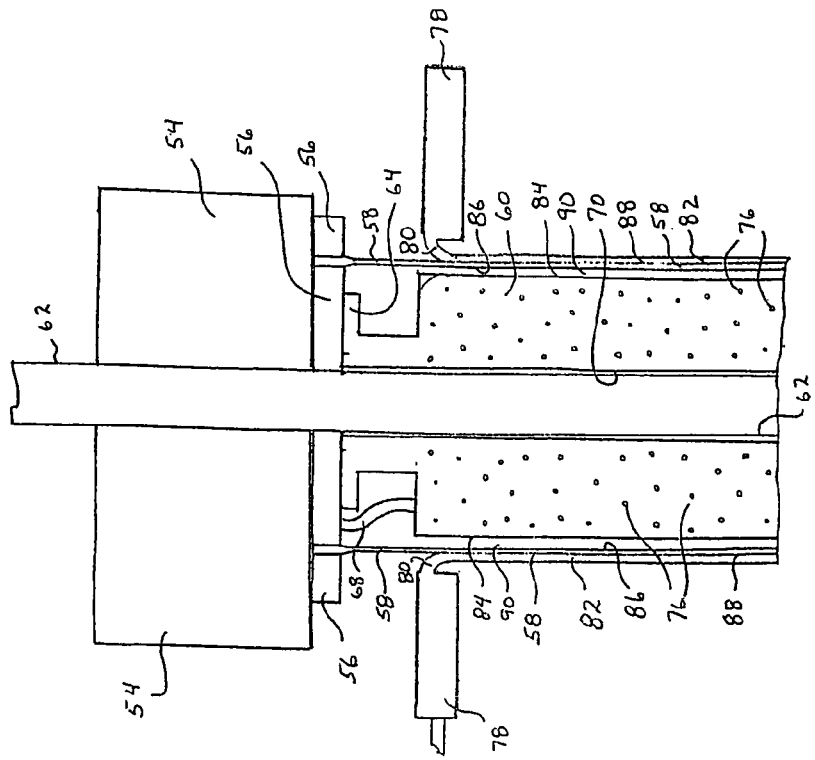
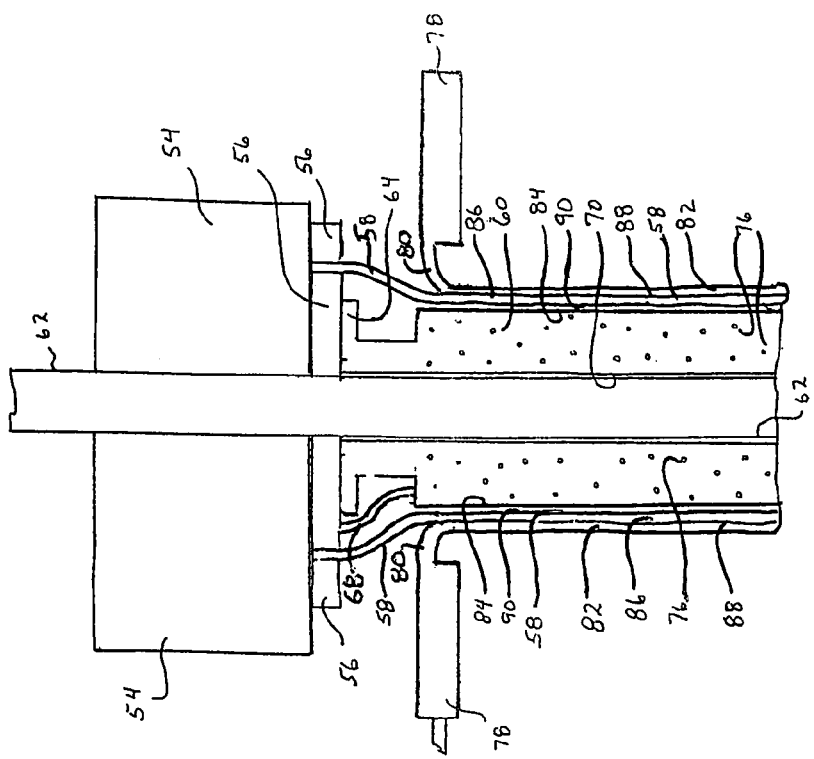

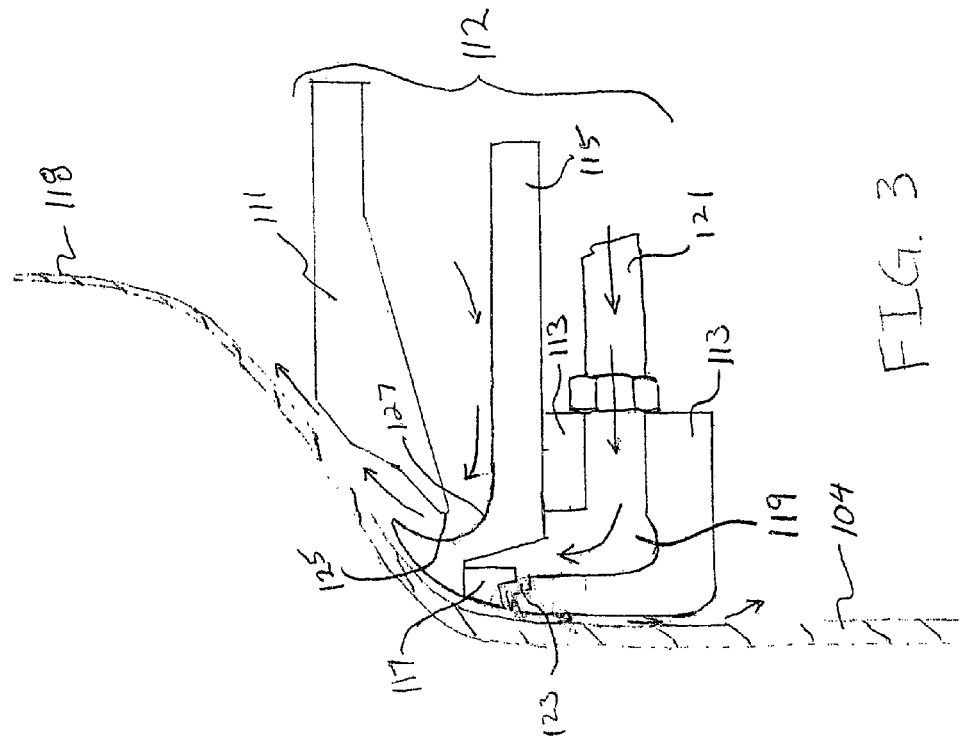
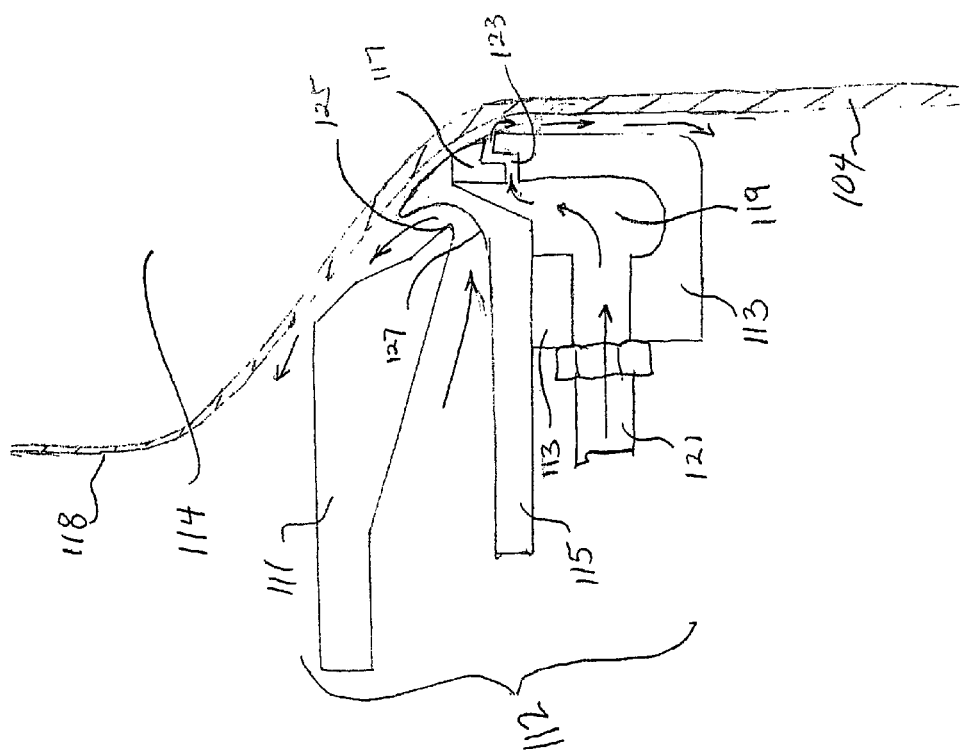
FIG. 3

SHRINK FILM CONTAINING SEMI-CRYSTALLINE POLYAMIDE AND PROCESS FOR MAKING SAME

CROSS-REFERENCE TO RELATED APPLICATIONS

This application is a continuation-in-part of U.S. Ser. No. 11/699,121, filed 29 Jan. 2007, still pending, and a continuation-in-part of U.S. Ser. No. 11/699,154, filed 29 Jan. 2007, still pending, and a continuation-in-part of U.S. Ser. No. 11/699,532, filed 29 Jan. 2007, still pending each of which is hereby incorporated, in its entirety, by reference thereto.

FIELD OF THE INVENTION

The invention relates to polyamide-containing heat-shrinkable films, particularly polyamide-containing heat-shrinkable films suitable for packaging end use (particularly food packaging), and to a process for making such films. The invention also relates to polyamide-containing heat shrinkable films in which the polyamide exhibits a particular FTIR Transmission Absorbance ratio. The invention also pertains to packaging articles made from polyamide-containing heat-shrinkable films, these packaging articles being suitable for retort end use.

BACKGROUND OF THE INVENTION

Historically, most commercially-available, heat-shrinkable, food-packaging films have been polyethylene-based. Polyethylene, particularly ethylene/alpha-olefin copolymers, are relatively inexpensive, have relatively low melting points, are readily heat-sealable, and are readily oriented in the solid state, i.e., at a temperature between the glass transition temperature of the polymer and the melting point of the polymer. Such films can be provided with a relatively high total free shrink value at, for example, 85° C. (185° F.).

In the last few years, semi-crystalline polyamide-based shrink films have begun to compete against polyethylene-based shrink films for the packaging of fresh meat products, even though polyamide is more expensive than polyolefin. One reason is that semi-crystalline polyamide-based shrink films can provide higher impact strength per mil than polyethylene-based films. Unlike patchless bags made from polyethylene-based films, patchless bags made from semi-crystalline polyamide-based films can provide adequate protection for some abusive food products, such as some bone-in meat products.

However, semi-crystalline polyamide-based shrink films are difficult to produce because it is difficult to carry out the solid-state orientation of the semi-crystalline polyamide necessary to impart the desired degree of low-temperature heat-shrinkability. Recently a turn-key production line has been developed and offered for sale by Kuhne Anlagenbau GMBH. Kuhne Anlagenbau GMBH developed this production line concurrently with its development of, and for the manufacture of, a turn-key semi-crystalline polyamide-based multilayer heat-shrinkable packaging film. This Kuhne turn-key production line includes an elaborate quenching means beneath the extrusion die. The quenching means employs vacuum around the exterior of the annular extrudate as it emerges from the die, while at the same time applying water to the extrudate shortly after it emerges from the die. The vacuum is employed so that the annular extrudate does not collapse upon itself before it solidifies enough that it is fully quenched. The vacuum around the outside of the extrudate affects the quenching of the extrudate, because the vacuum draws the applied quenching water from the surface of the extrudate.

While the extrudate is ultimately quenched by the water in the Kuhne process, it would be desirable to quench the extrudate more rapidly, as this could produce an extrudate that is more readily orientable. It would also be desirable to simplify the quenching apparatus. It would also be desirable to improve the reheating and solid state orientation so that the extrudate is more readily oriented in the solid state. It would also be desirable to obtain a film that is more readily orientable.

The multilayer heat-shrinkable film developed by Kuhne has (i) a relatively high semi-crystalline polyamide content that provides the film with relatively high impact strength, (ii) a relatively high total free shrink at 185° F., (iii) a relatively easy-to-seal polyethylene-based heat seal layer containing an easy-to-orient blend containing low density polyethylene blended with linear low density polyethylene.

The Kuhne process also uses specific polyamide blends that are intended to be easier to orient, in order to enable the production of polyamide-based films having high impact strength and relatively high shrink at relatively low temperature. Nevertheless, the solid-state orientation of the extruded tape remains relatively difficult because of its relatively high content of semi-crystalline polyamide. While the low density polyethylene in the seal layer of the Kuhne film facilitates the solid-state orientation of the multilayer polyamide-based extrudate, unfortunately the resulting heat-shrinkable polyamide-based film has exhibited relatively poor optical properties, i.e., a combination of relatively high haze and relatively low transparency. It would be desirable to provide a multilayer heat-shrinkable film containing a relatively high amount of semi-crystalline polyamide, the film having a polyolefin-based heat-seal layer to facilitate heat sealing of the film for the formation of packaging articles such as bags and for sealing the food product, while at the same time providing the film with improved optical properties.

Non-shrinkable retortable pouches have been made from various films containing polymers such as polyethylene, polypropylene, polyamide, and polyester. These non-shrinkable pouches have been made using non-shrinkable retortable films. During retorting, the product to be subjected to retort is surrounded by the non-shrinkable retortable film and placed on a retort rack. Such films need to be capable of withstanding retort conditions and provide high flex-crack resistance and vibration-induced abuse-resistance, without sticking to the retort rack and while maintaining seal integrity. However, products packaged in non-shrinkable films generally have excess film around at least a portion of the perimeter of the product. The result is a packaged product that would be improved by a tighter package with less excess film around the product.

A typical polyethylene-based heat-shrinkable film of the prior art is incapable of withstanding the conditions of retort. Retort conditions are typically from 240° F. to 260° F. for a period of from 10 minutes to 3 hours, under high humidity and high pressure. If a typical heat-shrinkable polyethylene-based film is used to package an article and thereafter subjected to retort, the film shrinks during retort and the resulting strain on the heat seals is so great that the heat seals tend to pull apart during retort. Other heat-shrinkable films that are capable of withstanding elevated temperatures, such as polyamide-containing cook-in films and other films of the prior art, tend to lose seal integrity, delaminate, and/or become embrittled by the retort process, i.e., exhibiting flex-cracking after being exposed to retort conditions. It would be desirable to provide a heat-shrinkable retortable packaging article containing a relatively high amount of polyamide, as for several years, packagers of food products have desired a heat-shrinkable packaging article with good performance in retort end use.

SUMMARY

Through the use of an improved quenching apparatus together with further process improvements, the inventors have produced a multilayer heat-shrinkable film that (i) contains a relatively high amount of semi-crystalline polyamide, (ii) has relatively high total free shrink at a relatively low temperature, (iii) has a polyolefin-based heat seal layer so that the multilayer film can easily be converted to packaging articles such as bags, and (iv) has improved optical properties over corresponding commercially-available heat-shrinkable polyamide-based films in the marketplace today. Through the use of the improved quenching apparatus and process, the extrudate is easier to orient in the solid state. This improved ease of orientation has been discovered to permit a variety of film formulations so that the film can, in one embodiment, be provided with a seal layer composition that (although more difficult to orient than LLDPE/LDPE blend in the prior art) allows solid state orientation to be carried out to produce a multilayer, heat-shrinkable, semi-crystalline polyamide-based film having optical properties superior to those in corresponding commercially-available films.

A first aspect is directed to a multilayer, heat-shrinkable film comprising a first layer that is an outer film layer and that serves as a heat seal layer, and a second layer comprising at least one semi-crystalline polyamide. The first layer comprises a polyolefin having a density of from 0.88 g/cm$^3$ to 0.917 g/cm$^3$, or from 0.89 to 0.917 g/cm$^3$, or from 0.90 to 0.917 g/cm$^3$. The second layer comprises at least one semi-crystalline polyamide selected from the group consisting of polyamide 6, polyamide 66, polyamide 6/66, and polyamide 6/12. The at least one semi-crystalline polyamide makes up at least 50 weight percent of the second layer, based on total layer weight. The multilayer, heat-shrinkable film has a total free shrink at 185° F. of at least 35 percent as measured using ASTM D-2732. The multilayer, heat-shrinkable film has a total semi-crystalline polyamide content of at least 35 volume percent based on total film volume wherein the semi-crystalline nylon is at least one member selected from the group consisting of polyamide 6, polyamide 66, polyamide 6/66, and polyamide 6/12. The multilayer, heat-shrinkable film exhibits a percent haze as measured using ASTM D 1003-00, and a percent transparency as measured using ASTM D 1746-97, in accordance with the following equation:

% Transparency≧5.33(% Haze)−31.5

As a second aspect, a packaging article comprises a multilayer, heat-shrinkable film sealed or adhered to itself or another component of the package. The heat-shrinkable film is a film according to the first aspect.

As a third aspect, a patch bag comprises the multilayer, heat-shrinkable film according to the first aspect. The multilayer, heat-shrinkable film can be present in the patch film and/or the bag film.

Through the use of an improved quenching apparatus together with further process improvements, the inventors have arrived at a multilayer heat-shrinkable film that (i) contains a relatively high amount of semi-crystalline polyamide, (ii) has relatively high total free shrink at a relatively low temperature, (iii) exhibits an FTIR transmission absorbance $A_{1199}/A_{1170}$ ratio of 1.65 or below. As a result, a fourth aspect is directed to a multilayer, heat-shrinkable film that contains at least one semi-crystalline polyamide selected from the group consisting of polyamide 6, polyamide 66, polyamide 6/66, and polyamide 6/12, with the film having a total semi-crystalline polyamide content of at least 35 volume percent, based on total film volume, and a total free shrink at 185° F. of at least 35 percent. Upon conditioning the film at 120° F. and at least 80% relative humidity for 24 hours, the film exhibits an FTIR transmission absorbance $A_{1199}/A_{1170}$ ratio of less than or equal to 1.65. The FTIR transmission absorbance $A_{1199}/A_{1170}$ ratio of less than or equal to 1.65 of the conditioned film is lower than the FTIR transmission absorbance $A_{1199}/A_{1170}$ ratio of corresponding films produced by the process of Kuhne, tested after the same conditioning. The FTIR transmission absorbance $A_{1199}$ is determined by integrating a peak area between 1223.6 cm$^{-1}$ and 1186.0 cm$^{-1}$ with a baseline made by connecting points on the curve at 1223.6 cm$^{-1}$ and 1186.0 cm$^{-1}$ with a straight line, and wherein $A_{1170}$ is determined by integrating a peak area between 1186.0 cm$^{-1}$ and 1152.5 cm$^{-1}$ with a baseline made by connecting points on the curve at 1186.0 cm$^{-1}$ and 1152.5 cm$^{-1}$ with a straight line. The FTIR transmission absorbance $A_{1199}/A_{1170}$ ratio is determined by dividing the area under the 1199 Peak by the area under the 1170 Peak.

In some embodiments, FTIR transmission absorbance $A_{1199}/A_{1170}$ ratio of the conditioned multilayer, heat-shrinkable film can be less than or equal to 1.60, 1.55, 1.50, 1.45, 1.40, 1.30, 1.20, or 1.00. The FTIR transmission absorbance $A_{1199}/A_{1170}$ ratio is determined using an FTIR spectrometer in a procedure described in detail below.

The conditioned heat-shrinkable film exhibiting the FTIR transmission absorbance $A_{1199}/A_{1170}$ ratio of up to about 1.65 can be produced using a process designed to very rapidly quench the molten polyamide and thereafter minimize the time and temperature of the reheating of the extrudate before the solid state orientation. In this manner, the thermal history of the extrudate is provided with the minimum encouragement to undergo crystallization. This, in turn, makes it possible to subject the extrudate to relatively high amounts of solid state orientation at a relatively low temperature, providing the polyamide containing film with a desirable relatively high level of total free shrink at a relatively low temperature (e.g., 185° F.). The FTIR transmission absorbance $A_{1199}/A_{1170}$ ratio of up to about 1.65 of the heat-shrinkable film correlates with improved processability of the extrudate upstream, including ease of solid state orientation to produce the heat-shrinkable film. Alternatively, the FTIR transmission absorbance $A_{1199}/A_{1170}$ ratio can be up to 1.60, or up to 1.55, or up to 1.50, or up to 1.45, or up to 1.40. Usually the FTIR transmission absorbance $A_{1199}/A_{1170}$ ratio is at least 0.2, more commonly at least 0.4, and still more commonly, at least 0.5. Using a process in accordance with U.S. Ser. No. 11/699,154, a heat-shrinkable film containing at least 35 weight percent (based on total film weight) of a semi-crystalline polyamide selected from polyamide 6, polyamide 66, polyamide 6/66, and polyamide 6/12 can be produced and thereafter conditioned as described above, with the resulting heat-shrinkable film exhibiting an FTIR transmission absorbance $A_{1199}/A_{1170}$ ratio of up to about 1.65.

The fifth aspect is directed to a multilayer heat-shrinkable film having a total free shrink at 185° F. of at least 10 percent as measured using ASTM D-2732, the multilayer heat-shrinkable film having a total semi-crystalline polyamide content of at least 50 volume percent based on total film volume, and a total polyamide content of at least 80 volume percent based on total film volume, wherein the semi-crystalline polyamide is at least one member selected from the group consisting of polyamide 6, polyamide 66, polyamide 6/66, and polyamide 6/12, with the unconditioned film exhibiting an FTIR Transmission Absorbance $A_{1199}/A_{1170}$ ratio of up to 1.65. The film can have a total free shrink of at least 15%, at least 20%, at least 25%, at least 30%, or at least 35%, or as further set forth below.

The film of the fifth aspect is not conditioned because the high total polyamide is frequently associated with films lacking outer moisture barrier layers. The conditioning environment (120° F. and at least 80% relative humidity for 24 hours) allows the moisture to penetrate the polyamide and serve as a plasticizer which, in combination with the elevated temperature, can substantially increase the crystallinity of the semi-crystalline polyamide so that the resulting film exhibits a substantially higher FTIR Transmission Absorbance $A_{1199}/A_{1170}$ ratio than the film exhibited before conditioning. The increase in crystallinity from conditioning can cause an FTIR Transmission Absorbance $A_{1199}/A_{1170}$ ratio to exceed 1.65. Thus, the FTIR Transmission Absorbance $A_{1199}/A_{1170}$ ratio for the film of this fifth aspect is measured without conditioning the film. The unconditioned film can be tested immediately after it is produced, or after a period of storage and/or transport under ordinary conditions of storage and/or transport. The unconditioned film according to the second aspect can exhibit an FTIR Transmission Absorbance $A_{1199}/A_{1170}$ ratio$\leq$1.65 after a period of storage under ordinary conditions and/or transport under ordinary conditions, or immediately after production.

The film of the fifth aspect can be designed for use at elevated temperature. For example, the film can be designed for use as an ovenable film. Polyolefin based seal layers do not provide an ovenable film with heat seals that maintain seal integrity during cooking in an oven. Ovenable films can be made from 100% polyamide.

A sixth aspect is directed to a retortable heat-shrinkable packaging article made from a heat-shrinkable, retortable film that is heat-sealable with seals able to withstand the retort process. The film has external layers containing a relatively high melting point polyolefin and/or polyamide, and an internal layer containing a semi-crystalline polyamide selected from the group consisting of polyamide 6, polyamide 66, and polyamide 6/66. The semi-crystalline polyamide makes up a relatively high percentage of the total film. The seal layers reduce the effect of heat, pressure and moisture on the integrity of the polyamide interior layer(s). The retortable packaging article is suitable for packaging a food product to be subject to retort conditions. The packaging article comprises (A) a multilayer heat-shrinkable film having a first outer film layer that serves as an inside layer of the packaging article, as a food contact layer, and as a seal layer, and (B) a second layer that is an inner film layer and that comprises at least one semi-crystalline polyamide selected from the group consisting of polyamide 6, polyamide 66, and polyamide 6/66, with the at least one semi-crystalline polyamide making up at least 65 weight percent of the second layer; and (C) a third layer that is a second outer layer that serves as an outside layer of the packaging article, the third layer comprising at least one member selected from the group consisting of (i) a polyolefin having a melting point of at least 241° F., and (ii) a polyamide homopolymer or polyamide copolymer having a melting point of from 275° F. to 428° F. The first layer comprises at least one member selected from the group consisting of (i) a polyolefin having a melting point of at least 241° F., and (ii) a polyamide homopolymer or polyamide copolymer having a melting point of from 275° F. to 428° F. The multilayer film exhibits a total free shrink at 185° F. of at least 20 percent, measured in accordance with ASTM D-2732. At least one semi-crystalline polyamide selected from the group consisting of polyamide 6, polyamide 66, and polyamide 6/66 makes up at least 35 volume percent of the multilayer film, based on total film volume, and the first layer is heat sealed to itself.

A seventh aspect is directed to a process for preparing a retorted packaged product, comprising: (A) preparing a food product; (B) packaging the food product in a retortable packaging article according to the sixth aspect; (C) sealing the article closed so that a packaged food product is made, with the food product being surrounded by the multilayer packaging film; and (D) retorting the food product by subjecting the packaged food product to a temperature of from 212° F. to 300° F. for a period of from 10 minutes to 3 hours.

The eighth aspect is directed to a process for making a heat-shrinkable annular film, comprising: (A) extruding an annular extrudate downward from an annular die; (B) quenching the annular extrudate by applying a quenching liquid to the annular extrudate; (C) reheating the extrudate to an orientation temperature of from 130° F. to 210° F., resulting in a reheated annular extrudate; and (D) orienting the reheated annular extrudate while the reheated annular extrudate is in the solid state, the orientation being carried out with a total orientation factor of at least 2, so that an oriented, heat-shrinkable film is produced, the oriented film having a total free shrink at 185° F. of at least 10 percent. The extrudate comprises at least one semi-crystalline polyamide, the semi-crystalline polyamide comprising at least one member selected from the group consisting of: (i) polyamide 6, (ii) polyamide 66, (iii) polyamide 6/66, and (iv) polyamide 6/12, with the semi-crystalline polyamide making up at least 5 volume percent of the annular extrudate, based on total extrudate volume. The quenching liquid absorbs heat from the annular extrudate as at least 50% of the quenching liquid cascades down the annular extrudate for a distance of at least 2 inches. The quenching liquid makes initial contact with the annular extrudate at a distance of from 0 to 8 inches downstream of a point at which the annular extrudate emerges from the annular die, or at a distance of from 0.1 to 8 inches downstream of the annular die.

Unless indicated otherwise or inconsistent therewith, preferred features the any of the above aspects apply to all other aspects.

BRIEF DESCRIPTION OF THE DRAWINGS

FIG. 1 is a schematic of a two-step process for producing a fully coextruded, heat-shrinkable film as described herein.

FIG. 2A is a schematic of an enlarged upstream portion of the two-step full coextrusion process illustrated in FIG. 1.

FIG. 2B is a schematic of an alternative enlarged upstream portion of the two-step full coextrusion process illustrated in FIG. 1.

FIG. 3 is a cross-sectional view of an air ring assembly for use in the process of making a film.

DETAILED DESCRIPTION

Figure 4:
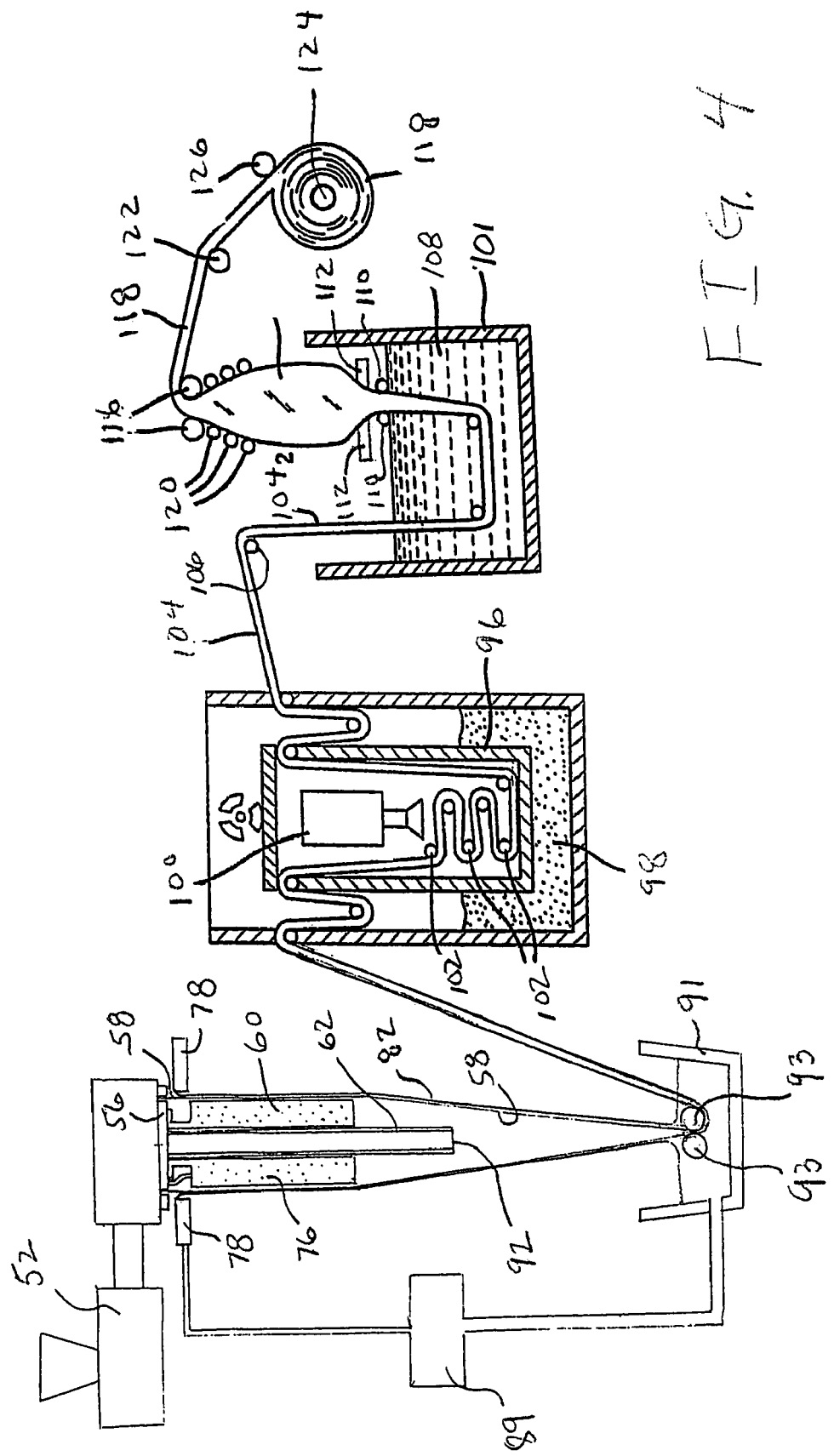
FIG. 4 is a schematic of a one-step process for producing a fully coextruded, heat-shrinkable film as described herein.

As used herein, the term "film" is inclusive of plastic web, regardless of whether it is film or sheet. The film can have a total thickness of 0.25 mm or less, or a thickness of from 0.5 mil to 30 mils, from 0.5 to 15 mils, from 1 mil to 15 mils, from 1 to 10 mils, from 1 mil to 8 mils, or from 1.5 to 7 mils, or from 1.5 to 6 mils, or from 2 mils to 6 mils, or from 1 to 5 mils, or from 2 mils to 5 mils, or from 2 mils to 4 mils, or from 2 mils to 3.5 mils, or from 2.5 to 3.5 mils, or from 1.5 mils to 4 mils, or from 1 mil to 1.5 mils, from 0.5 mil to 1.5 mils, from 0.7 mil to 1.3 mils, from 0.8 mil to 1.2 mils, or from 0.9 mil to 1.1 mils. In contrast, the thickness of the annular extrudate that is oriented to make the film can be from 5 mils to 70 mils, from 10 mils to 50 mils, or from 12 to 40 mils, or from 13 to 30 mils, or from 14 to 25 mils.

As used herein, the term "fluid" is inclusive of both compositions in the liquid state and compositions in the gaseous state. The term "liquid" applies to a composition in the liquid state, and the term "gas" refers to a composition in the gaseous state.

As used herein, the term "adhered" is inclusive of films which are directly adhered to one another using a heat seal or other means, as well as films which are adhered to one another using an adhesive which is between the two films. This term is also inclusive of layers of a multilayer film, which layers are of course adhered to one another without an adhesive therebetween. The various layers of a multilayer film can be "directly adhered" to one another (i.e., no layers therebetween) or "indirectly adhered" to one another (i.e., one or more layers therebetween).

Once a multilayer film is heat sealed to itself or another member of the package being produced (i.e., is converted into a packaging article, e.g., a bag, pouch, or casing), one outer layer of the film is an inside layer of the packaging article and the other outer layer becomes the outside layer of the packaging article. The inside layer can be referred to as an "inside heat seal/product contact layer", because this is the film layer that is sealed to itself or another article, and it is the film layer closest to the product, relative to the other layers of the film. The other outer layer can be referred to as the "outside layer" and/or as the "outer abuse layer" or "outer skin layer", as it is the film layer furthest from the product, relative to the other layers of the multilayer film. Likewise, the "outside surface" of a packaging article (i.e., bag) is the surface away from the product being packaged within the bag.

As used herein, the phrases "seal layer," "sealing layer," "heat seal layer," and "sealant layer," refer to an outer film layer, or layers, involved in heat sealing the film to itself, another film layer of the same or another film, and/or another article which is not a film. Heat sealing can be performed in any one or more of a wide variety of manners, such as melt-bead sealing, thermal sealing, impulse sealing, ultrasonic sealing, hot air sealing, hot wire sealing, infrared radiation sealing, ultraviolet radiation sealing, electron beam sealing, etc.). A heat seal is usually a relatively narrow seal (e.g., 0.02 inch to 1 inch wide) across a film. One particular heat sealing means is a heat seal made using an impulse sealer, which uses a combination of heat and pressure to form the seal, with the heating means providing a brief pulse of heat while pressure is being applied to the film by a seal bar or seal wire, followed by rapid cooling.

In some embodiments, the seal layer can comprise a polyolefin, particularly an ethylene/alpha-olefin copolymer. For example, the seal layer can contain a polyolefin having a density of from 0.88 g/cc to 0.917 g/cc, or from 0.90 g/cc to 0.917 g/cc. The polyolefin can be an ethylene/alpha-olefin copolymer. More particularly, the seal layer can comprise at least one member selected from the group consisting of very low density polyethylene and homogeneous ethylene/alpha-olefin copolymer. Very low density polyethylene is a species of heterogeneous ethylene/alpha-olefin copolymer. The heterogeneous ethylene/alpha-olefin (e.g., very low density polyethylene) can have a density of from 0.900 to 0.917 $g/cm^3$, and the homogeneous ethylene/alpha-olefin copolymer can have a density of from 0.880 $g/cm^3$ to 0.910 $g/cm^3$, or from 0.880 $g/cm^3$ to 0.917 $g/cm^3$. The polyolefin can be an ionomer or an ethylene/alpha-olefin copolymer. Metallocene catalyzed sealants with densities of 0.917 $g/cm^3$ or less, as well as a very low density polyethylene having a density of 0.912 $g/cm^3$, provided excellent optics. Plastomer type metallocene sealants with densities less than 0.910 $g/cm^3$ also provided excellent optics.

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, amorphous polyamide, polyamide MXD6, polyester, polyacrylonitrile, etc., as known to those of skill in the art. In addition to the first and second layers, the heat-shrinkable film may further comprise at least one barrier layer.

The film may optionally have one or more barrier layers comprising a nanocomposite, to enhance the barrier property or other properties of the film. The term "nanocomposite" refers to a mixture that includes a monomer, polymer, oligomer, or copolymer having dispersed therein a plurality of individual platelets obtained from exfoliated modified clay. A modified clay is a clay that has undergone intercalation, which is the process of forming an intercalate. An intercalant is, for example, an ammonium ion that is absorbed between platelets of the layered material (i.e., the clay particles) and complexed with the $Na^+$ cations on the plate surfaces. The intercalate is the platelets having the intercalant therebetween. Polymers suitable for use in the nanocomposites include low density polyethylene, linear low density polyethylene, medium density polyethylene, high density polyethylene, polypropylene, polyamide, polyester, and polyacrylonitrile. Other polymers suitable for use in the nanocomposites include ethylene vinyl alcohol copolymer, ethylene vinyl acetate copolymer, polyvinylidene chloride, aliphatic polyketone, liquid crystalline polymers, epoxy, and polyurethane adhesive. The use of nanocomposites to enhance barrier and/or other properties is disclosed in U.S. Pat. No. 6,447,860, to Mueller et al, which is hereby incorporated, in its entirety, by reference thereto.

As used herein, the phrase "tie layer" refers to any internal layer having the primary purpose of adhering two layers to one another. Tie layers can comprise any polymer having a polar group grafted thereon. Such polymers adhere to both nonpolar polymers such as polyolefin, as well as polar polymers such as polyamide and ethylene/vinyl alcohol copolymer. Tie layers can be made from polymers such as polyolefin, modified polyolefin, ethylene/vinyl acetate copolymer, modified ethylene/vinyl acetate copolymer, and homogeneous ethylene/alpha-olefin copolymer. Typical tie layer polymers include anhydride modified grafted linear low density polyethylene, anhydride grafted low density polyethylene, anhydride grafted polypropylene, anhydride grafted methyl acrylate copolymer, anhydride grafted butyl acrylate copolymer, homogeneous ethylene/alpha-olefin copolymer, and anhydride grafted ethylene/vinyl acetate copolymer.

As used herein, the phrases "inner layer" and "internal layer" refer to any layer, of a multilayer film, having both of its principal surfaces directly adhered to another layer of the film.

As used herein, the phrase "outer layer" refers to any film layer having less than two of its principal surfaces directly adhered to another layer of the film. A multilayer film has two outer layers, each of which has a principal surface adhered to only one other layer of the multilayer film.

As used herein, the term "package" refers to packaging materials configured around a product being packaged. The phrase "packaged product," as used herein, refers to the combination of a product which is surrounded by the package.

Once the multilayer film is heat sealed to itself or another member of the package being produced (i.e., is converted into a packaging article, e.g., a bag, pouch, or casing), one outer layer of the film is an inside layer of the packaging article and the other outer layer becomes the outside layer of the packaging article. The inside layer can be referred to as an "inside heat seal/product contact layer", because this is the film layer that is sealed to itself or another article, and it is the film layer closest to the product, relative to the other layers of the film. The other outer layer can be referred to as the "outside layer" and/or as the "outer abuse layer" or "outer skin layer", as it is the film layer furthest from the product, relative to the other layers of the multilayer film. Likewise, the "outside surface" of a packaging article (i.e., bag) is the surface away from the product being packaged within the bag.

As used herein, the term "bag" is inclusive of L-seal bags, side-seal bags, end-seal bags, backseamed bags, and pouches. An L-seal bag has an open top, a bottom seal, one side-seal along a first side edge, and a seamless (i.e., folded, unsealed) second side edge. A side-seal bag has an open top, a seamless bottom edge, with each of its two side edges having a seal therealong. An end-seal bag has an open top, seamless side edges, and a seal across the bottom of the bag. A backseamed bag has an open top, a seal across the bottom, seamless side edges, and a seal running the length of the bag, this seal being in one of the lay-flat sides of the bag. In an L-seal bag, a side-seal bag, an end-seal bag, and a backseamed bag, the film is sealed to itself to form the bag. In contrast, a pouch has an open top, a seal across the bottom, and seals running up each side edge, resulting in a U-seal pattern. A pouch is made by sealing two separate pieces of film to one another. Several of these various bag types are disclosed in U.S. Pat. No. 6,790,468, to Mize et al, entitled "Patch Bag and Process of Making Same", the entirety of which is hereby incorporated by reference. In the Mize et al patent, the bag portion of the patch bag does not include the patch. Packages produced using a form-fill-seal process are disclosed in U.S. Pat. No. 4,589,247, herein incorporated, in its entirety, by reference thereto.

While the multilayer heat-shrinkable film can be sealed to itself to form a bag, optionally, a heat-shrinkable patch film can be adhered to the bag. The bag film and/or the patch film can comprise at least one semi-crystalline polyamide selected from the group consisting of polyamide 6, polyamide 66, polyamide 6/66, and polyamide 6/12, with the at least one semi-crystalline polyamide making up at least 50 weight percent of at least one layer of the film, based on total layer weight. The bag film and/or the patch film can have a total free shrink at 185° F. of at least 35 percent as measured using ASTM D-2732. The bag film and/or the patch film can have a total semi-crystalline polyamide content of at least 35 volume percent based on total film volume wherein the semi-crystalline nylon is at least one member selected from the group consisting of polyamide 6, polyamide 66, polyamide 6/66, and polyamide 6/12. In one embodiment, the bag film and/or patch film is made by a process described herein.

Although seals along the side and/or bottom edges can be at the very edge itself, (i.e., seals of a type commonly referred to as "trim seals"), preferably the seals are spaced inward (preferably ¼ to ½ inch, more or less) from the bag side edges, and preferably are made using a impulse-type heat sealing apparatus, which utilizes a bar which is quickly heated and then quickly cooled.

Casings are also included in the group of heat-shrinkable packaging articles. Casings include seamless tubing casings which have clipped or sealed ends, as well as backseamed casings. Backseamed casings include lap-sealed backseamed casings (i.e., backseam seal of the inside layer of the casing to the outside layer of the casing, i.e., a seal of one outer film layer to the other outer film layer of the same film), fin-sealed backseamed casings (i.e., a backseam seal of the inside layer of the casing to itself, with the resulting "fin" protruding from the casing), and butt-sealed backseamed casings in which the longitudinal edges of the casing film are abutted against one another, with the outside layer of the casing film being sealed to a backseaming tape. Each of these embodiments is disclosed in U.S. Pat. No. 6,764,729 B2, to Ramesh et al, entitled "Backseamed Casing and Packaged Product Incorporating Same, which is hereby incorporated in its entirety, by reference thereto.

The term "polymer", as used herein, is inclusive of homopolymer, copolymer, terpolymer, etc. "Copolymer" includes copolymer, terpolymer, etc.

As used herein, terms such as "polyamide", "polyolefin", "polyester", etc are inclusive of homopolymers of the genus, copolymers of the genus, terpolymers of the genus, etc, as well as graft polymers of the genus and substituted polymers of the genus (e.g., polymers of the genus having substituent groups thereon).

As used herein, the phrase "propylene/ethylene copolymer" refers to a copolymer of propylene and ethylene wherein the propylene mer content is greater than the ethylene mer content. Propylene/ethylene copolymer is not a species of "ethylene/alpha-olefin copolymer".

The phrase "ethylene/alpha-olefin copolymer" is particularly directed to heterogeneous copolymers such as linear low density polyethylene (LLDPE), very low and ultra low density polyethylene (VLDPE and ULDPE), as well as homogeneous polymers such as metallocene catalyzed polymers such as EXACT® resins obtainable from the Exxon Chemical Company, and TAFMER® resins obtainable from the Mitsui Petrochemical Corporation. All these latter copolymers include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. The heterogeneous ethylene/alpha-olefins commonly known as LLDPE have a density usually in the range of from about 0.91 grams per cubic centimeter to about 0.94 grams per cubic centimeter. Other ethylene/alpha-olefin copolymers, such as the long chain branched homogeneous ethylene/alpha-olefin copolymers available from the Dow Chemical Company, known as AFFINITY® resins, are also included as another type of homogeneous ethylene/alpha-olefin copolymer useful in the film and process described herein.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous copolymers typically contain a relatively wide variety of chain lengths and comonomer percentages. Heterogeneous copolymers have a molecular weight distribution (Mw/Mn) of greater than 3.0.

As used herein, the phrase "homogeneous polymer" refers to polymerization reaction products of relatively narrow molecular weight distribution and relatively narrow composition distribution. Homogeneous polymers are useful in various layers of the multilayer heat-shrinkable film. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts. Homogeneous ethylene/alpha-olefin copolymer can have a Mw/Mn of ≦3.0.

As used herein, the term "polyamide" refers to a polymer having amide linkages, more specifically synthetic polyamides, either aliphatic or aromatic, either in semi-crystalline or amorphous form. It is intended to refer to both polyamides and co-polyamides. The polyamides are preferably selected from nylon compounds approved for use in producing articles intended for use in processing, handling, and packaging food, including homopolymers, copolymers and mixtures of the nylon materials described in 21 C.F.R. 177.1500 et seq., which is incorporated herein by reference. Exemplary of such polyamides include nylon homopolymers and copolymers such as those selected from the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly (hexamethylene sebacamide)), nylon 6,12 (poly(hexamethylene dodecanediamide)), nylon 6/12 (poly(caprolactam-co-laurallactam)), nylon 6,6/6 (poly(hexamethylene adipamide-co-caprolactam)), nylon 6/66 (poly(caprolactam-co-hexamethylene adipamide)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polyauryllactam), nylon MXD6, nylon MXDI, nylon 6I/6T, and copolymers or mixtures thereof. Unless otherwise indicated, the phrase "semi-crystalline polyamide" includes all polyamides that are not considered to be amorphous polyamides. All semi-crystalline polyamides have a determinable melting point.

At least one layer of the multilayer, heat-shrinkable film can have a total semi-crystalline polyamide content of at least 35 weight percent, based on layer weight, or at least 40 weight percent, or at least 45 weight percent, or at least 50 weight percent, or at least 55 weight percent, or at least 60 weight percent, or at least 65 weight percent, or at least 70 weight percent, or at least 75 weight percent, or at least 80 weight percent, or at least 85 weight percent, or at least 90 weight percent, or at least 95 weight percent, based on total layer weight.

The semi-crystalline polyamide can be present in the multilayer film in an amount of at least 35 volume percent, based on total film volume. Alternatively, the semi-crystalline polyamide can be present in the multilayer film in an amount of at least 40 volume percent of the film, or at least 45 percent, or at least 50 volume percent, or at least 55 volume percent, or at least 60 volume percent, or at least 65 volume percent, or at least 70 volume percent, or at least 75 volume percent, or at least 80 volume percent, or at least 85 percent, or at least 90 volume percent, or at least 95 volume percent, based on total film volume.

At least one layer of the heat-shrinkable film can contain the semi-crystalline polyamide in an amount of at least 5 weight percent, based on total layer weight. Alternatively, the semi-crystalline polyamide can make up at least 10 weight percent, or at least 15 weight percent, or at least 20 weight percent, or at least 30 weight percent, or at least 40 weight percent, or at least 50 weight percent, or at least 60 weight percent, at least 70 weight percent, at least 80 weight percent, at least 90 weight percent, or even up to 100 weight percent of the layer, based on total layer weight.

As used herein, a phrase such as " . . . the semi-crystalline polyamide comprising at least one member selected from the group consisting of polyamide 6, polyamide 66, and polyamide 6/66, and polyamide 6/12, wherein the at least one semi-crystalline polyamide makes up at least X weight percent of the layer . . . ", and the like, means that if only one of the semi-crystalline polyamides is present in a layer, it must be present in the layer in an amount that makes up at least X weight percent of the layer, based on total layer weight. If more than one of the semi-crystalline polyamides is present in the layer, by adding together the respective weight percent of each semi-crystalline polyamide present in the layer, the resulting sum total of all of the weight percents of the semi-crystalline polyamides present in the layer must make up at least X weight percent of the layer, based on total layer weight. In this latter case, no one semi-crystalline polyamide must be present in the layer in an amount of at least X weight percent, based on total layer weight.

As used herein, the phrase " . . . the semi-crystalline polyamide comprising at least one member selected from the group consisting of polyamide 6, polyamide 66, polyamide 6/66, and polyamide 6/12, with the semi-crystalline polyamide making up at least X volume percent of the annular extrudate, based on total extrudate volume . . . ", and the like, means that, if only one of the semi-crystalline polyamides is present, it must be present in the film in an amount that makes up at least X volume percent, based on total film volume. If this semi-crystalline polyamide is present in more than one layer of the film, the amount of the semi-crystalline polyamide in the film is the sum of the amounts of the semi-crystalline polyamide in each of the various layers of the film in which that member is present. If more than one of the semi-crystalline polyamides is present in the film, the phrase means that by adding together the respective volume percent(s) of each of the semi-crystalline polyamides present in the film, the resulting sum total of all of the volume percents of the semi-crystalline polyamides must make up at least X volume percent of the film, based on total film volume. In this latter case, no one semi-crystalline polyamide must be present in the film in an amount of at least X volume percent, based on total film volume.

The semi-crystalline polyamide can be a primary component present in a blend with a secondary component that comprises at least one member selected from the group consisting of polyamide 6/12, polyamide 6/69, polyamide 6I/6T, polyamide MXD6 (including polyamide MXD6/MXDI), polyamide 66/610, amorphous polyamide (including polyamide 6I/6T), polyether block amide copolymer, polyester (including polyethylene terephthalate/glycol), EVOH, polystyrene, polyolefin (e.g., polybutene, long chain branched homogeneous ethylene/alpha-olefin copolymer, linear low density polyethylene), and ionomer resin. While the primary component can be present in the blend in an amount of from 20 to 99 weight percent, or from 40 to 99 weight percent, or from 60 to 99 weight percent, or from 65 to 98 weight percent, or from 85 to 98 weight percent, or from 85 to 95 weight percent, based on total blend weight, with the secondary component being present an amount of from 1 to 80 weight percent, or from 1 to 60 weight percent, or from 1 to 40 weight percent, or from 2 to 35 weight percent, or from 2 to 15 weight percent, or from 5 to 15 weight percent, based on total blend weight. The semi-crystalline polyamide is different from the secondary component. The semi-crystalline polyamide can be present in the second layer in an amount of at least 65 weight percent, based on the weight of the second layer.

The multilayer, heat-shrinkable film can comprise at least one semi-crystalline polyamide selected from the group consisting of polyamide 6/12 having a melting point of at least 125° C., polyamide 6, polyamide 66, polyamide 6/66; or at least one semi-crystalline polyamide selected from the group consisting of polyamide 6/12 having a melting point of at least 135° C., polyamide 6, polyamide 66, polyamide 6/66; or at least one semi-crystalline polyamide selected from the group consisting of polyamide 6/12 having a melting point of at least 165° C., polyamide 6, polyamide 66, polyamide 6/66; or at least one semi-crystalline polyamide selected from the group consisting of polyamide 6, polyamide 66, polyamide 6/66. Alternatively, the film (or the second layer of the film) can comprise at least one member selected from the group consisting of polyamide 6, polyamide 66, polyamide 6/66. Alternatively, the film (or the second layer of the film) can comprise polyamide 6. One or more layers of the film can comprise a blend of polyamide 6 and amorphous polyamide. The amorphous polyamide can be present in the blend in an amount up to 40 weight percent, or up to 30 weight percent, or up to 20 weight percent, or up to 10 weight percent, based on total blend weight.

If the first layer is a seal layer and the second layer comprises the semi-crystalline polymer, the film can optionally further comprise a third layer that serves as a barrier layer, the third layer comprising at least one member selected from the group consisting of hydrolyzed ethylene/vinyl acetate copolymer, polyvinylidene chloride, amorphous polyamide, polyester, and polyacrylonitrile, and a fourth layer that serves as a tie layer, the fourth layer being between the first layer and the third layer. In the multilayer heat-shrinkable film, the first layer can be a first outer layer, the fourth layer can be a first tie layer, and the second layer can be directly adhered to the third layer. The multilayer film can further comprise a fifth layer that is a second outer layer and a sixth layer that serves as a second tie layer, the sixth layer being between the fifth layer and the third layer.

Various multilayer embodiments can be made in accordance with the film and process described herein, including:

seal/polyamide
seal/tie/polyamide/barrier
seal/tie/barrier/polyamide
seal/tie/polyamide/barrier/tie/outer
seal/tie/barrier/polyamide/tie/outer
seal/first tie/first polyamide/barrier/second polyamide
seal/first tie/polyamide/barrier/second tie/second outer
seal/first tie/first polyamide/barrier/second polyamide/second tie/second outer.
$1^{st}$ Outer/$1^{st}$ tie/ $1^{st}$ Core/$2^{nd}$ tie/Barrier/$2^{nd}$ Core/ $3^{rd}$ tie/$2^{nd}$ Outer The second outer layer can comprise at least one member selected from the group consisting of ethylene/alpha-olefin copolymer, olefin homopolymer, polyamide, polyester, ethylene/unsaturated ester copolymer, and ionomer resin.

The multilayer film can be provided with a moisture barrier layer on either or both sides of any or all film layers comprising semi-crystalline polyamide. The moisture barrier layer can comprise polyolefin, particularly ethylene/alpha-olefin copolymer.

These films can be fully coextruded, or prepared using an extrusion-coating process. In the last film in the above listing, the first outer layer, first tie layer, first core layer, and second tie layer can be coextruded as a four-layer multilayer substrate tape, with the barrier layer, second core layer, third tie layer, and second outer layers being extrusion-coated over the substrate tape as a four-layer multilayer coating. Optionally, the substrate tape can be irradiated before the additional layers are extrusion coated onto the substrate tape. Irradiation produces a stronger polymer network by crosslinking the polymer chains. Extrusion-coating allows a portion of the final multilayer structure to be strengthened by irradiation, while the extrusion-coating of the substrate allows the use of polyvinylidene chloride as the barrier layer, without subjecting the polyvinylidene chloride to irradiation. Irradiation of polyvinylidene chloride is undesirable because irradiation can cause degradation of polyvinylidene chloride.

In the multilayer, heat-shrinkable film, all of the film layers can be arranged symmetrically with respect to the polymeric composition of each film layer. In addition, all of the film layers can be arranged symmetrically with respect to both composition and thickness. In one embodiment, the seal layer is thicker than the second outer layer. The seal layer can have a thickness of from 110% to 300% of the thickness of the second outer layer, or from 150% to 250% of the thickness of the second outer layer.

In one embodiment, the film is annealed. In an alternative embodiment, the film is not annealed. Annealing can be carried out by reheating the film via conduction, convection, or irradiation. For example, annealing can be carried out by passing the film in partial wrap around one or more heated rollers, or by subjecting the film to infrared irradiation. An annular film can be reinflated and annealed while reinflated. One method of annealing is to pass the film in partial wrap around one or more heated rollers. For example, the film to be annealed can be passed in partial wrap around 4 rollers, each having a diameter of from 3-30 inches, with the film being wrapped from about 45 to 225 degrees around each roller, with the rollers being positioned close to one another so that the film travels from 2 to 30 inches between rollers, with each of the annealing rollers providing a metal surface heated to a temperature of from 100° F. to 200° F. In addition, one or more cooling rollers can optionally be provided immediately downstream of the annealing rollers, to cool and stabilize the film.

The film is a heat-shrinkable film. The film can be produced by carrying out only monoaxial orientation, or by carrying out biaxial orientation. As used herein, the phrase "heat-shrinkable" is used with reference to films which exhibit a total free shrink (i.e., the sum of the free shrink in both the machine and transverse directions) of at least 10% at 185° F., as measured by ASTM D 2732, which is hereby incorporated, in its entirety, by reference thereto. All films exhibiting a total free shrink of less than 10% at 185° F. are herein designated as being non-heat-shrinkable. The heat-shrinkable film can have a total free shrink at 185° F. of at least 15%, or at least 20%, or at least 30%, or at least 40%, or at least 45%, or at least 50%, or at least 55%, or at least 60%, or at least 65%, or at least 70%, as measured by ASTM D 2732.

Heat shrinkability can be achieved by carrying out orientation in the solid state (i.e., at a temperature below the glass transition temperature of the polymer). The total orientation factor employed (i.e., stretching in the transverse direction and drawing in the machine direction) can be a any desired factor, such as at least 2×, at least 3×, at least 4×, at least 5×, at least 6×, at least 7×, at least 8×, at least 9×, at least 10×, at least 16×, or from 1.5× to 20×, from 2× to 16×, from 3× to 12×, or from 4× to 9×.

Film transparency (also referred to herein as film clarity) was measured in accordance with ASTM D 1746-97 "Standard Test Method for Transparency of Plastic Sheeting", published April, 1998, which is hereby incorporated, in its entirety, by reference thereto. The results are reported herein as "percent transparency". The multilayer, heat-shrinkable film can exhibit a transparency of at least 15 percent, or at least 20 percent, or at least 25 percent, or at least 30 percent, measured using ASTM D 1746-97.

Film haze values were measured in accordance with ASTM D 1003-00 "Standard Test Method for Haze and Luminous Transmittance of Transparent Plastics", published July 2000, which is hereby incorporated, in its entirety, by reference thereto. The results are reported herein as "percent haze". The multilayer, heat-shrinkable film can exhibit a haze of less than 7.5 percent, or less than 7 percent, or less than 6 percent, measured using ASTM D 1003-00.

Film gloss values were measured in accordance with ASTM D 2457-97 "Standard Test Method for Specular Gloss of Plastic Films and Solid Plastics", published Jan. 10, 1997, which is hereby incorporated, in its entirety, by reference thereto. The results are reported herein as "percent gloss". The film can exhibit a gloss, as measured using ASTM D 2457-97, of from 60% to 100%, or from 70% to 90%.

In one embodiment, the film does not comprise a crosslinked polymer network. In another embodiment, the film comprises a crosslinked polymer network. Optionally, the film can be irradiated to induce crosslinking of polymer, particularly polyolefin in the film. The relatively high content of polyamide in the film provides a high level of toughness and impact strength, and as a result reduces the need to crosslink any polyolefin that may be present in the film. However, the film can be subjected to irradiation using an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. A suitable radiation dosage of high energy electrons is in the range of up to about 16 to 166 kGy, more preferably about 30 to 90 kGy, and still more preferably, 30 to 50 kGy. Preferably, irradiation is carried out by an electron accelerator and the dosage level is determined by standard dosimetry processes. Other accelerators such as a van der Graaf or resonating transformer may be used. The radiation is not limited to electrons from an accelerator since any ionizing radiation may be used.

The heat-shrinkable, multilayer film can be used as a forming web in a thermoforming device. The film can be heated, for example, by a contact heater, and a vacuum is applied beneath the web causing the web to be pushed by atmospheric pressure down into a preformed mold. In a plug-assist vacuum forming method, after the first or forming web has been heated and sealed across a mold cavity, a plug shape similar to the mold shape impinges on the forming web and, upon the application of vacuum, the forming web transfers to the mold surface. After the forming web is in place, a product is placed, such as by manual loading, on the forming web and a second, substantially non-forming web is disposed over the product. At a sealing station, the packages vacuumize and fusion seal with a sealing device such as a heated jaw. The first or forming web encloses a substantial portion, generally more than half, of the product to be packaged. Thermoforming is used for the packaging of meat products such as bacon. In packaging such products, it is desirable to provide a clear package with good optical properties such as clarity and gloss in order to enhance package appearance for the consumer.

Various additives can be incorporated into the multilayer, heat-shrinkable film, including incorporation into any layer of the film layer (but particularly into one or more seal layers), in order to scavenge sulfur/sulfide odors emitted by various food products, in many cases with no or minimal impact on optical properties of the film. Included are nano-particle sized magnesium oxide, calcium oxide, zinc oxide and zinc acetate, zinc stearate, copper (II) oxide, iron oxide powder, alumina, molecular sieve clays, zinc ionomer resin, ultra fine copper powder (with a mean particle diameter of 0.2 micrometers). Nano-particle sizes of each material are preferred for film transparency. Such additives are described in WO2006011926, to Speer et al, entitled "Method for Removing Sulfur Odors from Packages", as well as U.S. Ser. No. 11/637,499, to Ebner et al, entitled Vacuum Packaging of a Meat Product Using a Film Having a Carbon Dioxide Scavenger, both of which are hereby incorporated, in their respective entireties, by reference thereto.

Through the use of an improved quenching apparatus together with further process improvements, disclosed herein is a multilayer heat-shrinkable film that (i) contains a relatively high amount of semi-crystalline polyamide, (ii) has relatively high total free shrink at a relatively low temperature, (iii) has a polyolefin-based heat seal layer so that the multilayer film can easily be converted to packaging articles such as bags, and (iv) has improved optical properties over corresponding commercially-available heat-shrinkable polyamide-based films in the marketplace today. Through the use of the improved quenching apparatus and process, the extrudate is easier to orient in the solid state. This improved ease of orientation has been discovered to permit the modification of the film formulation so that the film can be provided with a seal layer composition that (while being more difficult to orient than LLDPE/LDPE blend in the prior art) allows solid state orientation to be carried out to produce a multilayer, heat-shrinkable, semi-crystalline polyamide-based film having optical properties superior to those in corresponding commercially-available films.

In one embodiment, the multilayer, heat-shrinkable film can comprise a first layer that is an outer film layer and that serves as a heat seal layer, and a second layer comprising at least one semi-crystalline polyamide. The first layer can comprise a polyolefin having a density of from 0.88 g/cm$^3$ to 0.917 g/cm$^3$, or from 0.89 to 0.917 g/cm$^3$, or from 0.90 to 0.917 g/cm$^3$. The second layer can comprise at least one semi-crystalline polyamide selected from the group consisting of polyamide 6, polyamide 66, polyamide 6/66, and polyamide 6/12. The at least one semi-crystalline polyamide makes up at least 50 weight percent of the second layer, based on total layer weight.

The multilayer, heat-shrinkable film can exhibit a percent haze as measured using ASTM D 1003-00, and a percent transparency as measured using ASTM D 1746-97, in accordance with the following equation:

% Transparency≧5.33(% Haze)−31.5

The combination of haze and clarity exhibited by the film meets the following relationship: % Transparency≧5.33 (% Haze)−31.5. Alternatively, the combination of haze and clarity exhibited by the film can meet one or more of the following equations:

% Transparency≧5.33(% Haze)−30.5; or % Transparency≧5.47(% Haze)−29; or

% Transparency≧5.54(% Haze)−32.3; or % Transparency≧5.54(% Haze)−28.0; or

% Transparency≧5.54(% Haze)−24.0; or % Transparency≧5.54(% Haze)−20; or

% Transparency≧5.31(% Haze)−32.4; or % Transparency≧5.0(% Haze)−27.6; or

% Transparency≧9.0(% Haze)−62.4; or % Transparency≧26.25(% Haze)−194.675.

A combination of low haze and high clarity have been obtained using a seal layer of 100% ethylene/alpha-olefin copolymer having a density of 0.915 g/cm$^3$. Metallocene catalyzed sealants with densities of 0.917 g/cm$^3$ or less, as well as very low. density polyethylene having a density of 0.912 g/cm$^3$, can provide the film with a combination of low haze and high clarity. Plastomer type metallocene sealants with densities less than 0.910 g/cm$^3$ also provided low haze and high clarity.

The term "FTIR" as used herein refers to Fourier transform infrared spectral analysis. Semi-crystalline polyamide exhibits an FTIR transmission absorbance peak in the range of from 1223.6 cm$^{-1}$ to 1186.0 cm$^{-1}$, with the area under this FTIR peak (herein termed the "1199 Peak") being proportional to the degree of amine-carbonyl hydrogen bonding in the semi-crystalline polyamide. This area under this peak is believed to be representative of the degree of crystallinity present in the semi-crystalline polyamide, and is also believed to be directly proportional to the degree of crystallinity of the semi-crystalline polyamide. Polyamides also exhibit an FTIR transmission absorbance peak in the range of from 1186.0 cm$^{-1}$ to 1152.5 cm$^{-1}$, with the area under this FTIR peak (herein termed the "1170 Peak") being proportional to total amide functionality present. See the Melvin I. Kohan, *Nylon Plastics Handbook*, Hauser Publishers (1995), which is hereby incorporated, in its entirety, by reference thereto. See particularly Chapter 5, section 4.4, pages 84-90, and page 128 thereof. Fortunately, in the in the range of from 1223.6 cm$^{-1}$ to 1186.0 cm$^{-1}$, as well as in the range of from 1186.0 cm$^{-1}$ to 1152.5 cm$^{-1}$, there is no substantial interference with FTIR peaks from most other polymers.

The ratio of the area under the 1199 Peak to the area under the 1170 Peak is the ratio of crystalline polyamide to total polyamide. In general, the more effectively the semi-crystalline polyamide extrudate is quenched, and the less the extrudate is heated after it is quenched, the lower the resulting FTIR transmission absorbance $A_{1199}/A_{1170}$ ratio.

In the multilayer, heat-shrinkable film of the fourth aspect, the relatively low FTIR transmission absorbance $A_{1199}/A_{1170}$ ratio exhibited by the conditioned film results from a process that allows a greater degree of solid state orientation of the extrudate at a lower temperature, thereby allowing for the production of a heat-shrinkable film containing a relatively high shrink level at a relatively low temperature, in combination with a relatively large content of semi-crystalline polyamide exhibiting an indication of relatively low crystallinity. A conditioned film that contains at least 35 volume percent semi-crystalline polyamide and a total free shrink at 185° F. of at least 35 percent and that exhibits an $A_{1199}/A_{1170}$ ratio of up to 1.65, is a film made from an extrudate that was more easily processed than the extrudate of corresponding composition resulting in a film of corresponding shrink, where the latter conditioned film exhibits an $A_{1199}/A_{1170}$ ratio of greater than 1.65.

At least three factors affect whether a conditioned film that contains at least 35 volume percent semi-crystalline polyamide and a total free shrink at 185° F. of at least 35 percent will exhibit an FTIR transmission absorbance $A_{1199}/A_{1170}$ ratio of up to 1.65. One factor is the rate at which the film is quenched as it emerges from the die. The faster the extrudate is quenched, the lower the resulting $A_{1199}/A_{1170}$ ratio. A second factor is the temperature to which the resulting extrudate is reheated prior to solid state orientation and the duration of that elevated temperature. The higher the temperature to which the extrudate is reheated prior to solid state orientation; moreover, the longer the extrudate remains at that temperature, the greater the resulting $A_{1199}/A_{1170}$ ratio. A third factor is the degree of solid state orientation placed on the extrudate. The greater the amount of solid state orientation, the greater the resulting FTIR transmission absorbance $A_{1199}/A_{1170}$ ratio.

In the analyses and results reported below, the FTIR Transmission Absorbance $A_{1199}/A_{1170}$ Ratio was measured through all layers of the multilayer, heat-shrinkable film, using a Nicolet Magna-IR 550 FTIR spectrometer under the control of a personal computer. The spectrometer was controlled, and the data processed, with a conventional desktop personal computer using the Windows XP Professional operating system. The instrument was controlled using Nicolet 6.1a software, standard software for instrumentation by that manufacturer. The instrument had the following settings during data collection and processing: Resolution 4 cm$^{-1}$, 32 Scans, etc.

A background spectrum was collected prior to each analysis. Spectra were then collected from each sample, stored on the personal computer. The spectra were backed up on the analyst's office personal computer. All spectral data were processed with the same Nicolet Omnic 6.1a software used to control the spectrometer. The spectra were displayed as absorbance as a function of wavenumber (cm$^{-1}$). The display was focused to the spectral region of interest (wavenumber of from 1225 to 1130 cm$^{-1}$). The crystalline polyamide peak (herein termed the absorbance at 1199 cm$^{-1}$, i.e., "$A_{1199}$") was integrated from 1223.6 cm$^{-1}$ to 1186.0 cm$^{-1}$ with the baseline set between those same boundaries. The net (i.e., total) polyamide peak (herein termed the absorbance at 1170 cm$^{-1}$, i.e., "$A_{1170}$") was integrated from 1186.0 cm$^{-1}$ to 1152.5 cm$^{-1}$ with the baseline set between those boundaries.

Sample conditioning was carried out by placing the samples in a dessicator having a 1.5 liter glass body, a glass lid, and a ceramic floor that sat at a level elevated from the bottom of the body. The dessicator was emptied, washed, and dried. Water was poured into the bottom of the dessicator until the surface of the water was underneath the permeable ceramic floor of the dessicator. 300 milliliters of water was required in order to fill this portion of the dessicator. Labeled film samples having a size of about 1 inch by 2 inches were placed together between the leaves of a folded piece of typing paper that was stapled together to form an open "envelope". The open envelope containing the labeled samples was then placed in the sample chamber. The sample chamber was in turn placed in a Lindberg 842 "Blue M" muffle furnace at 120° F. After 24 hours had passed, the samples were recovered for analysis.

Microscopic FTIR analysis can be used to determine the FTIR transmission absorbance $A_{1199}/A_{1170}$ ratio of an individual layer of a multilayer film. A film sample can be prepared for FTIR microscopic analysis by placing it in a cutting block and shaving off a thin slice with a razor blade. The slice can then be trimmed to a length of approximately 1 mm and placed in a diamond compression cell. The cell can be opened and the side adhering to the sample can be placed on the microscope objective stage.

The instrumentation to be used for the FTIR microscopic analysis can be a Thermo Electron Continuum® FTIR microscope connected to a Nicolet Magna-IR® 550 FTIR spectrometer. The instrument can be controlled through a dedicated personal computer (PC) using the Nicolet Omnic® 6.1a software. The specifications and experimental parameters of the instrument are outlined below. A background spectrum is collected prior to each analysis. Spectra are then collected from each sample, stored on the PC, and backed up on the analyst's office PC.

All resulting spectral data from the microscopic FTIR analysis can be processed with the same Nicolet Omnic® 6.1a software used to control the instrument. The spectra can be displayed in Absorbance vs. wavenumber ($cm^{-1}$) mode. The display is focused to the spectral region of interest (from 1225 $cm^{-1}$ to 1130 $cm^{-1}$). The crystalline polyamide peak (located at approximately 1199 $cm^{-1}$) is integrated from 1223.6 $cm^{-1}$ to 1186.0 $cm^{-1}$, with the baseline set between those same boundaries. The net polyamide peak (located at approximately 1170 $cm^{-1}$) is integrated from 1186.0 $cm^{-1}$ to 1152.5 $cm^{-1}$, with the baseline set between those boundaries. Integration of the peaks can be carried out by conventional methods. The control of the microscopic spectrometer, and the processing of the data, can be carried out as generally described above in the non-microscopic FTIR analysis. If the sample is to be conditioned before analysis, the conditioning can be carried out using the conditioning process described above.

As used herein, the phrase "to retort" refers to subjecting a product packaged in a flexible film, such as a food product packaged in a flexible film, to sterilizing conditions of high temperature (i.e., of from 212° F. to 300° F.) for a period of from 10 minutes to 3 hours or more, in the presence of water, steam, or pressurized steam. Retorting is usually carried out at a temperature of from 240° F. to 260° F. for a period of from 10 minutes to 3 hours, under high humidity, and at elevated pressure.

As used herein the phrase "retortable film" refers to a packaging film that can be formed into a packaging article (such as a bag, pouch, lidstock, etc), with the packaging article being filled with an oxygen-sensitive product, heat sealed, and retorted without delamination of the layers of the film. The retort process is also carried out at elevated pressure. In general, the retort process is carried out with the packaged products being placed in an environment pressurized to from 20 to 100 psi, or in another embodiment, from 30 to 40 psi.

The retortable film can have a third layer comprising at least one member selected from the group consisting of ethylene/vinyl alcohol copolymer, polyamide MXD6, and amorphous polyamide.

In order to withstand the conditions of retort, the outer layer of the packaging article, and the seal layer of the packaging article, should comprise a polymer having a melting point of at least 241° F. Medium density polyethylene is useful in the outside layer of the packaging article, as well as in the inside layer of the packaging article. Similarly, a polyamide copolymer having a melting point of from 241° F. to 428° F. is also useful in the outside layer of the packaging article, as well as in the inside layer of the retortable packaging article.

A heat-shrinkable retortable film is best used for the packaging of non-flowable products, such as whole muscle meat cuts (pork, beef, poultry, etc.) It can be particularly advantageous to package meat products that produce a high amount of purge during the retort cycle. This purge is undesirable because a loss of product when the product is opened and poor visual appearance. A shrinkable product may minimize this purge and have an aesthetically desirable tight appearance. For example, it may be desirable to package processed meat products and pet food products in a heat-shrinkable, retortable film.

In the retortable packaging article, the first layer can comprise at least one member selected from the group consisting of medium density polyethylene, high density polyethylene, very low density polyethylene, propylene/ethylene copolymer, propylene homopolymer, and a third layer comprising at least one member selected from the group consisting of medium density polyethylene, high density polyethylene, very low density polyethylene, propylene/ethylene copolymer, and propylene homopolymer.

The retortable film can further comprise a fourth layer that serves as an $O_2$-barrier layer, the fourth layer comprising at least one member selected from the group consisting of (i) ethylene/vinyl alcohol copolymer, (ii) polyvinylidene chloride, (iii) amorphous polyamide, and (iv) MXD6 semi-crystalline polyamide. This film can further comprise a fifth layer that serves as a first tie layer, the fifth layer being between the first layer and the fourth layer, and a sixth layer that serves as a second tie layer, the sixth layer being between the third layer and the fourth layer, with the second layer being between the fifth layer and the sixth layer. Moreover, in this film the second layer can be a first polyamide layer that is between the fourth layer and the fifth layer, with the film further comprising a seventh layer that is a second polyamide layer, the seventh layer being between the fourth layer and the sixth layer, the seventh layer comprising at least one semi-crystalline polyamide selected from the group consisting of (i) polyamide 6, (ii) polyamide 66, and (iii) polyamide 6/66, the semi-crystalline polyamide making up at least 65 weight percent of the seventh layer.

Retorting can be carried out by subjecting the packaged product to a temperature of from 230° F. to 270° F. for a period of at least 5 minutes. Alternatively, the retorting can be carried out by subjecting the packaged product to a temperature of from 240° F. to 260° F. for a period of from about 5 minutes to about 3 hours.

The multilayer, heat-shrinkable retortable film can comprise (A) a first layer that is a heat-seal layer and that comprises a blend of the semi-crystalline polyamide and at least one member selected from the group consisting of amorphous polyamide, ethylene/vinyl alcohol copolymer, polyamide MXD6, and ionomer resin, and (B) a second layer comprising a polyamide having a melting point greater than 210° C. In this manner, the heat seal layer can be heat sealed at a temperature below the melting point of the second layer.

The multilayer, heat-shrinkable, retortable film can comprise a blend of (i) the semi-crystalline polyamide and (ii) at least one member selected from the group consisting of amorphous polyamide, ethylene/vinyl alcohol copolymer, polyamide MXD6, and ionomer resin. The second component (ii) serves to disrupt the crystallinity in the polyamide, resulting in a blend with a lower melting point.

The multilayer, heat-shrinkable, retortable film can comprise (A) a first layer that is a heat-seal layer, the first layer comprising a polyamide having a melting point of up to 210° C.; and (B) a second layer comprising a polyamide having a melting point greater than 210° C. The first layer can comprise a polyamide having a melting point of from 130° C. to 210° C., or from 150° C. to 210° C., or from 170° C. to 210° C., or from 180° C. to 210° C., or from 185° C. to 200° C., or from 190° C. to 200° C. The first layer can further comprise amorphous polyamide. The first layer can comprise a blend of at least one member selected from the group consisting of ethylene/vinyl alcohol copolymer, and polyamide MXD6 (including MXD6/MXDI copolyamide).

The second layer of the multilayer, heat-shrinkable, retortable film can comprise a polyamide having a melting point of from 211° C. to 260° C., or from 211° C. to 240° C., or from 211° C. to 230° C., or from 215° C. to 225° C. The first layer and/or the second layer can comprise at least one member selected from the group consisting of ethylene/vinyl alcohol copolymer, polyamide MXD6, and amorphous polyamide, and ionomer resin. The multilayer film can further comprise a third layer that comprises at least one member selected from the group consisting of ethylene/vinyl alcohol copolymer, polyamide MXD6 (including MXD6/MXDI copolyamide), and amorphous polyamide.

The process can be used to produce a heat-shrinkable film having a first layer which serves as an outer seal layer, and a second layer comprising at least one semi-crystalline polyamide having a melt point above 215° C. The first layer can comprise at least one member selected from the group consisting of: (i) a semi-crystalline polyamide having a melting point of up to 215° C.; and (ii) a blend of a semi-crystalline polyamide having a melting point above 215° C. with (a) an amorphous polyamide or (b) a semi-crystalline polyamide having a melting point of up to 215° C. The second layer can comprise a blend of the semi-crystalline polyamide having a melt point above 215° C. with at least one member selected from the group consisting of polyamide 6/12 having a melt point below 215° C., polyamide 6/69, polyamide MXD6, polyamide 66/610, and amorphous polyamide.

The film can be produced as a fully coextruded film, i.e., all layers of the film emerging from a single die at the same time. Alternatively, the film can be produced using an extrusion coating process in accordance with U.S. Pat. No. 4,278,738, to Brax et al, which is hereby incorporated, in its entirety, by reference thereto.

The process can be used to make an annular heat shrinkable film containing a semi-crystalline polyamide. The polyamide can be a high melting polyamide. The process enables a more rapid quenching of an annular extrudate by the application of a quenching liquid to extrudate, the quenching liquid cascading down the extrudate for a distance of at least 2 inches, with the quenching liquid making initial contact with the extrudate within a distance of from 0.1 to 8 inches from the position at which the extrudate emerges from the annular die. The extrudate (and resulting film) can contain semi-crystalline polyamide an amount of at least 5 volume percent, at least 10 volume percent, 15 volume percent, at least 20 volume percent, 25 volume percent, at least 30 volume percent, 35 volume percent, at least 40 volume percent, 45 volume percent, at least 50 volume percent, 55 volume percent, at least 60 volume percent, 65 volume percent, at least 70 volume percent, 75 volume percent, at least 80 volume percent, 85 volume percent, at least 90 volume percent, or at least 95 volume percent, based on total film volume.

The semi-crystalline polyamide can be present in the multilayer film in an amount of at least 35 weight percent, based on total extrudate weight. Alternatively, the semi-crystalline polyamide can be present in the multilayer film in an amount of at least 40 weight percent, or at least 45 weight percent, or at least 50 weight percent, or at least 55 weight percent, or at least 60 weight percent, or at least 65 weight percent, or at least 70 weight percent, or at least 75 weight percent, or at least 80 weight percent, or at least 85 weight percent, or at least 90 weight percent, or at least 95 weight percent, based on total extrudate weight.

The extrudate is extruded through an annular die. The quenching liquid can be applied to the inside surface of the annular extrudate, or to the outside surface of the annular extrudate. If the quenching liquid is applied to the outside of the annular extrudate, it is necessary to provide a means for supporting the annular extrudate, to prevent the annular extrudate from collapsing upon itself. The means for supporting the annular extrudate is provided inside of the annular extrudate. The means for supporting can be a slightly superatmospheric pressure inside the extrudate, and/or a physical support positioned inside of the annular extrudate.

An air shoe positioned inside the annular extrudate is a preferred means for supporting the annular extrudate. The air shoe has an exterior surface relatively close to the annular extrudate. The air shoe emits air from a plurality of relatively small holes over its exterior surface, providing a cushion of air that supports the inside surface of the extrudate while the outside surface of the extrudate is contacted by, and in contact with, the cooling liquid applied to and cascading down the exterior surface. In this manner, a relatively large quantity of liquid can cascade down the outside surface of the extrudate to produce very rapid quenching of the extrudate, producing an extrudate that is more readily oriented in the solid state. The air shoe can be supplied with cool air in order to assist in quenching the annular extrudate.

As used herein, the term "quenching" refers to cooling an annular extrudate to accelerate the freezing of the polymers making up the extrudate. The process quenches by applying a quenching liquid to the annular extrudate within a distance of from 0.1 to 8 inches downstream of the point at which the annular extrudate emerges from the annular die. The liquid can be applied to the exterior surface of the annular extrudate, and/or to the interior surface of the annular extrudate. Liquid applied to the interior surface of the annular extrudate serves to both quench the extrudate and support the annular extrudate against its tendency to collapse inwardly. If liquid is applied only to the exterior surface of the annular extrudate, a means for supporting the annular extrudate must be employed to avoid collapse of the extrudate.

While the quenching liquid is applied to the annular extrudate within a distance of from 0.1 to 8 inches downstream of the point at which the annular extrudate emerges from the annular die, the quenching liquid can be applied to the surface of the annular extrudate within a distance of from 0.1 to 8 inches downstream of the annular die, or from 0.1 to 6 inches, or from 0.5 to 6 inches, or from 0.1 to 5 inches, or from 0.1 to 4 inches, or from 0.2 to 3.5 inches, or from 0.3 to 3 inches, or from 0.4 to 3 inches, or from 0.4 to 2.5 inches or from 0.5 to 3 inches, or from 1 to 3.5 inches, or from 1 to 3 inches, or from 1 to 2.5 inches, or from 1.5 to 3.5 inches, or from 1.5 to 3 inches, or from 1.5 to 2.5 inches.

While at least 50% of the applied quenching liquid cascades down the annular extrudate for a distance of at least 2 inches, at least 70% can cascade for a distance of at least 3 inches, or at least 80% can cascade for a distance of at least 4 inches, or at least 90% can cascade for a distance of at least 5 inches, or at least 99% can cascade for a distance of at least 8 inches, or substantially 100 percent of the liquid can cascade for at least 12 inches, or substantially 100 percent of the liquid can cascade for at least 24 inches.

While the quenching liquid cascades down the extrudate for a distance of at least 2 inches, it may cascade down the extrudate for a distance of at least 3 inches, or at least 4 inches, or at least 8 inches, or at least 12 inches or at least 24 inches. In all of the examples described hereinbelow, substantially 100% of the water cascades down the extrudate from the point at which the water contacts the extrudate, with the water cascading down the extrudate substantially all the way to the nip rollers that collapse the annular extrudate into its lay-flat configuration. This distance is at least 24 inches.

If quenching liquid is applied to the interior surface of the annular extrudate, it can be supplied to the interior surface via a central passageway through the annular die, with the quenching liquid being applied to the inside surface, this quenching liquid cascading downward into a collection pool above the point at which the annular extrudate converges into lay-flat configuration. The quenching liquid can be drawn out of the collection pool and up through a discharge or recirculation conduit passing through the central passageway through the annular die.

If the liquid on the inside of the annular extrudate more than offsets the tendency of the annular extrudate to collapse, supporting means can be provided to the exterior surface of the annular extrudate. Such supporting means can be a fluid impinging on the exterior surface of the annular extrudate, which fluid can be liquid and or gas.

As used herein, the phrase "water ring" refers to a ring-shaped device for delivering a stream of liquid (preferably 0water) onto the exterior surface of an annular extrudate. The ring itself is hollow, i.e., has a cavity therein. The water ring is supplied with a quenching fluid (preferably water) that passes into the cavity within the ring and then out through a slot in the inside surface of the ring, with the annular stream of water flowing out of the ring and onto the exterior surface of the annular extrudate, for the purpose of quenching the extrudate. The gap in the water ring, from which the water flow is emitted, can be within the range of from 0.02 to 0.5 inch, or 0.03 to 0.3 inch, or 0.05 inch to 0.25 inch, or from 0.07 inch to 0.16 inch. The water ring can emit quenching water at a temperature of from 0° C. to 25° C., or from 5° C. to 16° C. More than one water ring can be employed in the process. More than one water ring can apply the water to the outside surface of the annular extrudate.

The means for supporting the annular extrudate immediately after it emerges from the die can be a fluid supplied to the interior volume within the annular extrudate (i.e., a gas or liquid supplied to the volume between the point at which the annular extrudate emerges from the annular die and the point at which the annular extrudate converges into lay-flat configuration). The fluid is provided so that at least some portion of this interior volume has a pressure above ambient pressure. The pressure can be supplied by simple pressurization of the volume with a gas, or through the use of a stream of liquid emitted radially outward from one or more sprayers or conduits or fluid flow emission members, or with an air shoe.

As used herein, the phrase "air shoe" refers to a device to be positioned inside an annular extrudate to support the extrudate as it emerges immediately after it emerges from the annular die, i.e., before the annular extrudate is quenched. The air shoe can have any desired length, or a length of from 4 to 50 inches, or 6 to 20 inches. The air shoe can have any desired diameter, or a diameter of from about 1 to 50 inches, or from 2 to 25 inches, or from 4 to 12 inches. The air shoe has a round cross-section and has an interior chamber supplied with pressurized air, with the pressurized air passing from the chamber through a plurality of small air passageway holes through the chamber wall. The air passageway holes can have any desired diameter, or a diameter of from about 0.01 inch to about 0.25 inch, or from 0.02 inch to about 0.1 inch. The air passageway holes can be spaced at uniform intervals over the surface of the air shoe. Each interior hole in the matrix of air passageway holes can have the same number of holes equidistant therefrom, such as 3 holes, four holes, 5 holes, 6 holes, 7 holes, 8 holes, or 9 holes. The equidistant spacings can be any desired distance, or can be from 2 to 40 millimeters, or from 4 to 20 millimeters, or from 10 to 20 millimeters. The air shoe can be supplied with air under a pressure of from 1 to 100 psi, or from 5 to 90 psi, or from 10 to 80 psi, or from 40 to 100 psi, or from 60 to 90 psi. The air shoe can emit air at any desired temperature, or the air shoe can emit air at a temperature of from −10° C. to 25° C., or from 0° C. to 25° C., or from 5° C. to 10° C.

Generally the air shoe has an outside diameter which is relatively close to the diameter of the extrudate, so that the air emitted from the air passageway holes in the air shoe provides an air cushion supporting the annular extrudate. The ratio of the inside diameter of the annular die gap (from which the annular extrudate emerges), to the outside diameter of the air shoe, can be from 1:1.1 to about 1:0.5, or from about 1:1 to about 1:0.8, or from 1:1 to 0.85; or from 1:0.99 to 1:0.90, or from 1:0.98 to 1:0.92.

As used herein, the phrase " . . . a distance of from X to Y inches downstream of the annular die . . . ", and the like, refer to a distance measured from the point at which the extrudate emerges from the die to the downstream point at which the water ring is positioned and/or the stream of quenching liquid first comes into contact with the extrudate emerging from the die.

The process can be used to produce an annular extrudate comprising polyamide in an amount of at least 85 percent, based on total extrudate volume; or at least 90 percent based on total extrudate volume, or at least 95 percent based on total extrudate volume, or at least 98 percent based on total extrudate volume, or at least 99 percent based on total extrudate volume, or 100 percent based on total extrudate volume.

Viewing FIG. 1, FIG. 2A, FIG. 2B, and FIG. 3 together, a heat-shrinkable film is prepared by feeding solid polymer beads (not illustrated) to a plurality of extruders 52 (for simplicity, only one extruder is illustrated). Inside extruders 52, the polymer beads are forwarded, melted, and degassed, following which the resulting bubble-free melt is forwarded and extruded through annular die 56, resulting in annular extrudate 58.

Shortly after exiting die 56, annular extrudate 58 is drawn downward toward cylindrical air shoe 60. While the outside diameter of air shoe 60 can be the same size as the diameter of the orifice of annular die 56 as illustrated in FIG. 1 and FIG. 2A, the annular extrudate 58 can be allowed to draw down (i.e., while it remains molten, extrudate 58 can undergo diameter reduction, also referred to as "necking-in") if the outside diameter of air shoe 60 is smaller than the orifice of annular die 56. The extent of neck-in of annular extrudate 58 is limited by the outside diameter of air shoe 60, as illustrated in FIG. 2A. The necking-in of annular extrudate 58 is increased by drawing extrudate 58 downward at a speed greater than the speed at which the molten polymer emerges from annular die 56. The downward drawing of annular extrudate 58 generates tension, and results in a more stable process. This increase in process stability produces greater width uniformity in the annular extrudate 58, greater thickness uniformity in the annular extrudate 58, and improved downstream processability as the various processing operations are carried out on a more uniform annular extrudate 58. Moreover, this greater uniformity in annular extrudate 58 results in more uniform product characteristics, such as more uniform impact strength, more uniform shrink, more uniform optics, etc. Annular extrudate 58 can neck down so that its inside diameter (i.e., upon being quenched) decreases by at least 10%, at least 20%, at least 30%, at least 40%, or even at least 50% compared with its diameter at the point at which it emerges from annular die 56.

Alternatively, the extrudate can be supported in a manner so that the extrudate is prevented from necking-in as it emerges from the die, as illustrated in FIG. 1 and in FIG. 2B. In the process illustrated in FIGS. 1 and 2B, air shoe 60 is positioned over hollow pipe 62 that passes through die 56 and the hollow center of air shoe 60. Air shoe 60 has an outside diameter large enough that annular extrudate 58 is supported and is prevented from substantially necking-in upon emergence from annular die 56. The outer surface of air shoe 60 is roughened with 80-grit sandpaper. Integral with air shoe 60 is upper flange 64 thereof, which is bolted to the bottom surface of die 56.

In use, pressurized air line 68 supplies cooled, pressurized air to an interior chamber within air shoe 60. The air supplied to air shoe 60 can have a temperature of from 45° F. to 80° F., and preferably has a temperature of about 60° F. The pressurized air supplied to air shoe 60 from air line 68 initially flows into the interior chamber within air shoe 60, and thereafter flows radially outward through a plurality of holes 76 toward the inside surface 86 of annular extrudate 58. Holes 76 preferably have a diameter of about 0.030 inch, and are preferably spaced uniformly over the surface of air shoe 60, with each hole 76 being about 0.563 inch from its nearest neighbor, in a pattern so that each hole 76 is surrounded by a maximum of 6 additional holes 76.

Shortly after the emergence of annular extrudate 58 from die 56, downward-moving annular extrudate 58 is rapidly quenched by contact with an annular stream 80 of cool water emitted from a gap in annular water ring 78. The gap in annular water ring 78 can have a width of from about 0.02 to about 0.5 inch, or from 0.03 to 0.3 inch, or from 0.05 to 0.25 inch, or from 0.07 to 0.16 inch. Annular stream 80 contacts outside surface 88 of annular extrudate 58, with annular stream 80 traveling downward on the exterior surface of annular extrudate 58 as cascading water 82. Annular stream 80 contacts outside surface 88 of annular extrudate 58 within a distance of from 0.1 inch to 8 inches downstream of the annular die; or within a distance of from 0.5 inch to 5 inches; or within a distance of from 0.5 inch to 3 inches, or within a distance of from 1 to 3 inches.

Annular stream 80 of cool water, which becomes cascading cool water 82, quickly draws heat from annular extrudate 58, and thereby quickly quenches (i.e., solidifies) the polymers making up annular extrudate 58. In fact, annular stream 80 and cascading water 82 draw heat from annular extrudate 58 so quickly that the semi-crystalline polyamide within annular extrudate 58 solidifies before it has an opportunity to undergo substantial crystallization. It has been discovered that the quenching is carried out so rapidly that the semi-crystalline polyamide in annular extrudate 58 is frozen in a state in which it is more readily oriented to make a heat-shrinkable film.

Although annular stream 80 and cascading water 82 are the primary sources for the rapid quenching of annular extrudate 58, the cool air emitted from air shoe 60 also serves to quench annular extrudate 58 from the inside out. However, the primary purpose of the air emitted from air shoe 60 is to provide a slightly superatmospheric pressure within annular extrudate 58, in order to prevent the collapse of annular extrudate 58 as it is contacted by annular stream 80 of cool water which becomes cascading water 82. The cool air emitted from holes 76 in air shoe 60 emerges from air shoe 60 into narrow gap 90 between the outside surface 84 of air shoe 60 and the interior surface 86 of annular extrudate 58. Gap 90 is typically only from about 0.001 to about 0.5 inch wide, more commonly from 0.001 to 0.05 inch wide. The flow of cool air emitted from holes 76 is downward toward and into open end 92 of hollow pipe 62. The cool air then travels upward through hollow pipe 62 and through the open center of die 56, with the cool air being evacuated into the environment.

Annular extrudate 58 and cascading water 82 both travel downward towards nip rollers 92. Cascading water 82 flows into catch basin 91, and is thereafter recycled through pump and cooling means 89, with the recooled water being recirculated to annular water ring 56.

As annular extrudate 58 passes through nip rollers 93, annular extrudate 58 is reconfigured from an inflated configuration to a lay-flat configuration. The resulting reconfigured lay-flat annular extrudate 94 is thereafter wound up on a reel (not illustrated). Optionally, lay-flat annular extrudate 94 can be fed through irradiation vault 96 surrounded by shielding 98, where annular extrudate 94 is irradiated with high energy electrons (i.e., ionizing radiation) from iron core transformer accelerator 100. Annular extrudate 94 can be guided through irradiation vault 96 on a series of rollers 102. Preferably, the irradiation of lay-flat annular extrudate 94 is at a level of from about 2 to 10 megarads (hereinafter "MR"), after which lay-flat annular extrudate 94 is wound up on reel 95 as irradiated lay-flat annular extrudate 104.

As a second step of the process, the wound up, irradiated, lay-flat annular extrudate 104 is unwound and directed over guide roller 106, after which irradiated annular extrudate 104 is passed into and through (i.e., immersed in) hot water 108 in tub 110 containing hot water 108. While the temperature of hot water 108 can be from about 125° F. to about 212° F., or from 130° F. to 210° F., or from 130° F. to 180° F., or from 160° F. to 190° F., or from 145° F. to 175° F., or from 150° F. to 170° F., hot water 108 is preferably maintained at a temperature of about 175° F. Annular extrudate 104 is forwarded into and through hot water 108 so that it remains immersed in hot water 108 for a period of from about 0.25 second to about 80 seconds, or from 1 to 40 seconds, or from 2 to 10 seconds, or from 3 to 7 seconds, or from 0.5 to 4 seconds, or from 1 to 3 seconds. Preferably, annular extrudate 104 is immersed for a period of from about 1 to 2 seconds. It is preferred to immerse annular extrudate 104 in hot water 108 for the minimum time necessary to bring annular extrudate 104 up to the desired temperature for solid state biaxial orientation.

Upon emergence from hot water 108, annular extrudate 104 passes through lower set of nip rollers 110, and through annular air ring 112 as annular extrudate 104 is pulled upward by upper set of nip rollers 116. Annular air ring 112 is supplied with cool, compressed air at a temperature of from 45° F. to about 90° F., or from 30° F. to 120° F., or a temperature of about 60° F. The cool air is supplied to air ring 112 from a plurality of air lines, each air line providing cool air at a pressure of up to 150 psi.

Upon emergence from lower nip rollers 110, annular extrudate 104 is solid-state oriented in both the machine direction and the transverse direction as it moves upward and passes around a trapped air bubble 114, and towards upper nip rollers 116. The surface speed of upper nip rollers 116 is greater than the surface speed of lower nip rollers 110. The solid state orientation stretches annular extrudate 104 in both the machine direction and the transverse direction, resulting in the formation of biaxially-oriented, heat-shrinkable film 118.

FIG. 3 provides an enlarged, detailed, cross-sectional view of annular extrudate 104 at the point in the process at which extrudate 104 passes through air ring 112. Air ring 112 is an assembly of upper ring 111 and a lower ring which is an assembly of cap member 113 bolted to plate member 115 and air permeable insert 117. Air permeable insert 117 can be designed of sintered metal, such as sintered bronze. Another air ring capable of the performance of the sintered bronze is an air ring insert such as the microbored air ring insert available from Future Design, Inc, at 5369 Maingate Drive, Mississauga, Ontario, Canada LW4 1G6 (web address of www.saturn2.com). The sintered bronze and microbored air ring inserts are both microporous, due to the sintered metal design or due to micro bored holes therein (hole diameter within the range of from 0.002 to 0.02 inch, or from 0.005 to 0.01 inch).

Compressed air (at 20 to 150 psi) passing through porous insert 117 is supplied to chamber 119 by air lines 121. Pressurized air in chamber 119 enters passageway 123 and passes outward and down, around the outside of extrudate 104. The effect of the airstream passing downward and around extrudate 104 is to pull trapped bubble 114 of air downward, to prevent trapped bubble 114 from moving upward and bursting oriented film 118. Simultaneously, a fan supplies air to the region between plate member 115 and upper ring 111, this air passing between the inside edge 125 of upper ring 111 and the outside concave surface 127 of plate member 115. This air passes out of air ring 112 and around extrudate 104 as extrudate 104 is being oriented. The effect of this second airstream is to pass upward and around extrudate 104 to push trapped bubble 114 upward, the prevent trapped bubble 114 from moving downward and into air ring and onward toward lower nip rollers 110, which likewise would be problematic for continuation of the process. In this manner, air ring 112 provides opposing airstreams to stabilize the lower position of trapped bubble 114. As can also be seen in FIG. 3, as extrudate 104 is oriented to produce heat-shrinkable, film 118, it thins down from the thickness of the tape to the final film thickness.

As a result of the transverse stretching and longitudinal drawing of annular extrudate 104, irradiated, biaxially-oriented, heat-shrinkable film 118 is produced. Heat-shrinkable film 118 has been drawn in the longitudinal direction in the solid state, and stretched in the transverse direction in the solid state, in at a total orientation ratio (i.e., L+T) of from about 1:2 to about 1:20, or from 1:2.5 to 1:16, or from 1:4 to 1:14, or about 1:9. The result is a biaxial oriented, heat-shrinkable film.

As annular, heat-shrinkable film 118 approaches upper nip rollers 116, it is collapsed into lay-flat configuration by rollers 120, thereafter passing between nip rollers 116. Heat-shrinkable film 118 is then forwarded over guide roller 122, and then rolled onto wind-up roller 124. Idler roller 126 assists with wind-up. While not illustrated, annealing rollers and cooling rollers can optionally be provided between nip rollers 116 and wind up roller 124.

The amount of solid state orientation of annular extrudate 104, and the ease of solid state orientation of annular extrudate 104, is significantly affected by a variety of factors. It is the relatively high proportion of semi-crystalline polyamide in the annular extrudate that makes the annular extrudate difficult to orient in the solid state. However, the process described above provides several features that significantly improve the ability to orient such an annular extrudate. The first factor is the rapid quenching of the annular extrudate as it emerges from the die. A second factor is the relatively low temperature of hot water 108. A third factor is the relatively low immersion time of annular extrudate 104 in hot water 108. A fourth factor is the relatively rapid cooling of the heated annular extrudate 104 by air ring 112 upon emergence of annular extrudate 104 from hot water 108. The rapid quenching, the reheating to a relatively low temperature for a relatively short time and the rapid cooling upon emergence from the water bath all assist in enhancing the amount of solid state orientation, and the ease of the solid state orientation. They also assist in lowering the temperature at which the solid state orientation occurs. Lowering the temperature at which the solid state orientation occurs produces a film that is heat-shrinkable at a lower temperature. A lower shrink temperature is advantageous for the packaging of heat-sensitive products, because less heat is required to shrink the film tight against the product, thereby providing an attractive tight package appearance while exposing the heat-sensitive product to less heat during the heat shrinking of the film tight around the product.

It is believed that each of the four factors impair the crystallization of the semi-crystalline polyamide, which makes the extrudate easier to orient in the solid state. It has been found that this process also produces a heat-shrinkable film having a high total free shrink at 185° F. together with low haze and high clarity, in spite of the presence of a relatively high proportion of semi-crystalline polyamide in the resulting heat-shrinkable film 116.

FIG. 4 illustrates a one-step process for making the heat-shrinkable film. In the process of FIG. 4, all equipment and steps are the same as the two-step process of FIG. 1, except that the annular extrudate 104 is not wound up after irradiation and thereafter unwound before solid state orientation. Rather, annular extrudate 104 emerges from irradiation vault 96 and is then forwarded directly into hot water 108. Otherwise, all of the enumerated components of the process illustrated in FIG. 4 correspond with the components described above with reference to FIGS. 1, 2, and 3. While not illustrated, optional annealing rollers and cooling rollers be provided between nip rollers 116 and wind up roller 124.

Figure 5:
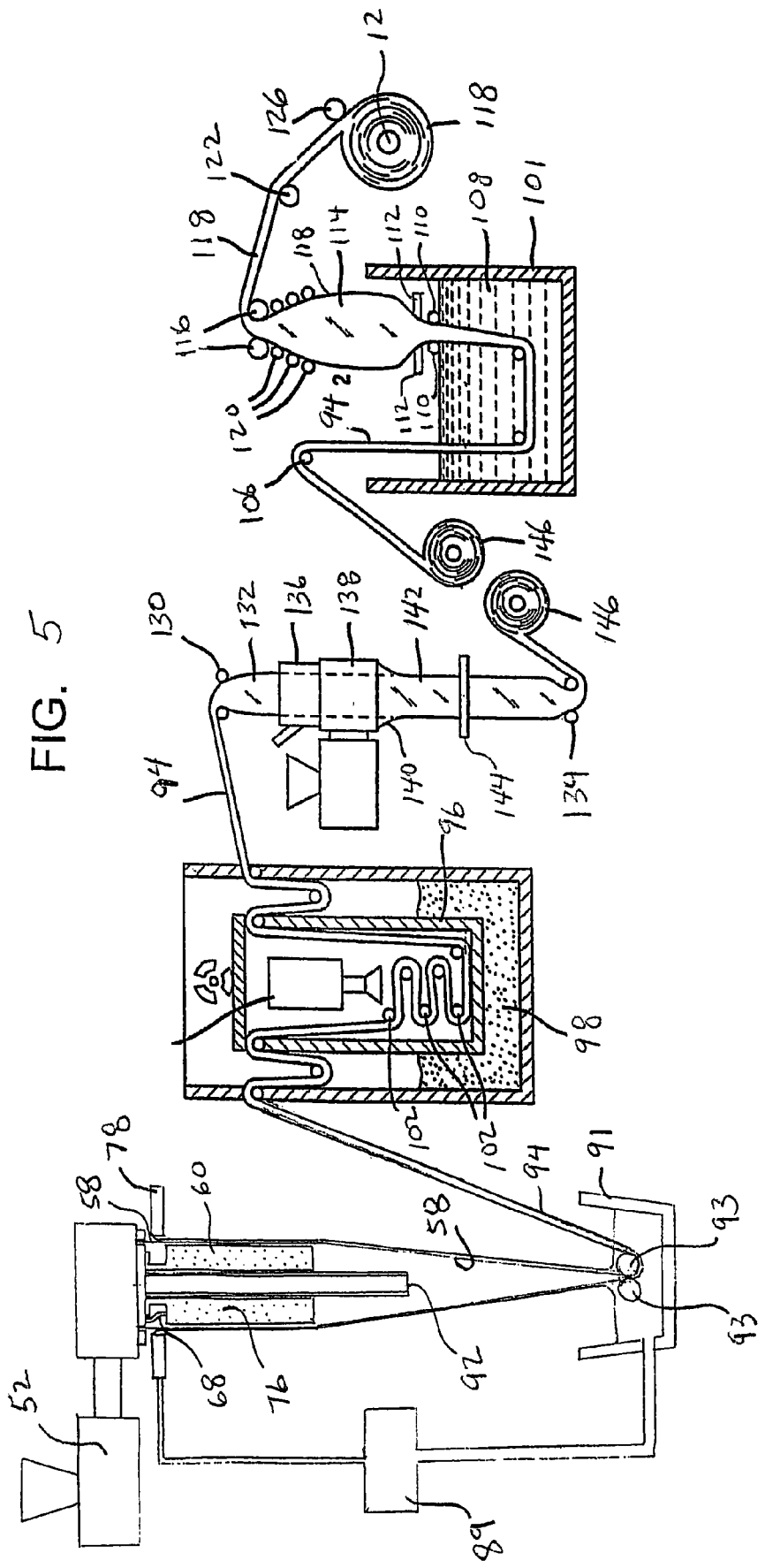
FIG. 5 is a schematic of a two-step process for producing an extrusion-coated, heat-shrinkable film as described herein.

FIG. 5 illustrates a two-step process for producing an extrusion-coated, heat-shrinkable film. In the process of FIG. 5, all equipment and steps are the same as the two-step process illustrated in FIGS. 1, 2, and 3 as described above, except that annular extrudate 58 serves as a substrate onto which one or more additional layers are extrusion coated with a coating of one or more film layers.

More particularly, after the optional irradiation of annular extrudate 58 (i.e., annular substrate 58), annular irradiated extrudate 94 (i.e., annular irradiated substrate 94) is directed to nip rollers 130 while in lay-flat configuration. Immediately downstream of nip rollers 130, annular irradiated substrate 94 is reconfigured from lay-flat configuration to round configuration by being directed around trapped air bubble 132 which extends from nip rollers 130 to nip rollers 134. The resulting round annular substrate 94 is then directed through vacuum chamber 136, immediately following which round annular substrate 94 is passed through extrusion coating die 138, which extrudes coating stream 140 over and around the outside surface of round annular substrate 94, resulting in round extrusion coated extrudate 142, which is then passed through and cooled by a second water ring 144 and thereafter forwarded through nip rollers 134 at which time round extrusion coated extrudate 142 is reconfigured into lay-flat configuration and wound up on roll 146. Second water ring 144 can be positioned from about 1 to 6 inches downstream of extrusion coating die 138, or from about 2 to 5 inches downstream of die 138. A stream of cool water (e.g., at 7.2° C., not illustrated) is emitted from second water ring 144, with this stream of cool water flowing onto the exterior surface of extrusion-coated tape 142, in order to rapidly quench the hot coating layers, particularly to retard crystallization of any semi-crystalline polyamide present in either the coating layers or the substrate layers.

Annular extrudate 94 is not significantly drawn (either longitudinally or transversely) as it is directed around trapped air bubble 132. The surface speed of downstream nip rollers 134 is about the same as the surface speed of upstream nip rollers 130. Furthermore, annular extrudate 94 is inflated only enough to provide a substantially circular tubing without significant transverse orientation, i.e., without transverse stretching. Further details of the above-described coating step are generally as set forth in U.S. Pat. No. 4,278,738, to BRAX et. al., above. Otherwise, all of the enumerated components of the process illustrated in FIG. 5 correspond with the components described above with reference to FIGS. 1, 2, and 3.

In the second step of the two-step process of FIG. 5, roll 146 is transported to a location for solid-state orientation, and is there unwound so that irradiated extrudate 94 passes into hot water 108 and is thereafter biaxially oriented (and optionally annealed) in the same manner as illustrated in FIGS. 1, 2A, 2B, and 3, described above. While not illustrated, annealing rollers and cooling rollers can optionally be provided between nip rollers 116 and wind up roller 124.

Figure 6:
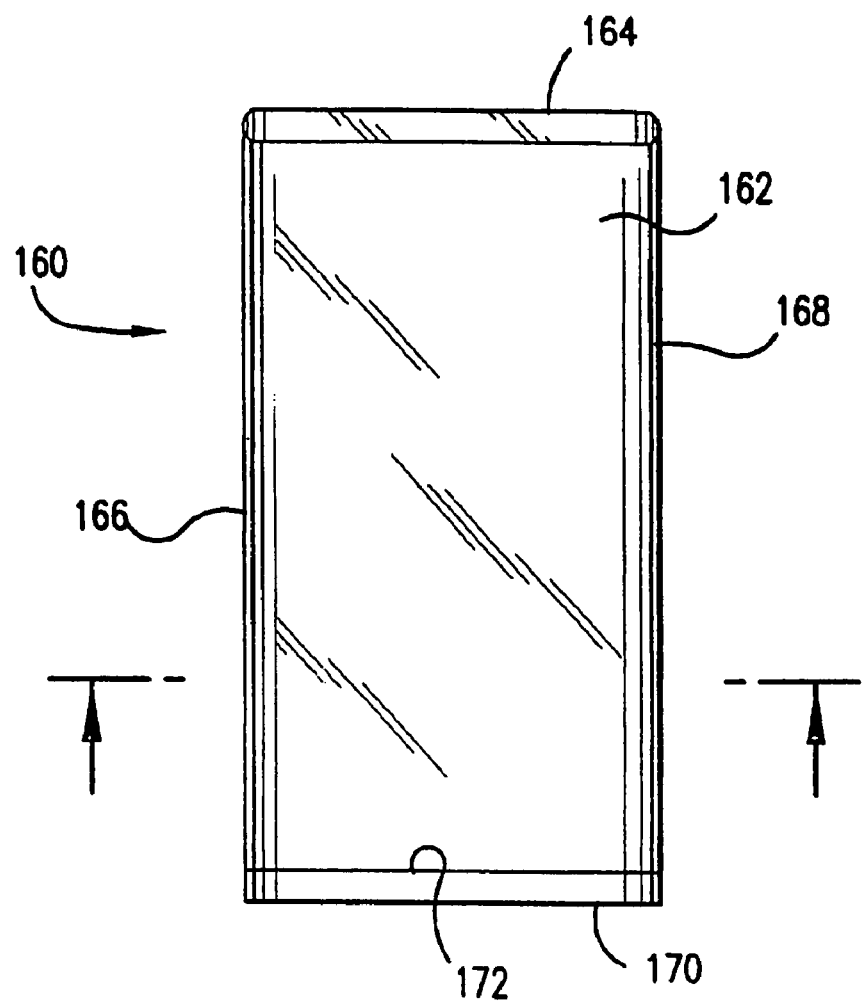
FIG. 6 is a schematic of an end-seal heat-shrinkable bag.
Figure 7:
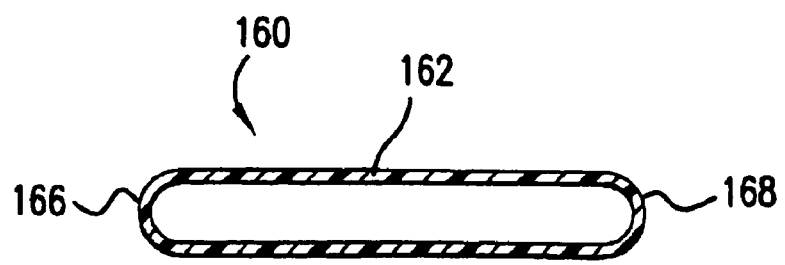
FIG. 7 is a longitudinal cross-sectional view of the end-seal bag of FIG. 6.

FIG. 6 is a schematic of a heat-shrinkable end-seal bag 160 in lay-flat configuration. End-seal bag 160 is made from the heat-shrinkable film. FIG. 7 is a cross-sectional view of bag 160 taken through section 7-7 of FIG. 6. Viewing FIGS. 6 and 7 together, bag 160 comprises bag film 162, top edge 164 defining an open top, first bag side edge 166, second bag side edge 168, bottom edge 170, and end seal 172.

Figure 8:
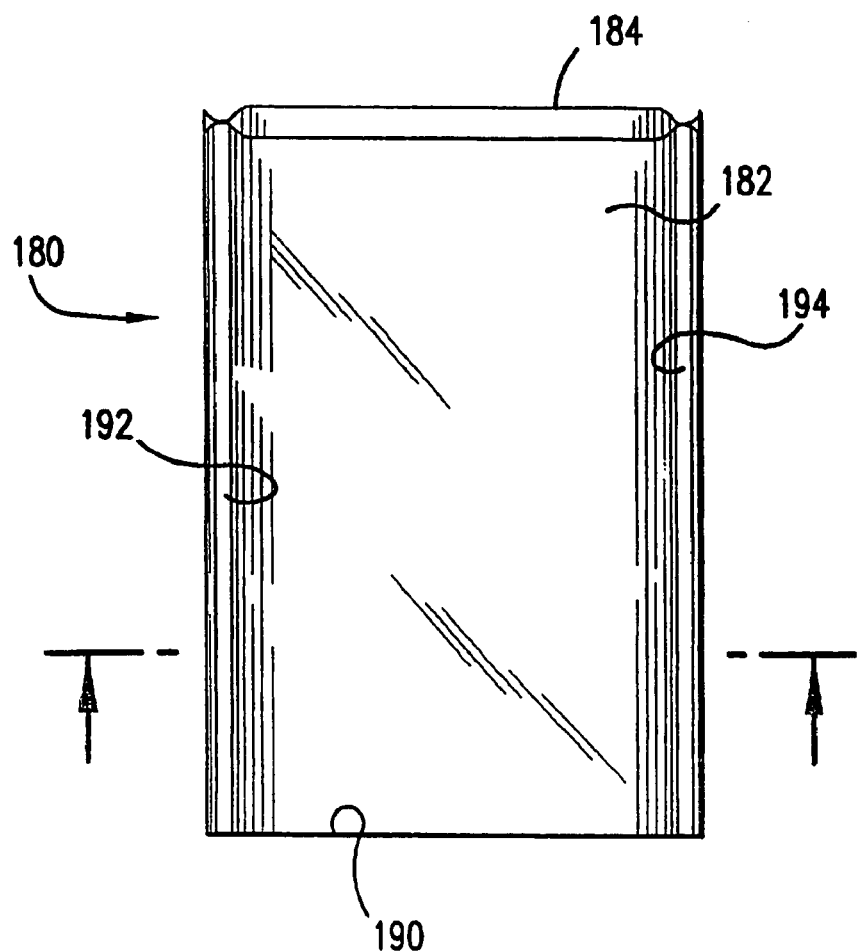
FIG. 8 is a schematic of a side-seal heat-shrinkable bag.
Figure 9:
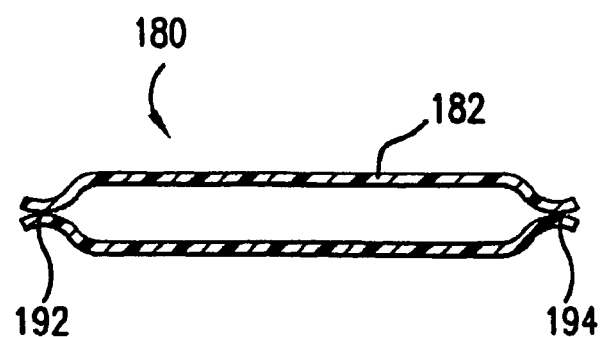
FIG. 9 is a transverse cross-sectional view of the side-seal bag of FIG. 8.

FIGS. 8 and 9 together illustrate heat-shrinkable side-seal bag 180 in lay-flat configuration. Side-seal bag 180 is made from the heat-shrinkable film. FIG. 9 is a cross-sectional view of bag 180 taken through section 9-9 of FIG. 8. Viewing FIGS. 8 and 9 together, side-seal bag 180 is made from bag film 182 which is heat sealed to itself. Side seal bag 180 has top edge 184 defining an open top, bottom edge 190, first side seal 192, and second side seal 194.

Although not illustrated, a heat-shrinkable pouch can be made from two separate pieces of film. Unlike the end-seal and side-seal bags described above, the pouch is made by heat sealing two separate pieces of film together, with the pouch having an open top, a first side seal, a second side seal, and a bottom seal.

In all of the examples below, unless otherwise indicated, the extrudate is to be (or was) quenched using a water ring that emitted a flow of water onto the extrudate, with the flow of water cascading down the extrudate. In these examples, approximately 100% of the water emitted by the water ring contacts (or contacted) the extrudate and cascades (or cascaded) down the extrudate for a distance of at least 24 inches.

RESINS UTILIZED IN THE EXAMPLES

Unless otherwise indicated, the following listing of resins identifies the various resins utilized in Examples 1-65 below. Examples 66-76 have additional tables designating the resins used therein.

| Resin code | Tradename | Generic Resin Name {additional information} | Density (g/cc) | Melt Index (dg/min) | Supplier |
| --- | --- | --- | --- | --- | --- |
| IONOMER | Surlyn ® AM7927 | Zinc neutralized ethylene methacrylic acid copolymer + polyamide | 0.980 | 11.5 | DuPont |
| SSPE 1 | Affinity ® 1280G | Homogeneous ethylene/alpha-olefin copolymer | 0.900 | 6.0 | Dow |
| SSPE 2 | Affinity ® 1880G | Homogeneous ethylene/alpha-olefin copolymer | 0.900 | 3.0 | Dow |
| SSPE 3 | Affinity ® EG 8150G | Homogeneous ethylene/octene copolymer | 0.868 | 0.5 | Dow |
| SSPE 4 | Affinity ® EG 8100G | Homogeneous ethylene/octene copolymer | 0.870 g/cc | 0.99 | Dow |
| SSPE5 | Marflex ® D143LP | Homogeneous ethylene/hexane copolymer | 0.916 | 1.3 | Chevron Phillips Chemical |
| VLDPE 1 | Exceed ® 1012 | Very low density polyethylene | 0.912 | 1.0 | Exxon Mobil |
| VLDPE 2 | XUS 61520.15L | Very low density polyethylene | 0.903 | 0.5 | Dow |
| VLDPE 3 | Attane ® 4203 | Very low density polyethylene | 0.905 | 0.80 | Dow |
| VLDPE 4 | Attane ® 4404G | Very low density polyethylene | 0.904 | 3.91 | Dow |
| VLDPE 5 | Rexell ® V3401 | Very low density polyethylene | 0.915 | 6.6 | Huntsman |
| VLDPE 6 | ECD 364 | VLDPE (ethylene/hexene copolymer) | 0.912 | 1.0 | ExxonMobil |
| LLDPE 1 | Dowlex ® 2045.03 | Linear Low Density Polyethylene | 0.920 | 1.0 | Dow |
| LLDPE 2 | Ingenia ® 1062 | amide wax in linear low density polyethylene | 0.92 | 2 | Ingenia Polymers |

-continued

| Resin code | Tradename | Generic Resin Name {additional information} | Density (g/cc) | Melt Index (dg/min) | Supplier |
|---|---|---|---|---|---|
| LLDPE 3 | Exceed ® 4518 | Linear low density polyethylene | 0.918 | 4.5 | Exxon Mobil |
| LMDPE 1 | Dowlex ® 2037 | heterogeneous ethylene/octene copolymer | 0.935 | 2.5 | Dow |
| PBTYL | PB8640M | Polybutylene | 0.908 | 1.0 | Basell Polyolefins |
| MA-LLD 1 | Tymor ® 1203 | Maleic anhydride modified polyethylene {blended with linear low density polyethylene} | 0.906 | 1.7 | Rohm & Haas |
| MA-LLD 2 | PX 3227 | Maleic anhydride modified polyethylene {blended with linear low density polyethylene} | 0.913 | 1.7 | Equistar Division of Lyondell |
| MA-EVA 1 | Plexar ® PX1007 | Maleic Anhydride-Modified Ethylene/Vinyl Acetate Copolymer | 0.930 | 3.2 | Equistar, Division of Lyondell |
| MA-EVA 2 | Bynel ® 3861 | Maleic Anhydride-Modified Ethylene/Vinyl Acetate Copolymer | 0.980 | 2.0 | DuPont |
| MA-EMA | Bynel ® 2174 | Maleic Anhydride-Modified Ethylene/Methyl Acrylate Copolymer | 0.931 | 2.8 | DuPont |
| Nylon 1 | Ultramid ® B40 | Polyamide 6 | 1.13 | — | BASF |
| Nylon 2 | Selar ® 3426 | amorphous polyamide | 1.19 | — | Dupont |
| Nylon 3 | Ultramid ® B50 | Polyamide 6 | 1.13 | — | BASF |
| Nylon 4 | Grilon ® CF6S | Polyamide 6/12 | 1.05 | 5.75 | EMS-Grivory |
| Nylon 5 | Grilon ® CR9 | Polyamide 6/12 | 1.12 | — | EMS-Grivory |
| Nylon 6 | Grilon ® BM13 SBGX | Polyamide 6/69 | 1.09 | — | EMS-Grivory |
| Nylon 7 | Ultramid ® C40 L01 | Polyamide 6/66 | 1.12 | — | BASF |
| Nylon 8 | Pebax ® mP1878 | Polyamide | 1.14 | — | Arkema |
| Nylon 9 | Ultramid ® B40LN01 | Polyamide 6 | 1.14 | — | BASF |
| Nylon 10 | Grivory ® HB5299 Natural | Polyamide MXD6/MXD1 | 1.2 g/cc | 50.0 | EMS-Grivory |
| Nylon 11 | MXD6 S6121 | Polyamide MXD6 | 1.22 | 0.5 | Mitsubishi Polyester |
| Nylon 12 | Ultramid ® C33 01 | Polyamide 6/66 | 1.13 | — | BASF |
| Nylon 13 | Grivory ® G21 Natural | Amorphous polyamide | 1.18 | — | EMS-Grivory |
| Nylon 14 | Vydyne ® 65A | Polyamide 66 | 1.14 | — | Solutia |
| Nylon 15 | Ultramid ® B40LN01 | Polyamide 6 | 1.14 | — | BASF |
| Nylon 16 | Grilon ® BM 20 SBG Natural | Polyamide 66/610 | 1.09 | — | EMS-Grivory |
| Nylon 17 | Ultramid ® B33 01 | Polyamide 6 | 1.14 | — | BASF |
| Nylon 18 | UBE 6434B | Polyamide 6/66/12 copolymer | 1.14 | — | UBE |
| Nylon 19 | MXD6 S6011 | Polyamide MXD6 | 1.22 | 2 | Mitsubishi Polyester |
| PET | PET12822 | Polyethylene terephthalate | 1.40 | — | Eastman Chemicals |
| PETG | PETG 6763 | Polyethylene terephthalate/glycol | 1.27 | 2.8 | Eastman Chemical |
| EVA 1 | Escorene ® LD 713.93 | Ethylene/vinyl acetate copolymer (14.4% VA) | 0.933 | 3.5 | Exxon Mobil |
| EVA 2 | PE 1651 | Ethylene/vinyl acetate copolymer (6.5% VA) | 0.928 | 0.5 | Huntsman |
| EVA 3 | Elvax ® 3128 | ethylene/vinyl acetate copolymer (8.9% VA) | 0.928 | 2.0 | Exxon Mobil |

-continued

| Resin code | Tradename | Generic Resin Name {additional information} | Density (g/cc) | Melt Index (dg/min) | Supplier |
|---|---|---|---|---|---|
| EVA 4 | Escorene ® LD 761.36 | Ethylene/vinyl acetate copolymer (26.7% VA) | 0.950 | 5.75 | Exxon Mobil |
| EVA 5 | Escorene ® LD 705.MJ | Ethylene/vinyl acetate copolymer (12.8% VA) | 0.935 | 0.4 | Exxon Mobil |
| EMA 1 | EVAC SP 1305 | Ethylene/methyl acrylate copolymer | 0.944 | 2 | Eastman Chemical |
| PU-A | Purethane ® A-1078 CVAC and C-CAT 104 | Solventless polyurethane two part mixture (adhesive) | 1.03 | — | Ashland Chemical |
| EVOH 1 | Eval ® LC-E105A | Saponified ethylene/vinyl acetate copolymer {44 mol % ethylene} | 1.14 | 5.5 | Evalca/Kuraray |
| EVOH 2 | EVAL ® L171B | Hydrolyzed ethylene vinyl acetate copolymer (EVOH with 27 mol % ethylene) | 1.20 | 3.9 | Evalca/Kuraray |
| PVdC | Saran ® 806 | Vinylidene chloride/methyl acrylate copolymer | 1.69 | — | Dow |
| ELAS 1 | Kraton ® G 1657 | Styrene-butadiene elastomer | — | — | Kraton Polymers |
| ELAS 2 | Kraton ® FG1901X | Styrene copolymer | 1.01 | 2.0 | Kraton Polymers |
| STBL 1 | NA 189 | Copper iodide based stabilizer | 1.13 | — | Solutia |
| AB&S | Grilon ® MB 3361 FS Natural | Antiblock and slip in polyamide 6 | 1.14 | — | EMS-Grivory |
| SLIP | MB50-11 | Polydimethylsiloxane in polyamide 6 | 1.05 | — | Dow Corning |

Example 1

A coextruded multilayer heat-shrinkable film was produced utilizing the apparatus and process set forth in FIG. 1, described above. The multilayer film had a total of 7 layers, in the following order, with the thickness of each layer of the tape (i.e., prior to solid state orientation) shown in mils being indicated below the layer identity and resin composition identification:

Example 1

| Sealant | Tie | Core 90% Nylon 1 10% Nylon 2 | Barrier | Core 90% Nylon 1 10% Nylon 2 | Tie | Outer |
|---|---|---|---|---|---|---|
| VLDPE 1 | MA-LLD1 | | EVOH 1 | | MA-LLD1 | VLDPE 1 |
| 5 mils | 1 mil | 4 mils | 1 mil | 4 mils | 1 mil | 5 mils |

The extrudate was cast from an annular die (diameter of 12.7 cm), over an air shoe, and was rapidly quenched by 7.2° C. water emitted from a water ring positioned about 57 mm below the die. The air shoe had an outside diameter of 8 cm and a length of 32 cm, and emitted cool air (15.6° C.) through 0.762 mm diameter holes spaced over the cylindrical surface of the air shoe, the holes being spaced apart by a distance of 14.3 mm, with the holes being arranged so that each hole inside the matrix of holes were surrounded by 6 holes. The airflow through the holes supported the film (so that it did not collapse) and cooled the film from the inside out, i.e., to assist in "freezing" the nylon quickly to minimize crystallization of the nylon. The pressure between the air shoe and the film was slightly above atmospheric pressure (i.e., about 780 mm Hg).

The cool air was pumped into the hollow air shoe and out the holes, with the air then flowing down beneath the air shoe and then up and out through a passageway through the center of the air shoe.

Although the air shoe assisted in freezing the nylon to minimize crystal formation, most of the heat in the extrudate was removed by contact with the cool water (7.2° C.) emitted from the water ring, which was positioned approximately 57 mm below the annular die. The resulting unirradiated, quenched tape was wound up onto a reel and transported to another location for solid state orientation. The quenched tape was unwound from the roll and forwarded into a hot bath heated to a temperature of 82° C. The tape remained in the hot bath for a period of 2 seconds, following which the heated tape was immediately forwarded through a lower set of nip rollers followed by an upper set of nip rollers, with the distance between the upper and lower sets of nip rollers being about 1.8 meters. Between the upper and lower sets of nip rollers, the tape was subjected to and solid state biaxial orientation. Orientation was produced by inflating the tape with a trapped bubble of air between the sets of nip rollers, i.e., passing the reheated extrudate over a trapped bubble of air while simultaneously drawing the reheated extrudate in its longitudinal direction. Additional orientation was provided by running the lower set of nip rollers at a surface speed of 15 meters per minute, and the upper set of nip rollers at a surface speed of 42 meters per minute. The result was 2.6× orientation in the transverse direction and 3.0× orientation in the machine direction, for a total biaxial orientation of 7.8×. The resulting heat-shrinkable film had a total thickness of 3.9 mils. The table below provides values for various properties of the film of Example 1.

| Film of Example No. | % free shrink at 185° F. (L + T) | Transparency (%) | Haze (%) | Gloss (%) |
|---|---|---|---|---|
| 1 | 40 | 50.2 | 2.8 | 87 |

As can be seen in the table above, the film of Example 1 exhibited low haze and high transparency. In the film of Example 1, the percent transparency was greater than or equal to 5.33 (% haze)−31.5.

Example 2

The film of Example 2 was prepared in a manner similar to the preparation of the film of Example 1, described above. The film of Example 2 also had a total of 7 layers, in the following order, with the thickness of each layer of the tape (i.e., prior to solid state orientation) shown in mils being indicated below the layer identity and resin composition:

Example 2

| Sealant LLDPE 3 | Tie MA-LLD2 | Core 90% Nylon 1 10% Nylon 2 | Barrier EVOH 1 | Core 90% Nylon 1 10% Nylon 2 | Tie MA-LLD2 | Outer LLDPE 3 |
|---|---|---|---|---|---|---|
| 5 mils | 1 mil | 3 mils | 1 mil | 3 mils | 1 mil | 5 mils |

The process of making the film of Example 2 was generally as carried out for the production of the film of Example 1. More particularly, the following parameters were employed:

| | | | |
|---|---|---|---|
| Die diameter | 12.7 Cm | Total extrudate thickness | 19 mils |
| Air shoe outside diameter: | 8 cm | Air shoe length: | 32 cm |
| Temperature of air emitted from air shoe | 15.6° C. | Air shoe hole diameter | 0.762 mm |
| Distance between holes of air shoe | 14.3 mm | Position of Water Ring | 57 mm below die |
| Water temperature emitted from water ring | 7.2° C. | Position of water contact with extrudate | 57 mm below die |
| Hot bath temperature | 83° C. | immersion time in hot bath | 2.5 seconds |
| distance between upper and lower nip rollers | 1.9 meters | surface speed of nip rollers below trapped bubble | 15.8 m/min |
| surface speed of nip rollers above trapped bubble | 51.8 m/min | orientation factor in machine direction | 2.4 X |
| orientation factor in transverse direction | 3.3 X | Total biaxial orientation | 7.9 X |
| Total thickness of heat-shrinkable film | 2.3 mils | Number of annealing rollers | 4 |
| Diameter of annealing rollers | 6 inches | Degree of wrap around each annealing roller | 120 degrees |
| Surface temperature of annealing rollers | 57° C. | Surface speed of annealing rollers | 51 m/min |

The film of Example 2 had a total thickness of 2.35 mils, exhibited a Haze of 23.6 percent, a Transparency of 5.8 percent, and a Gloss of 34 percent, and a total free shrink at 185° F. of 34% in the longitudinal direction (i.e., the machine direction) and 30% in the transverse direction. Although this film was quenched, reheated, and oriented in a manner similar to the production of the film of Example 1, it exhibited relatively poor optical properties because the outer film layers were made from 100% LLDPE3, which had a density of 0.918 g/cm³. The relatively high density of this outer layer polymer is believed to be the reason for the poor optical characteristics exhibited by the film of Example 2.

Example 3

The film of Example 3 was prepared in a manner similar to the preparation of the film of Example 2, described above. The film of Example 3 also had a total of 7 layers, in the following order, with the target thickness of each layer of the tape (i.e., the intended thickness of each layer of the tape, using the process design setup) shown in mils being indicated below the layer identity and resin composition:

Example #3

| Sealant | Tie | Core 90% Nylon 3 10% Nylon 2 | Barrier | Core 90% Nylon 3 10% Nylon 2 | Tie | Outer |
|---|---|---|---|---|---|---|
| LLDPE 2 | MA-LLD1 | | EVOH 1 | | MA-LLD1 | LLDPE 2 |
| 5 mils | 1 mil | 4 mils | 1 mil | 4 mils | 1 mil | 5 mils |

The heat-shrinkable film of Example 3 was produced at three target gauges: 2.5 mil, 3.0 mil, and 3.5 mil. In the production of the film of Example 3, parameters employed were as set forth in the parameters table in Example 2, except as follows:

| | | | |
|---|---|---|---|
| Total Extrudate Thickness | 23 mils | Hot Bath Temperature | 76° C. |
| Surface Speed of Nip Rollers Below Trapped Bubble | 12.8 m/min | Surface Speed of Nip Rollers Above Trapped Bubble | 36.6 m/min |
| orientation factor in transverse direction | 2.8 X | orientation factor in longitudinal direction | 2.9 X |
| Total Biaxial Orientation | 8.1 X | Total thickness of heat-shrinkable film (i.e., one of the three films produced) | 3.3 mils |
| Surface speed of annealing rollers | 34.4 m/min | | |

While the haze and transparency of the heat-shrinkable films produced in Example 3 were not measured, the film appeared to exhibit low haze and high transparency, i.e., a haze low enough, and a transparency high enough, that the percent transparency would have measured as being greater than or equal to 5.33 (% haze)−31.5. However, the film was allowed to relax and wrinkle over time without the haze and transparency being measured, with the wrinkling interfering with any attempt to measure these optical values.

Comparative Example 1

The film of Comparative Example 1 was prepared in a manner similar to the preparation of the film of Examples 1-3, except that the film of Comparative Example 1 was prepared using and extrusion coating process as illustrated in FIG. 5, described above. The sealant layer, substrate core layer, and first tie layer were coextruded as a "substrate", and thereafter irradiated, following which the barrier layer, second tie layer, coating core layer, and outer layers were extrusion coated onto the substrate. The film of Comparative Example 1 also had a total of 7 layers, in the following order, with the thickness of each layer of the tape (i.e., prior to solid state orientation) shown in mils being indicated below the layer identity and resin composition:

Comparative Example 1

| Sealant<br>90% SSPE1<br>10% LLDPE2 | Substrate core<br>80% VLDPE2<br>20% VLDPE1 | Tie<br>EVA1 | Barrier<br>PVdC | Tie<br>EVA1 | Coating Core<br>80% VLDPE2<br>20% VLDPE1 | Outer<br>80% SSPE2<br>20% LLDPE1 |
|---|---|---|---|---|---|---|
| 5 mils | 14 mils | 1 mil | 2 mils | 1 mil | 3 mils | 2 mils |

In the preparation of the film of Comparative Example 1, the water ring was located approximately 102 mm below the die, and the quenching water temperature was 7.2° C. No air shoe was utilized below the die in the preparation of the film of Comparative Example 1. Extremely rapid quenching of the extrudate emerging from the die was not needed because the film of Comparative Example 1 was ethylene-based, i.e., contained no crystalline polyamide.

The quenched, partially-irradiated, extrusion coated tape was then immersed in a hot bath at a temperature of 93° C. for a period of 4 seconds, following which the softened tape was biaxially oriented 3.4× in the machine direction and 3.6× in the transverse direction (total orientation 12.2×) using the trapped bubble method. The resulting heat shrinkable film had a total thickness of 2.7 mils. As the film was stable upon being wound onto a core, there was no need to anneal the film.

Comparative Example 2

The film of Comparative Example 2 was fully coextruded in a manner similar to the preparation of the film of Examples 1-3. However, the film of Comparative Example 2 was made using the water ring as in Comparative Example 1, and no air shoe was used in the preparation of Comparative Example 2. The film of Comparative Example 2 also had a total of 7 layers, in the following order, with the thickness of each layer of the tape (i.e., prior to solid state orientation) shown in mils being indicated below the layer identity and resin composition:

Comparative Example 2

| Sealant<br>LLDPE3 | Core<br>VLDPE3 | Tie<br>MA-<br>LLD2 | Barrier<br>EVOH | Tie<br>MA-<br>LLD2 | Core<br>EVA2 | Outer<br>VLDPE4 |
|---|---|---|---|---|---|---|
| 4 mils | 5 mils | 1 mil | 1 mil | 1 mil | 6 mils | 2 mils |

In the preparation of the film of Comparative Example 2, the water ring was located approximately 100 mm below the die, and the quenching water temperature was 7.2° C. As with the film of Comparative Example 1, in the process utilized to prepare the film of Comparative Example 2, extremely rapid quenching of the extrudate emerging from the die was not needed because the film of Comparative Example 2 was ethylene-based, i.e., contained no crystalline polyamide.

The quenched coextruded tape was then immersed in a hot bath at a temperature of 95° C. for a period of 4 seconds, following which the softened tape was biaxially oriented 3.0× in the machine direction and 3.3× in the transverse direction (total orientation 9.9×) using the trapped bubble method. The resulting heat shrinkable film had a total thickness of 2.3 mils. As the film was stable upon being wound onto a core, there was no need to anneal the film.

Comparative Example 3

Bag with Adhered Patch

The four layer bag film of Comparative Example 3 was produced using an extrusion coating process in a manner similar to the preparation of the film of Comparative Example 1. The sealant layer and the substrate core layer were coextruded as the "substrate", and thereafter irradiated, following which the barrier layer and abuse layer were coated thereon using an extrusion coating die. As with the first two comparative examples above, the water ring was located approximately 100 mm below the die, and the quenching water temperature was 7.2° C., and no air shoe was used in the preparation of Comparative Example 2. The patch and bag films together had a total of 8 layers (or 9 layers, if each of the two 4 mil self-weld layers adhered to one another are considered to be two layers rather than the one 8-mil layer listed in the table below), in the following order, with the thickness of each layer of the tape (i.e., prior to solid state orientation) shown in mils being indicated below the layer identity and resin composition:

Comparative Example 3: Patch Bag with Bag Film Adhered to Patch Film
(Film Layer Thicknesses represent the tape thickness)

| Bag Film<br>Sealant<br>Layer<br>VLDPE5 | Bag Film<br>Substrate<br>core layer<br>EVA4 | Bag<br>Film<br>Barrier<br>Layer<br>PVdC | Bag<br>Film<br>Outer<br>Abuse<br>Layer<br>EVA4 | Adhesive<br>Between<br>bag and<br>patch<br>PU-A | Patch<br>Film<br>Abuse and<br>Shrink<br>Layer<br>VLDPE5 | Patch film<br>Self Weld<br>Layer<br>EVA3 | Patch<br>Film<br>Abuse and<br>Shrink<br>Layer<br>VLDPE5 |
|---|---|---|---|---|---|---|---|
| 3 mils | 15 mils | 2 mils | 7 mils | 1 mils | 22 mils | 8 mils | 22 mils |

The quenched, partially irradiated, four-layer extrusion-coated bag film tape was then immersed in a hot bath at a temperature of 92° C. for a period of 4 seconds, following which the softened tape was biaxially oriented 3.4× in the machine direction and 4.0× in the transverse direction (total orientation 13.6×) using the trapped bubble method. The resulting heat shrinkable bag film had a total thickness of 2.4 mils. As the film was stable upon being wound onto a core, there was no need to anneal the film. This four-layer, extrusion coated, 2.4 mi, heat-shrinkable film was used to make an end-seal bag, to which a multilayer patch film was applied.

The multilayer heat-shrinkable patch film was prepared by fully coextruding a two-layer, 50 mil thick, annular tape that was biaxially oriented (3.7× in the machine direction, 3.6× in the transverse direction) and thereafter self-welded to form a three layer heat-shrinkable patch film having a thickness of 4.5 mils. The tape was composed of outer abuse and shrink layers composed of 100% LLDPE4, and an inner self welded layer composed of 100% EVA3, as shown in the table above. The patch film was prepared using a process as illustrated in FIG. 1, except that the water ring was located approximately 110 mm below the die, and the quenching water temperature was 7.2° C.

Comparison of Film of Example 3 with Films of Comparative Examples 1-3

The film of Example 3 (at a total gauge of 2.5 mils, 3.0 mils, and 3.5 mils), and the films of Comparative Examples 1, 2, and 3, were each tested for impact strength, energy-to-break, and total free shrink at 185° F. The results were as follows:

| Film of | Total Thickness (mils, target thickness) | ITR Impact, (Newtons) (ASTM D 3763) | Energy to Break (Joules) (ASTM D 3763) | Total Free Shrink (L + T at 185° F.) |
|---|---|---|---|---|
| Example 3 | 2.5 | 432 | 5.5 | 62 |
| Example 3 | 3.0 | 465 | 6.6 | 61 |
| Example 3 | 3.5 | 489 | 7.5 | 65 |
| Comparative Example 1 | 2.7 | 390 | 6.7 | 60 |
| Comparative Example 2 | 2.3 | 169 | 1.9 | 56 |
| Comparative Example 3 (patch bag) | 7.4 | — | — | 32 |

These results show the improvement in impact strength of the inventive materials over comparable polyethylene-based films. While the patch bag had the highest impact strength, it was at least twice as thick as the other examples, and it did not exhibit the high shrink of the nylon-based films of Example 3.

End-seal bags were made from the three films made in accordance with Example 3, as set forth in the table above. Again, the first film had a thickness of 2.5 mils, the second had a thickness of 3.0 mils, and a third film had a thickness of 3.5 mils. End-seal bags were also made using the films of Comparative Example 1, as well as a patch bag made using the patch-bag laminate of Comparative Example 3.

Fifty end-seal bags made from each film were tested by first loading the bags with nylon pellets and placed in a box and subjected to a shipping test that was intended to simulate packaged product being shipped across the United States in the trailer of a tractor trailer truck. Four hours on the testing apparatus was intended to simulate a twelve hour road trip, while eight hours is intended was intended to simulate a 24 hour trip. In the final test, the force that was exerted on the boxes during shaking was turned up from 0.2 Gs to 0.7 Gs in an effort to produce failures in the patch bag package utilizing the patch bag of Comparative Example 3. The results obtained revealed that the packages made using the three films in accordance with Example 3 performed much better than packages made from the film of Comparative Example 1, and almost as well as the packages made from the patch bags of Comparative Example 3. However, the 2.5, 3.0, and 3.5 mil films used in the test of the film according to Example 3 had a thickness only about 50% of the total gauge of the patch bag of Comparative Example 3 (i.e., 7.0 mils). The following test results were obtained from the bags:

| | Total Thickness (mils, target thickness) | Shipping Test (% Leakers 4 hrs) | Shipping Test (% Leakers 8 hrs) | Shipping Test (% Leakers .7G) |
|---|---|---|---|---|
| Example 3 | 2.5 | 10 | 55 | 80 |
| Example 3 | 3.0 | 5 | 30 | 70 |
| Example 3 | 3.5 | 5 | 30 | 60 |
| Comparative Example 1 | 2.7 | 95 | 100 | 100 |
| Comparative Example 3 (patch bag) | 7.0 | 0 | 0 | 50 |

Examples 4-25

Twenty-two different multilayer heat-shrinkable films were produced utilizing the apparatus and process set, forth in FIG. 1, described above. The multilayer films each had a total of 7 layers, in the following order, with the thickness of each layer of the tape (i.e., prior to solid state orientation) shown in mils being indicated below the layer identity:

| VLDPE 6 | MA-LLD 1 | Nylon Core (variable) | EVOH 1 | Nylon Core (variable) | MA-LLD 1 | VLDPE 6 |
|---|---|---|---|---|---|---|
| 4 mils | 1 mil | 6 mils | 1 mil | 6 mils | 1 mil | 4 mils |

Before solid-state orientation, the extrudate (i.e., tape) had a thickness of about 23 mils and a lay-flat width of about 5 inches. The tape for each of Examples 4-25 examples had the same actual and relative layer thicknesses as set forth above. Moreover, the polymeric composition of the outer layers, the tie layers, and the barrier layer were kept the same in each of the films of Examples 4-25, and are as identified in the resin table above.

The only compositional variation between the various films was the difference in the composition of the two nylon core layers. For each of the films of Examples 4-25, the core layers were of identical composition. However, each film had a different core layer composition, relative to the other films. Many of the nylon core layers in the films of Examples 4-25 contain a blend of a first polyamide present in a dominant proportion with a secondary component in a subservient proportion. The secondary component is present for the purpose of "interrupting" the crystallinity of the dominant polyamide.

In the process, the extrudate emerged from the die with a diameter of 5 inches. The process utilized an air shoe having a diameter of 3.26 inches and a length of 16 inches. The upstream end of the air shoe was located approximately 2 inches downstream of the point at which the extrudate emerged from the die. The air inside the air shoe was at a temperature of 60° F. The air shoe had air passageway holes with a diameter of 0.762 mm, the holes being spaced apart by a distance of 14.3 mm, the holes being in a pattern so that each interior hole was surrounded by 6 holes spaced at an equal distance therefrom. The holes were evenly distributed over the outer surface of the air shoe. The air shoe had an outer surface roughened with 80 grit sandpaper. This roughness lowered the friction in the event the extrudate came into contact with the surface of the air shoe. The extrudate emerging from the die remained spaced from the surface of the air shoe due to the flow of air out of the air shoe. The airflow out of the air shoe passed between the extrudate and the air shoe, and thereafter passed downward and then out through a pipe positioned through the center of the air shoe, the pipe allowing the air passing therethrough to pass through the die stack and into the open atmosphere. The pressure around the outside of the extrudate was ambient pressure.

A single water ring having an inside diameter of 102 mm was mounted 57 mm below the point at which the extrudate emerged from the die. A stream of water emerged from the annular slit in the water ring, this slit having a width of 2.0 millimeters. The water emitted from the water ring had a temperature of 45° F. The annular stream of water emitted from the water ring contacted the extrudate at a position 57 mm downstream of the point at which the extrudate emerged from the die.

Each of the tapes in Examples 4-25 was oriented by being immersed in water at a temperature of 155° F. or 165° F. for a period of about 2 seconds, depending upon the particular example. This heating step was carried out immediately before the tape entered a set of nip rolls at the base of a trapped bubble. The combination of the amount of air in the trapped bubble of air, the length of the trapped bubble (dictated by the distance between the upper lower nip rollers and the upper nip rollers), and the difference in the surface speeds of the lower and upper nip rollers, was designed so that the heated tape underwent an orientation of 3.0× in the transverse direction and 2.25× in the machine direction. The heated tape passed through the lower nip rollers at a speed of approximately 65 feet per minute. The total orientation was approximately 6.75×. While the thickness of the tape was about 23 mils, the thickness of the resulting solid-state oriented heat-shrinkable film was about 4 mils. The heat-shrinkable film was then annealed at a temperature of 135° F. or 145° F. (depending upon the example) for a period of about 2 seconds, by passing the film around 4 annealing rollers each having a diameter of 6 inches, with the oriented film passing about 120 degrees around each of the annealing rollers, at a speed of about 120 feet per minute. The annealing step stabilized the film so that it could be wound up on a core without crushing the core, and so that the resulting roll was flat in appearance.

Table 1, below, provides the core layer composition for each of the 22 films, as well as the percent total free shrink at 185° F. for each of the films, and comments regarding the appearance and processing of each film.

| Film of Ex. No. | Composition of the Nylon Core Layers | % Total Free Shrink at 185° F. (85° C.) | % Haze | % Transparency | Is % Transparency ≧ 5.33 (% Haze) − 31.5? |
|---|---|---|---|---|---|
| 4 | 90% Nylon 1<br>10% Nylon 2 | 63 | 9.7 | 12.7 | NO |
| 5 | 97% Nylon 1<br>3% Nylon 2 | 51 | 3.5 | 33.2 | YES |
| 6 | 100% Nylon 1 | DNA | 8.7 | 16 | YES |
| 7 | 95% Nylon 1<br>5% Nylon 4 | DNA | DNA | DNA | DNA |
| 8 | 95% Nylon 1<br>5% EVOH 1 | 69 | 15 | 7.9 | NO* |
| 9 | 95% Nylon 1<br>5% EVOH 2 | 69 | 17.2 | 1.6 | NO* |
| 10 | 95% Nylon 1<br>5% Nylon 5 | 63 | 14 | 6.3 | NO* |
| 11 | 95% Nylon 1<br>5% Nylon 6 | 62 | 4.3 | 9 | YES |
| 12 | 95% Nylon 1<br>5% Nylon 3 | 60 | DNA | DNA | DNA |
| 13 | 95% Nylon 1<br>5% Nylon 7 | 66 | 17 | 8.1 | NO* |

-continued

| Film of Ex. No. | Composition of the Nylon Core Layers | % Total Free Shrink at 185° F. (85° C.) | % Haze | % Transparency | Is % Transparency ≧ 5.33 (% Haze) − 31.5? |
|---|---|---|---|---|---|
| 14 | 95% Nylon 1 5% Nylon 18 | DNA | 15 | 4.2 | NO* |
| 15 | 95% Nylon 1 5% Ionomer | DNA | 6.7 | 36.7 | YES |
| 16 | 95% Nylon 1 5% EMA 1 | DNA | DNA | DNA | NO** |
| 17 | 95% Nylon 1 5% PETG | 55 | 25.2 | 11.7 | NO* |
| 18 | 95% Nylon 1 5% ELAS 1 | DNA | DNA | DNA | NO** |
| 19 | 95% Nylon 1 5% ELAS 2 | DNA | DNA | DNA | NO** |
| 20 | 95% Nylon 1 5% Nylon 8 | 60 | 19.4 | 19.3 | NO* |
| 21 | 95% Nylon 1 5% PET | DNA | DNA | DNA | DNA |
| 22 | 95% Nylon 1 5% PBTYL | DNA | DNA | DNA | DNA |
| 23 | 95% Nylon 1 5% SSPE 3 | DNA | DNA | DNA | NO** |
| 24 | 95% Nylon 1 5% LLDPE 1 | DNA | DNA | DNA | NO** |
| 25 | 100% Nylon 9 | DNA | DNA | DNA | NO** |

NO* = While the transparency was measured as being not greater than or equal to 5.33 (% haze) − 31.5, the optical measurements were not accurate because the films samples were allowed to relax and become wrinkled, which interfered with the optical testing; testing on fresh, flat films would provide accurate results which. The visual appearance of most, if not all of these samples, indicated that if the flat films were tested, the results would have been that the % transparency would have been greater than or equal to 5.33 (% haze) − 31.5.
NO** = A manual visual estimation made that % transparency was less than 5.33 (% haze) − 31.5; haze and transparency measurements not actually made;.
DNA = data not available (visual appearance indicated that many, if not most or all of these films, would exhibit a % transparency greater than or equal to 5.33 (% haze) − 31.5.

While in general Film Nos. 4-25 exhibited good optical properties, including low haze and high transparency, data from optical analyses was either not available or the was inaccurate because the films were allowed to relax and wrinkle, making measurement of optical properties produce inaccurate results.

Examples 26-33

The films of Examples 26-33, described below, were designed for post-pasteurization end use. As used herein, the phrase "post-pasteurization" refers to the process of subjecting a packaged food product to a temperature of from 200° F. to 211° F. for a period of from 10 seconds to 10 minutes. Films designed for post-pasteurization end use benefit from high abrasion resistance and high total free shrink at 185° F.

The films of Examples 26, 27, and 29-33 are films containing relatively high amounts of semi-crystalline polyamide, in contrast to the film of Example 28 that is a polyethylene-based film. While the film of Example 28 is crosslinked, the films of Examples 26 and 27 are non-crosslinked. The films of Examples 29-33 are additional films designed for post-pasteurization end use.

Examples 26 and 27

The film of Example 26, and the film of Example 27, were multilayer, coextruded, non-crosslinked, heat-shrinkable, annular films produced utilizing the apparatus and process set forth in FIG. 1, described above. More particularly, the parameters employed in the process of making the films of Examples 26 and 27 were the same as the parameters in the table accompanying Example 2, above. The films of Examples 26 and 27 had a layer arrangement and polymeric composition set forth in the tables below.

Example 26

| Sealant | Tie | Core | Barrier | Core | Tie | Outer |
|---|---|---|---|---|---|---|
| VLDPE1 | MA-LLD 2 | 90% Nylon1 10% Nylon2 | EVOH | 90% Nylon1 10% Nylon2 | MA-LLD 2 | VLDPE1 |
| 5 mils | 1 mil | 3 mils | 1 mil | 3 mils | 1 mil | 5 mils |

Example 27

| Sealant LLDPE3 | Tie MA-LLD 2 | Core 90% Nylon1 10% Nylon2 | Barrier EVOH | Core 90% Nylon1 10% Nylon2 | Tie MA-LLD 2 | Outer LLDPE3 |
|---|---|---|---|---|---|---|
| 5 mils | 1 mil | 3 mils | 1 mil | 3 mils | 1 mil | 5 mils |

The film of comparative Example 28 was a multilayer, extrusion-coated, crosslinked, heat-shrinkable, annular film produced utilizing the apparatus and process set forth in FIG. 5, described above. The multilayer film had a total of 7 layers, in the following order, with the thickness of each layer of the tape (i.e., prior to solid state orientation) shown in mils being indicated below the layer identity and resin composition identification:

Example 28 (Comparative)

| Sealant LLDPE3 | Substrate Core VLDPE3 | Tie MA-LLD 2 | Barrier EVOH | Tie MA-LLD 2 | Coating Core EVA2 | Outer VLDPE4 |
|---|---|---|---|---|---|---|
| 4 mils | 5 mil | 1 mil | 1 mil | 1 mil | 6 mils | 2 mils |

During post-pasteurization, packages containing various types of meat products can be subjected to different types of abuse. Packages can experience movement through the process on conveyor rolls, belts, moving arms, slides, drops, etc. This processing can be carried out over a wide variety of temperatures, ranging from refrigerated temperatures up to 210° F. (i.e., pasteurization temperature). Moreover, some types of meat products have an outer coating that is highly abusive, such as peppercorns, deep fried oil, etc. These types of products, along with the tortuous environment associated with post-pasteurization, often result in package failure due to abrasion and/or puncture. Packages having a failure are typically reworked if discovered during inspection. Alternatively, leaking packages may be returned. Both reworking and package return produce significant cost increases. In the most severe applications, it is necessary to double bag the product to ensure package integrity. Double bagging is highly undesirable because it adds to package costs and increases the amount of labor expended.

The films of Examples 26 and 27, as well as the film of comparative Example 28, were used to package a product that was thereafter subjected to test simulating a post-pasteurization process. Relative to the performance of the films of Examples 26 and 27, the film of comparative Example 28 was found to exhibit poor abrasion resistance during the post-pasteurization process. The poor abrasion resistance of the film of comparative Example 28 was particularly apparent when the product packaged was a meat product having a surface including hard granules, such as peppercorns. While the solution to this problem could have been to increase the gauge of the film of comparative Example 28, increasing the gauge has an adverse effect upon sealability and cost. Moreover, it was found that in the most abrasive environments, increasing the gauge from 2.35 to 3.0 mils did not correct the abrasion resistance problem.

A simulated Post-Pasteurization Test was conducted by converting each of the films of Examples 26, 27, and 28 to bags, and then filling the bags with 1.5 pounds of resin pellets (length of 2 mm and diameter of 3 mm). The resin pellets were a mixture of 80% polyethylene and 20% polyamide 6. Once the bags were filled, the atmosphere was evacuated from the bags, and the bags were closed by heat sealing. Each of the resulting packages was placed into boiling water in a kettle, and agitated with paddles at about 4 revolutions per minute. This test showed a significantly less abrasion-induced leakers for the films of Examples 26 and 27 versus the film of comparative Example 28. The films of Examples 27 and 28 were also tested for impact strength. Data from the various tests carried out was as follows:

| Example No. | Gauge (mils) | Post-Pasteurization Test (% leakers) | Impact Strength:Total Energy (ft-lb$_f$) measured at | | |
|---|---|---|---|---|---|
| | | | 210° F. | 80° F. | 40° F. |
| 26 | 2.35 | 10 | DNA | DNA | DNA |
| 27 | 2.35 | 16 | 6.0 | 3.5 | 2.6 |
| 28 (comparative) | 2.35 | 90 | 0.6 | 1.7 | 1.9 |

DNA = data not available

It was found that the films of Examples 26 and 27 were much tougher than the film of comparative Example 28 on a per mil basis. It was also discovered that the films of Examples 26 and 27 were much more abrasion-resistant than the film of comparative Example 28, on a per mil basis. Moreover, while the film of Example 26 possessed excellent optics (haze of 3.3%, transparency of 26.8%), while the film of Example 27 exhibited more haze and less transparency (haze of from 23.6%, transparency of 5.8%). The film of Example 27 exhibited an inferior combination of haze and transparency because it had an outer layer made from LLDPE 3, which had a density of 0.918 g/cm$^3$. However, both films exhibited high total free shrink at 185° F. and high puncture strength. The superior abrasion-resistance of the films of Examples 26 and 27 versus the film of comparative Example 28, decreased the need to rework leaking bags by repackaging the product, and eliminated the need for double bagging. Thus, the process produced a film that was highly cost-effective, relative to the film of comparative Example 28.

Examples 29-33

Five additional polyamide-containing multilayer heat-shrinkable films were made, each of these films having been designed specifically for post-pasteurization end use. The tables below provide the layer arrangement, identity, and relative thickness for each of the tapes that were oriented to make heat-shrinkable post-pasteurization films for each of Examples 29-33. The tapes that were oriented had a thickness of 11.5 mils before solid-state orientation, with the resulting heat-shrinkable film having a total thickness of 2.35 mils after solid-state orientation. Otherwise, the films of Examples 29-33 were prepared with a process similar to the process used for the preparation of Examples 26 and 27.

Example 29

| Sealant VLDPE 6 | Tie MA-LLD2 | Core 90% Nylon 1 10% Nylon 2 | Barrier EVOH | Core 90% Nylon 1 10% Nylon 2 | Tie MA-LLD2 | Outer VLDPE 6 |
|---|---|---|---|---|---|---|
| 1.4 mils | 0.9 mil | 3 mils | 0.9 mil | 3 mils | 0.9 mil | 1.4 mils |

Example 30

| Sealant VLDPE 6 | Tie MA-LLD2 | Core 90% Nylon 1 10% Nylon 5 | Barrier EVOH | Core 90% Nylon 1 10% Nylon 5 | Tie MA-LLD2 | Outer VLDPE 6 |
|---|---|---|---|---|---|---|
| 1.4 mils | 0.9 mil | 3 mils | 0.9 mil | 3 mils | 0.9 mil | 1.4 mils |

Example 31

| Sealant VLDPE 6 | Tie MA-LLD2 | Core 90% Nylon 1 10% EVOH 2 | Barrier EVOH | Core 90% Nylon 1 10% EVOH 2 | Tie MA-LLD2 | Outer VLDPE 6 |
|---|---|---|---|---|---|---|
| 1.4 mils | 0.9 mil | 3 mils | 0.9 mil | 3 mils | 0.9 mil | 1.4 mils |

Example 32

| Sealant VLDPE 6 | Tie MA-LLD2 | Core 90% Nylon 1 10% Nylon 10 | Barrier EVOH | Core 90% Nylon 1 10% Nylon 10 | Tie MA-LLD2 | Outer VLDPE 6 |
|---|---|---|---|---|---|---|
| 1.4 mils | 0.9 mil | 3 mils | 0.9 mil | 3 mils | 0.9 mil | 1.4 mils |

Example 33

| Sealant VLDPE 6 | Tie MA-LLD2 | Core 90% Nylon 1 10% Nylon 11 | Barrier EVOH | Core 90% Nylon 1 10% Nylon 11 | Tie MA-LLD2 | Outer VLDPE 6 |
|---|---|---|---|---|---|---|
| 1.4 mils | 0.9 mil | 3 mils | 0.9 mil | 3 mils | 0.9 mil | 1.4 mils |

The films of Examples 29-33 were subjected to a variety of tests, and compared against the film of comparative Example 28. The films of Examples 29-33 were evaluated and found to exhibit improved impact properties over the film of comparative Example 28, at all temperatures. The film of Example 29 appeared to have slightly lower impact values compared to the films of Examples 30-33. In addition, unrestrained free shrink was measured in accordance with ASTM D 2732. The tables below provide the unrestrained free shrink data for the films of Examples 29-33. Unrestrained free shrink was measure at both 185° F. and 195° F.

| | Free Shrink at 185° F. | | |
|---|---|---|---|
| Film of Example No. | Transverse Free Shrink at 185° F. (%) | Longitudinal Free Shrink at 185° F. (%) | Total Free Shrink at 185° F. (%) |
| 29 | 25 | 29 | 54 |
| 30 | 22 | 21 | 43 |
| 31 | 20 | 23 | 43 |
| 32 | 25 | 22 | 47 |
| 33 | 20 | 23 | 43 |

| | Free Shrink at 195° F. | | |
|---|---|---|---|
| Film of Example No. | Transverse Free Shrink at 195° F. (%) | Longitudinal Free Shrink at 195° F. (%) | Total Free Shrink at 185° F. (%) |
| 29 | 27 | 31 | 58 |
| 30 | 26 | 22 | 48 |
| 31 | 20 | 26 | 46 |
| 32 | 26 | 24 | 50 |
| 33 | 23 | 24 | 47 |

The shrink data above was not taken during production of the tubing. Rather, this shrink data was taken at least a week after tubing production. Shrink data measured during production was higher than shrink data measured one week later.

The evaluation of the optical properties of the films of Examples 29-33 was conducted, including measurement of haze, transparency (i.e., clarity), and gloss. The results of the optical measurements were as follows:

Optical Properties of Films of Examples 29-33

| Film of Example No. | Haze (%) | Clarity (%) | Gloss (%) | Is % Transparency ≧ 5.33 (% Haze) − 31.5? |
|---|---|---|---|---|
| 29 | 7.4 | 11.6 | 74 | YES |
| 30 | 5.6 | 18.8 | 76 | YES |
| 31 | 4.1 | 27.4 | 86 | YES |
| 32 | 5.3 | 27.7 | 79 | YES |
| 33 | 9.6 | 14.3 | 67 | NO |

While the films of Examples 29-32 exhibited a combination of haze and transparency such that % Transparency≧5.33(% Haze)−31.5, the film of Example 33 did not exhibit this combination of haze and transparency. The inferior combination of haze and transparency in the film of Example 33 is believed to be due to the presence of a polyamide core layer containing a high molecular weight polyamide MXD6 which was found to be optically incompatible with the polyamide 6 with which it was blended. The result was an extrudate that appeared cloudy even before it was contacted with the quenching liquid.

Evaluation of the oxygen transmission rate of films of Examples 29-33 was also conducted, including measurement taken at 23° C. and 100% relative humidity, and measurements taken at 23° C. and 0% relative humidity. Three measurements were taken for each film, in accordance with ASTM D-3985, with the results averaged. The tables below set forth the results of the oxygen transmission rate testing. As used herein the term "gas-barrier" when referred to a layer or to an overall structure, is used to identify layers or structures characterized by an Oxygen Transmission Rate (evaluated at 23° C. and 0% R.H. according to ASTM D-3985) of less than 500 cm$^3$/m$^2$.day.bar.

| $O_2$-Transmission Rate (cc/m$^2$ day atm, at STP and 0% relative humidity) | | | | |
|---|---|---|---|---|
| Film of Example No. | Test 1 | Test 2 | Test 3 | AVG. |
| 29 | 9.55 | 8.7 | 7.32 | 8.5 |
| 30 | 10.79 | 10.09 | 11.1 | 10.7 |
| 31 | 6 | 6.86 | 6.33 | 6.4 |
| 32 | 7.65 | 7.64 | 7.79 | 7.7 |
| 33 | 8.4 | 8.9 | 8.92 | 8.7 |

| $O_2$-Transmission Rate (cc/m$^2$ day atm, at STP and 100% relative humidity) | | | | |
|---|---|---|---|---|
| Film of Example No. | Test 1 | Test 2 | Test 3 | AVG. |
| 29 | 6.72 | 6.88 | 6.04 | 6.5 |
| 30 | 8.37 | 7.82 | 5.08 | 7.1 |
| 31 | 5.4 | 5.14 | 5.74 | 5.4 |
| 32 | 5.02 | 6.3 | 5.91 | 5.7 |
| 33 | 6.73 | 5.9 | 7.11 | 6.6 |

Evaluation of tear propagation (in accordance with ASTM D 1938) and tear resistance (in accordance with ASTM D 1004), were measured for each of the films of Examples 29-33. The tables below set forth the results of these tests.

| | Tear Propagation | |
|---|---|---|
| Film of Example No. | Longitudinal Direction: Load at Maximum (gmf) | Transverse Direction: Load at Maximum (gmf) |
| 29 | 41.9 | 70.8 |
| 30 | 36.4 | 60.4 |
| 31 | 37.1 | 80.4 |
| 32 | 40.6 | 75.3 |
| 33 | 48 | 81.7 |

| | Tear Resistance | |
|---|---|---|
| Film of Example No. | Longitudinal Direction: Load at Max. Load (gmf) | Transverse Direction: Load at Max Load (gmf) |
| 29 | 1060 | 1130 |
| 30 | 1160 | 1170 |
| 31 | 1200 | 1230 |
| 32 | 1300 | 1310 |
| 33 | 1200 | 1210 |

Impact strength testing was carried out on each of the films of Examples 28-33, using a Dynatup impact strength testing device in a manner in accordance with ASTM D 3763. Measurements were taken of maximum load in pounds for each of the films, these measurements being made at three different temperatures: 40° F., at 80° F., and at 210° F. Measurements were also taken of deflection at maximum load (in inches) for each film, again at 40° F., 80° F., and 210° F. Finally, measurements of total energy to break were taken for each film (in foot pounds force) for each film, again at 40° F., 80° F., and 210° F. The tables below provide the data for the Dynatup measurements.

| Impact Strength of Films 28-33: Maximum Load Dynatup Measurements In Accordance with ASTM D 3763 ||||
| --- | --- | --- | --- |
| Film of Example No. | Max Load at 40° F. (lb) | Max Load at 80° F. (lb) | Max Load at 210° F. (lb) |
| 28 | 13.9 | 43.6 | 49.3 |
| 29 | 45 | 58.1 | 61.1 |
| 30 | 50 | 72.8 | 57.9 |
| 31 | 51.9 | 69.6 | 63.3 |
| 32 | 48 | 71.7 | 64.7 |
| 33 | 49.7 | 62.4 | 60.5 |

| Impact Strength of Films 28-33: Total Energy To Break Dynatup Measurements In Accordance with ASTM D 3763 ||||
| --- | --- | --- | --- |
| Film of Example No. | Total Energy to Break at 40° F. (ft-lbsf) | Total Energy to Break at 40° F. (ft-lbsf) | Total Energy to Break at 40° F. (ft-lbsf) |
| 28 | 0.7 | 1.7 | 1.7 |
| 29 | 5.3 | 2.7 | 2.3 |
| 30 | 5.8 | 3.8 | 2.4 |
| 31 | 6.0 | 3.3 | 2.1 |
| 32 | 5.5 | 3.8 | 2.5 |
| 33 | 5.8 | 3.0 | 2.1 |

| Impact Strength of Films 28-33: Deflection at Maximum Load Dynatup Measurements In Accordance with ASTM D 3763 ||||
| --- | --- | --- | --- |
| Film of Example No. | Deflection at Max Load at 40° F. (in) | Deflection at Max Load at 80° F. (in) | Deflection at Max Load at 210° F. (in) |
| 28 | 1.1 | 1.06 | 0.94 |
| 29 | 1.5 | 1.09 | 0.85 |
| 30 | 1.5 | 1.30 | 0.88 |
| 31 | 1.5 | 1.10 | 0.77 |
| 32 | 1.5 | 1.20 | 0.86 |
| 33 | 1.5 | 1.10 | 0.81 |

Examples 34-41

The films of Examples 34-41 are heat-shrinkable, multi-layer films for use in packaging food products, particularly fresh meat products. The bags are designed to possess high abuse properties for the packaging of bone-in meat products, while at the same time possessing high total free shrink at 185° F., low haze, high transparency, strong heat seals, and easy sealability. While the bags could be provided with patches for additional puncture resistance for the packaging of particularly abusive bone-in meat products, the bags are designed to be patchless for packaging bone-in meat products of low to moderate abuse levels.

The films of Examples 34-41 were coextruded made using the process of FIG. 1, described above. More particularly, the following parameters were employed in the process of making the films of Examples 34-41:

| | | | |
| --- | --- | --- | --- |
| Die diameter | 12.7 cm | Total extrudate thickness | 25 mils |
| Air shoe outside diameter: | 8 cm | Air shoe length: | 32 cm |
| Temperature of air emitted from air shoe | 15.6° C. | Air shoe hole diameter | 0.762 mm |
| Distance between holes of air shoe | 14.3 mm | Position of Water Ring | 57 mm below die |
| Water temperature Emitted from water ring | 7.2° C. | Position of water contact with extrudate | 57 mm below die |
| Hot bath temperature | 80° C. | immersion time in hot bath | 2.5 seconds |
| distance between upper and lower nip rollers | 1.9 meters | surface speed of nip rollers below trapped bubble | 17.7 m/min |
| surface speed of nip rollers above trapped bubble | 39.6 m/min | orientation factor in machine direction | 2.3 X (±10%) |
| orientation factor in transverse direction | 3.0 X (±10%) | Total biaxial orientation | 6.9 X |
| Total thickness Of heat-shrinkable film | 4.0 mils | Number of annealing rollers | 4 |
| Diameter of annealing rollers | 6 inches | Degree of wrap around each annealing roller | 120 degrees |
| Surface temperature Of annealing rollers | 51 m/min | Surface speed of annealing rollers | 50 m/min |

The films of Examples 34-41 had the layer arrangements and polymeric compositions set forth in the tables below.

Example 34

| Outer 100% VLDPE 6 | Tie 100% MA-LLD 1 | Core 90% Nylon 1 10% Nylon 2 | Barrier 100% EVOH 1 | Core 90% Nylon 1 10% Nylon 2 | Tie 100% MA-LLD 1 | Outer 100% VLDPE 6 |
|---|---|---|---|---|---|---|
| 4 mils | 1 mil | 6 mils | 1 mil | 6 mils | 1 mil | 4 mils |

Example 35

| Outer 100% VLDPE 6 | Tie 100% MA-LLD 1 | Core 90% Nylon 1 10% EVOH 2 | Barrier 100% EVOH 1 | Core 90% Nylon 1 10% EVOH 2 | Tie 100% MA-LLD 1 | Outer 100% VLDPE 6 |
|---|---|---|---|---|---|---|
| 4 mils | 1 mil | 6 mils | 1 mil | 6 mils | 1 mil | 4 mils |

Example 36

| Outer 100% VLDPE 6 | Tie 100% MA-LLD 1 | Core 90% Nylon 1 10% Nylon 5 | Barrier 100% EVOH 1 | Core 90% Nylon 1 10% Nylon 5 | Tie 100% MA-LLD 1 | Outer 100% VLDPE 6 |
|---|---|---|---|---|---|---|
| 4 mils | 1 mil | 6 mils | 1 mil | 6 mils | 1 mil | 4 mils |

Example 37

| Outer 100% VLDPE 6 | Tie 100% MA-LLD 1 | Core 90% Nylon 1 10% Nylon 3 | Barrier 100% EVOH 1 | Core 90% Nylon 1 10% Nylon 3 | Tie 100% MA-LLD 1 | Outer 100% VLDPE 6 |
|---|---|---|---|---|---|---|
| 4 mils | 1 mil | 6 mils | 1 mil | 6 mils | 1 mil | 4 mils |

Example 38

| Outer 100% VLDPE 6 | Tie 100% MA-LLD 1 | Core 90% Nylon 1 10% Nylon 7 | Barrier 100% EVOH 1 | Core 90% Nylon 1 10% Nylon 7 | Tie 100% MA-LLD 1 | Outer 100% VLDPE 6 |
|---|---|---|---|---|---|---|
| 4 mils | 1 mil | 6 mils | 1 mil | 6 mils | 1 mil | 4 mils |

Example 39

| Outer 100% VLDPE 6 | Tie 100% MA-LLD 1 | Core 90% Nylon 1 10% Nylon 4 | Barrier 100% EVOH 1 | Core 90% Nylon 1 10% Nylon 4 | Tie 100% MA-LLD 1 | Outer 100% VLDPE 6 |
|---|---|---|---|---|---|---|
| 4 mils | 1 mil | 6 mils | 1 mil | 6 mils | 1 mil | 4 mils |

Example 40

| Outer 100% VLDPE 6 | Tie 100% MA-LLD 1 | Core 90% Nylon 3 10% Nylon 5 | Barrier 100% EVOH 1 | Core 90% Nylon 3 10% Nylon 5 | Tie 100% MA-LLD 1 | Outer 100% VLDPE 6 |
|---|---|---|---|---|---|---|
| 4 mils | 1 mil | 6 mils | 1 mil | 6 mils | 1 mil | 4 mils |

Example 41

| Outer 100% VLDPE 6 | Tie 100% MA-LLD 1 | Core 100% Nylon 1 | Barrier 100% EVOH 1 | Core 100% Nylon 1 | Tie 100% MA-LLD 1 | Outer 100% VLDPE 6 |
|---|---|---|---|---|---|---|
| 4 mils | 1 mil | 6 mils | 1 mil | 6 mils | 1 mil | 4 mils |

The films of Examples 46-54, 56, and 57 were analyzed for various optical properties, with results provided in the table below.

| Film of Example No. | % Haze | % Transparency | % Gloss | Gauge (mils) | Is % Transparency ≧ 5.33 (% Haze) − 31.5? |
|---|---|---|---|---|---|
| 34 | 4.2 | 22.6 | 79 | 4.6 | YES |
| 35 | 5.1 | 42.5 | 84 | 4.12 | YES |
| 36 | 5.5 | 37.2 | 82 | 4.13 | YES |
| 37 | 8.1 | 9.1 | 68 | 4.38 | NO |
| 38 | 4.8 | 32.4 | 80 | 3.57 | YES |
| 39 | 4.7 | 29.6 | 86 | 4.26 | YES |
| 40 | 7.1 | 17 | 73 | 4.01 | YES |
| 41 | 8.3 | 23.2 | 71 | 4.08 | YES |

The film of Example 37 exhibited an inferior combination of optical properties, compared with superior optical properties exhibited by the films of Examples 34-36, 38, 39, 40, and 41. The inferior optical properties for the film of Example 37 is believed to be due to the presence of a high molecular weight Nylon 3 (Ultramid® B 50 polyamide 6) which is believed to be produce inferior optical characteristics in the film when blended at the 10% level with 90% Nylon 1 (Ultramid® B40 polyamide 6).

The films of Examples 34-36, 38, 39, 40, and 41 exhibited relatively low haze and relatively high clarity (i.e., high transparency), i.e., relative to commercially-available polyamide-based shrink films produced using the process and equipment developed by Kuhne Anlagenbau GMBH. The table below provides optical results for several commercially available films offered by Vector Packaging, Inc. and Pechiney Plastic Packaging, these films believed to be produced using the process developed by Kuhne Anlagenbau GMBH.

| Film of Example No. | % Haze | % Transparency | % Gloss | Is % Transparency ≥ 5.33 (% Haze) − 31.5? |
|---|---|---|---|---|
| Vector Sample No. 1 | 8.2 | 11.1 | 78 | NO |
| Vector Sample No. 2 | 15.1 | 47.7 | 64 | NO |
| Vector Sample No. 3 | 16.1 | 51.2 | 61 | NO |
| Vector Sample No. 4 | 13.5 | 11.8 | 55 | NO |
| Vector Sample No. 5 | 19.7 | DNA | 59 | DNA |
| Vector Sample No. 6 | 18.8 | 27.9 | 51 | NO |
| Vector Sample No. 7 | 16.7 | 40.9 | 52 | NO |
| Pechiney Sample No. 1 | 11.1 | 6 | 67 | NO |
| Pechiney Sample No. 2 | 11.2 | 12.5 | 60 | NO |
| Pechiney Sample No. 3 | 15.4 | 4.3 | 56 | NO |
| Pechiney Sample No. 4 | 7.8 | 7.7 | 72 | NO |
| Pechiney Sample No. 5 | 11.2 | 9.7 | 73 | NO |
| Pechiney Sample No. 6 | 10.9 | 5.8 | 67 | NO |
| Pechiney Sample No. 7 | 10 | 13.7 | 72 | NO |
| Pechiney Sample No. 8 | 9.7 | 8.7 | 70 | NO |
| Pechiney Sample No. 9 | 11.5 | 14.1 | 70 | NO |
| Pechiney Sample No. 10 | 11 | 10 | 70 | NO |

DNA = data not available

A comparison of the haze and transparency for the films of Examples 34-39, 40, and 41 with the haze and transparency of the films of Vector Packaging, Inc. and the films of Pechiney Plastic Packaging, reveals that the films of Examples 34-36, 38, 39, 40, and 41 exhibit a measurably superior combination of low haze and high transparency. More particularly, FIG. 10 illustrates, in graphical format, the data provided in the two tables above, as well as a line representing the equation:

% Transparency=5.33(% Haze)−31.5

Figure 10:
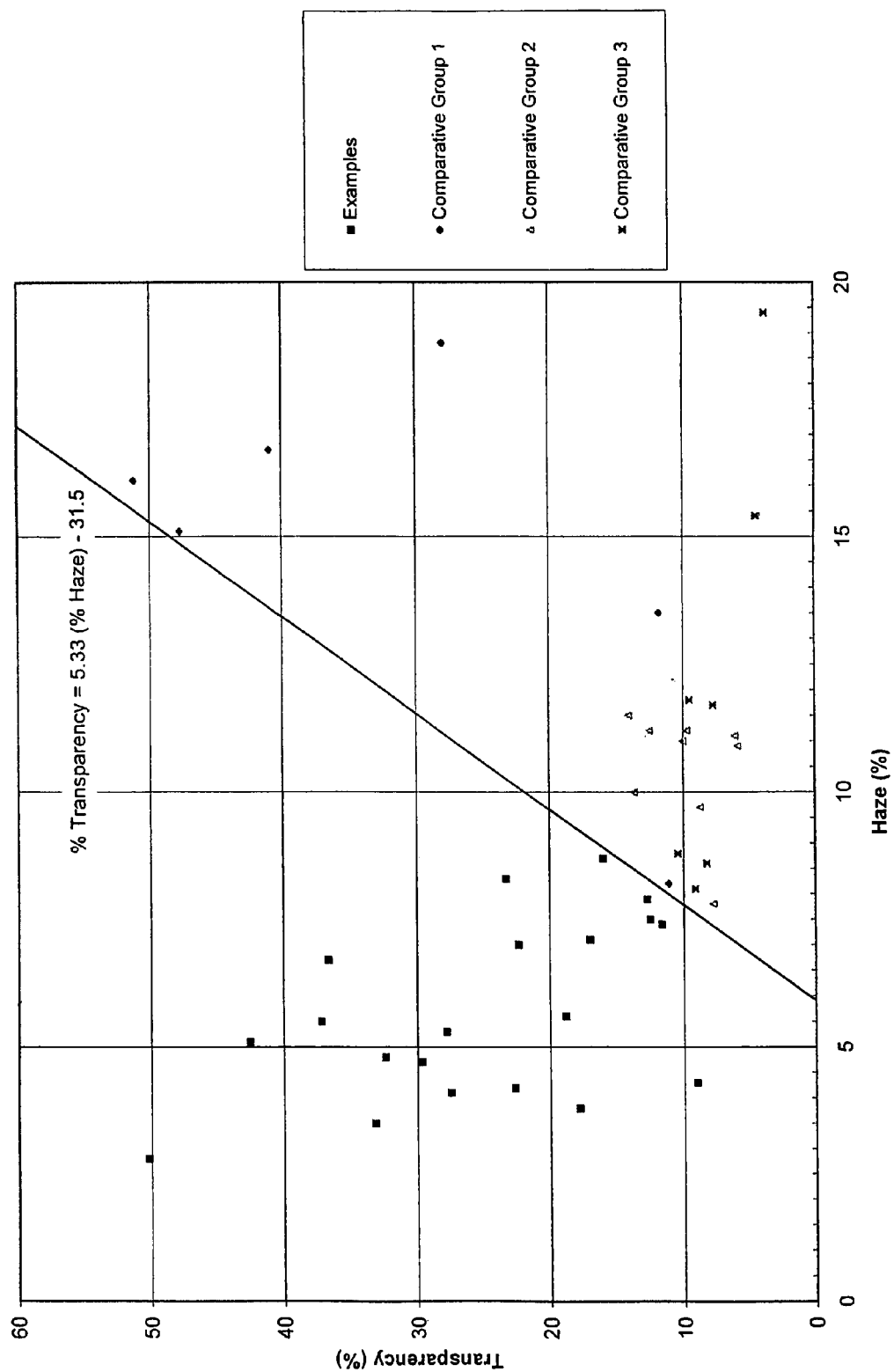
FIG. 10 is a graph illustrating the difference between the optical properties of the film, versus various commercial polyamide-based films.

In FIG. 10, all of the points above and to the left of the line representing this equation are films as described herein and as claimed below. In stark contrast, all of the above-described polyamide-based shrink films from Vector Packaging, Inc., and Pechiney Plastic Packaging, exhibited a combination of haze and transparency below and to the right side of the line represented by the equation above. Thus, the films of Examples 34-36, 38, 39, 40, and 41 satisfy the equation:

% Transparency≧5.33(% Haze)−31.5.

However, as set forth in the table above, none of the commercially available films tested from Vector Packaging, Inc., or Pechiney Plastic Packaging, satisfied this equation.

Examples 42-55

Barrier Shrink Films Containing Polyvinylidene Chloride

The heat-shrinkable multilayer films of Examples 42-55 were made using the extrusion coating process illustrated in FIG. 5, described above. However, no portion of the tape or final film was irradiated. Each of the films had a target final thickness of about 4 mils and a target tape thickness of about 23 mils. More particularly, the following parameters were employed in the process of making the films of Examples 42-55:

| | | | |
|---|---|---|---|
| Die diameter | 12.7 cm | | |
| Air shoe outside diameter: | 7 cm | Air shoe length: | 40 cm |
| Temperature of air emitted from air shoe | 15.6° C. | Air shoe hole diameter | 0.762 mm |
| Distance between holes of air shoe | 19 mm | Position of Water Ring Below extrusion die | 51 mm below extrusion die |
| Water temperature emitted from water ring below extrusion die | 7.2° C. | Position of water contact with extrudate below extrusion die | 51 mm below extrusion die |
| Position of Water Ring Below extrusion coating die | 200 mm below extrusion coating die | Water temperature emitted from water ring below extrusion coating die | 7.2° C. |
| Position of water contact below extrusion coating die | 200 mm below extrusion coating die | Hot bath temperature | 65-71° C. |
| immersion time in hot bath | 2.5 seconds | distance between upper and lower nip rollers | 1.9 meters |
| surface speed of nip rollers below trapped bubble | 14.6-18.3 m/min | surface speed of nip rollers above trapped bubble | 33.6-42.1 m/min |
| orientation factor in machine direction | 2.3 X (±10%) | orientation factor in transverse direction | 2.4 X (±10%) |
| Total biaxial orientation | 5.5 X | Film was not annealed | |

The films of Examples 42-55 had the layer arrangements and polymeric compositions set forth in the tables below.

Example 42

| Outer 100% VLDPE 6 | Tie 100% MA-EVA 1 | Core 90% Nylon 1 10% Nylon 2 | Tie 100% MA-EVA 1 | Barrier 100% PVdC | Tie 100% EVA4 | Core 100% VLDPE 6 | Outer 100% VLDPE 6 |
|---|---|---|---|---|---|---|---|
| 6.2 mils | 0.9 mil | 7.4 mils | 1.9 mils | 2.2 mils | 1.2 mils | 2.5 mils | 0.9 mil |

Example 43

| Outer 100% VLDPE 6 | Tie 100% MA-EVA 2 | Core 90% Nylon 1 10% Nylon 2 | Tie 100% MA-EVA 2 | Barrier 100% PVdC | Tie 100% EVA 4 | Outer 100% VLDPE 6 |
|---|---|---|---|---|---|---|
| 5.4 mils | 0.9 mil | 9.7 mils | 1.5 mils | 1.9 mils | 1.2 mil | 2.3 mils |

Example 44

| Outer 100% VLDPE 6 | Tie 100% MA-EMA | Core 90% Nylon 1 10% Nylon 2 | Tie 100% MA-EMA | Barrier 100% PVdC | Tie 100% EVA 4 | Outer 100% VLDPE 6 |
|---|---|---|---|---|---|---|
| 4.3 mils | 0.7 mil | 10.1 mils | 1.3 mils | 1.8 mils | 1.6 mil | 3.3 mils |

Example 45

| Outer 100% VLDPE 6 | Tie 100% MA-EVA 1 | Core 100% Nylon 1 | Tie 100% MA-EVA 1 | Barrier 100% PVdC | Tie 100% EVA 4 | Outer 100% VLDPE 6 |
|---|---|---|---|---|---|---|
| 4.5 mils | 0.5 mil | 10.8 mils | 1.3 mils | 1.5 mils | 1.3 mils | 3.1 mils |

Example 46

| Outer 100% VLDPE 6 | Tie 100% MA-EVA 1 | Core 90% Nylon 1 10% EVOH 2 | Tie 100% MA-EVA 1 | Barrier 100% PVdC | Tie 100% EVA 4 | Core 100% VLDPE 6 | Outer 100% VLDPE 6 |
|---|---|---|---|---|---|---|---|
| 5.4 mils | 0.5 mil | 9.4 mils | 1.3 mils | 1.8 mils | 1.2 mils | 3.2 mils | 0.3 mil |

Example 47

| Outer 100% VLDPE 6 | Tie 100% MA-EVA 1 | Core 90% Nylon 1 10% Nylon 10 | Tie 100% MA-EVA 1 | Barrier 100% PVdC | Tie 100% EVA 4 | Core 100% VLDPE 6 | Outer 100% VLDPE 6 |
|---|---|---|---|---|---|---|---|
| 5.0 mils | 0.4 mil | 10.4 mils | 1.1 mils | 1.7 mils | 1.3 mils | 2.7 mils | 0.3 mil |

Example 48

| Outer 100% VLDPE 6 | Tie 100% MA-EVA 1 | Core 80% Nylon 1 20% Nylon 16 | Tie 100% MA-EVA 1 | Barrier 100% PVdC | Tie 100% EVA 4 | Core 100% VLDPE 6 | Outer 100% VLDPE 6 |
|---|---|---|---|---|---|---|---|
| 5.0 mils | 0.5 mil | 9.8 mils | 1.3 mil | 1.8 mils | 1.3 mils | 3.0 mils | 0.3 mil |

Example 49

| Outer 100% LMDPE 1 | Tie 100% MA-EVA 1 | Core 100% Nylon 1 | Tie 100% MA-EVA 1 | Barrier 100% PVdC | Tie 100% EVA 4 | Core 100% VLDPE 6 | Outer 100% VLDPE 6 |
|---|---|---|---|---|---|---|---|
| 3 mils* | 1 mil* | 12 mils* | 1 mil* | 2 mils* | 1 mil* | 2 mils* | 1 mil* |

*= target thickness; actual thickness not measured

Example 50

| Outer 100% VLDPE 6 | Tie 80% MA-EVA 1 20% SSPE 4 | Core 90% Nylon 1 10% EVOH 2 | Tie 80% MA-EVA 1 20% SSPE 4 | Barrier 100% PVdC | Tie 100% EVA 4 | Core 100% VLDPE 6 | Outer 100% VLDPE 6 |
|---|---|---|---|---|---|---|---|
| 4.8 mils | 0.6 mil | 10.2 mils | 1.5 mils | 1.7 mils | 1.1 mils | 2.7 mils | 0.3 mil |

Example 51

| Outer 100% VLDPE 6 | Tie 100% MA-EVA 1 | Core 90% Nylon 17 10% EVOH 2 | Tie 100% MA-EVA 1 | Barrier 100% PVdC | Tie 100% EVA 4 | Core 100% VLDPE 6 | Outer 100% VLDPE 6 |
|---|---|---|---|---|---|---|---|
| 3 mils* | 1 mil* | 12 mils* | 1 mil* | 2 mils* | 1 mil* | 2 mils* | 1 mil* |

*= target thickness; actual thickness not measured

Example 52

| Outer 100% VLDPE 6 | Tie 100% MA-EVA 1 | Core 90% Nylon 3 10% EVOH 2 | Tie 100% MA-EVA 1 | Barrier 100% PVdC | Tie 100% EVA 4 | Outer 100% VLDPE 6 |
|---|---|---|---|---|---|---|
| 6.6 mils | 0.3 mil | 9.6 mils | 1.4 mils | 1.4 mils | 1.1 mils | 2.6 mils |

Example 53

| Outer 100% VLDPE 6 | Tie 100% MA-LLD2 | Core 90% Nylon 1 10% EVOH 2 | Tie 100% MA-LLD2 | Barrier 100% PVdC | Tie 100% EVA 4 | Core 100% VLDPE 6 | Outer 100% VLDPE 6 |
|---|---|---|---|---|---|---|---|
| 3 mils* | 1 mil* | 12 mils* | 1 mil* | 2 mils* | 1 mil* | 2 mils* | 1 mil* |

*= target thickness; actual thickness not measured

Example 54

| Outer 100% VLDPE 6 | Tie 100% EVA 5 | Core 90% Nylon 1 10% EVOH 2 | Tie 100% EVA 5 | Barrier 100% PVdC | Tie 100% EVA 4 | Outer 100% VLDPE 6 |
|---|---|---|---|---|---|---|
| 4.8 mils | 0.4 mil | 11.7 mils | 1.0 mil | 1.5 mils | 1.0 mil | 2.5 mils |

Example 55

| Outer 100% VLDPE 6 | Tie 100% MA-EVA 1 | Core 90% Nylon 12 10% EVOH 2 | Tie 100% MA-EVA 1 | Barrier 100% PVdC | Tie 100% EVA 4 | Core 100% VLDPE 6 | Outer 100% VLDPE 6 |
|---|---|---|---|---|---|---|---|
| 3 mils* | 1 mil* | 12 mils* | 1 mil* | 2 mils* | 1 mil* | 2 mils* | 1 mil* |

*= target thickness; actual thickness not measured

Optical Data for Films of Examples 42-52

| Example No. | Haze** (%) | Transparency** (%) | Gloss (%) | 5.33 (% haze) − 31.5 | Is % Transparency higher? |
|---|---|---|---|---|---|
| 28 | 7.5 | 12.5 | 73 | 8% | Yes |
| 43 | 15.4 | 4.4 | 54 | 51% | No |
| 44 | 19.4 | 3.7 | 40 | 72% | No |
| 45 | 32.5 | 2.5 | 47 | 142% | No |
| 46 | 8.8 | 10.4 | 68 | 15% | No |
| 47 | 11.8 | 9.5 | 63 | 31% | No |
| 48 | 8.6 | 8.2 | 68 | 14% | No |
| 50 | 11.7 | 7.7 | 62 | 31% | No |
| 52 | 7.0 | 22.3 | 73 | 6% | Yes |

**Optics for many examples were poor due to air entrapment during extrusion-coating process. However, it is believed that if the air entrapment had been avoided, the percent Transparency would have been higher than 5.33 (percent Haze) − 31.5.

Examples 56-60

Heat-Shrinkable Polyamide-Based Patch Films

The films of Examples 56-60 are heat-shrinkable, multilayer films designed for use as patch films, i.e., to be adhered to a bag film for the preparation of a patch bag for the packaging of bone-in meat products and other high abuse products. While the patch film can have a barrier layer, it need not have a barrier layer. The films of Examples 56-60 were prepared using the process according to FIG. 1, described above. More particularly, the following parameters were employed in the process of making the films of Examples 56-60:

| | | | |
|---|---|---|---|
| Die diameter | 12.7 cm | Total extrudate thickness | 13.5 mils |
| Air shoe outside diameter: | 8 cm | Air shoe length: | 32 cm |
| Temperature of air emitted from air shoe | 15.6° C. | Air shoe hole diameter | 0.762 mm |
| Distance between holes of air shoe | 14.3 mm | Position of Water Ring | 57 mm below die |
| Water temperature Emitted from water ring | 7.2° C. | Position of water contact with extrudate | 57 mm below die |
| Hot bath temperature | 71° C. | immersion time in hot bath | 2 seconds |
| distance between upper and lower nip rollers | 1.9 meters | surface speed of nip rollers below trapped bubble | 18.3 m/min |
| surface speed of nip rollers above trapped bubble | 38.4 m/min | orientation factor in machine direction | 2.1 X |
| orientation factor in transverse direction | 2.8 X | Total biaxial orientation | 5.88 X |
| Total thickness of heat-shrinkable film | 2.8 mils | Number of annealing rollers | 4 |
| Diameter of annealing rollers | 6 inches | Degree of wrap around each annealing roller | 120 degrees |
| Surface temperature of annealing rollers | 54° C. | Film tension over annealing rollers | 6803 grams |

The following tables provide the layer arrangement, layer composition, relative layer thicknesses, total tape thickness, final film thickness (after annealing), and total free shrink.

Example 56 (13.5 mil Tape)

| Outer 100% VLDPE 6 | Tie 100% MA-LLD 2 | Core 90% Nylon 1 10% Nylon 2 | Barrier 100% EVOH 1 | Core 90% Nylon 1 10% Nylon 2 | Tie 100% MA-LLD 2 | Outer 100% VLDPE 6 |
|---|---|---|---|---|---|---|
| 17% | 4.5% | 26% | 5% | 26% | 4.5% | 17% |
| Total tape thickness: 13.5 mils | | Final Film Thickness: 3.2 mils | | | Total Free Shrink @ 185° F.: 65% | |

Example 57 (13.5 mil Tape)

| Outer 100% VLDPE 6 | Tie 100% MA-LLD 2 | Core 90% Nylon 1 10% Nylon 2 | Tie 100% MA-LLD 2 | Core 90% Nylon 1 10% Nylon 2 | Tie 100% MA-LLD 2 | Outer 100% VLDPE 6 |
|---|---|---|---|---|---|---|
| 17% | 4.5% | 26% | 5% | 26% | 4.5% | 17% |
| Total tape thickness: 13.5 mils | | Final Film Thickness: 2.8 mils | | | Total Free Shrink @ 185° F.: 60% | |

Example 58 (9.0 mil Tape)

| Outer 100% VLDPE 6 | Tie 100% MA-LLD 2 | Core 90% Nylon 1 10% Nylon 2 | Tie 100% MA-LLD 2 | Core 90% Nylon 1 10% Nylon 2 | Tie 100% MA-LLD 2 | Outer 100% VLDPE 6 |
|---|---|---|---|---|---|---|
| 17% | 4.5% | 26% | 5% | 26% | 4.5% | 17% |
| Total tape thickness: 9.0 mils | | Final Film Thickness: 2.0 mils | | | Total Free Shrink @ 185° F.: 70% | |

Example 59 (9.0 mil Tape)

| Outer 100% VLDPE 6 | Tie 100% MA-LLD 2 | Core 90% Nylon 1 10% Nylon 2 | Tie 100% MA-LLD 2 | Core 90% Nylon 1 10% Nylon 2 | Tie 100% MA-LLD 2 | Outer 100% VLDPE 6 |
|---|---|---|---|---|---|---|
| 12% | 4.5% | 31% | 5% | 31% | 4.5% | 12% |
| Total tape thickness: 9.0 mils | | Final Film Thickness: 2.0 mils | | | Total Free Shrink @ 185° F.: 98% | |

Example 60 (4.5 mil Tape)

| Outer 100% VLDPE 6 | Tie 100% MA-LLD 2 | Core 90% Nylon 1 10% Nylon 2 | Tie 100% MA-LLD 2 | Core 90% Nylon 1 10% Nylon 2 | Tie 100% MA-LLD 2 | Outer 100% VLDPE 6 |
|---|---|---|---|---|---|---|
| 5% | 4.5% | 38% | 5% | 38% | 4.5% | 5% |
| Tape thickness: 4.5 mils | | | | Final Film thickness: 1.0 mils | | |

The films of Examples 56-60 appeared to exhibit relatively low haze and relatively high transparency. However, no data is currently available for the haze and transparency of the films of Examples 56, 58, 59, and 60. However, the film of Example 57 exhibited a haze of 3.8% and a transparency of 17.8%, i.e., in the film of Example 57, percent transparency was greater than 5.33(% Haze)−31.5. Since the visual appearance of the films of Examples 56-60 was similar, it is believed that each of the films of Examples 56-60, percent transparency was greater than 5.33(% Haze)−31.5.

Ovenable Films

Several heat-shrinkable, multilayer, ovenable films were designed and produced for packaging a food product which could be cooked or reheated in an oven while remaining surrounded by the film. While a monolayer film can serve as an ovenable film, the ovenable films in the examples that follow were designed as multilayer films in order to provide a seal layer having a lower melting point than at least one other layer of the film, for good sealability and for ease of converting the films into bags. The films were 100% polyamide, and exhibited low haze and high transparency, making the films suitable for packaging food products, such as meats, for presentation in a retail case, etc. The polyamide-based heat-shrinkable films could also withstand a large amount of abuse, e.g., so that a packaged product could survive distribution across long distances. The films possessed the necessary temperature resistance to survive cooking in an oven for several hours.

Examples 61-68

The films of Examples 61-68 provided a combination of puncture strength and ovenability that made these films suitable for: (a) packaging of meat at a packing plant, (b) transporting the packaged meat to a retail store followed by being placed in a retail case, and (c) purchase by a consumer who then cooks the product in an oven while the product remains in the same package. Such packages eliminate several reprocessing steps, each of which would otherwise add cost and increase the chance of product contamination.

Each of the films of Examples 61-68 had a seal layer, a skin layer, and a core layer. Typically, the seal layer contained a polyamide having a lower melting point than various polyamides in the remainder of the film. While the polyamide in the seal layer may have a high melting point, preferably it melts before the polyamide in the core layer and/or the polyamide in the skin layer (i.e., the layer which is to serve as the outer layer of the package), in order to improve the sealability of the film.

The polyamide in the core layer may (optionally) provide the film with higher barrier properties. Polyamides providing higher barrier properties include, but are not limited to, amorphous polyamide and/or MXD6 polyamide. The various film layers can be modified in order to alter the surface properties and make the film easier to convert into a bag or other packaging article by the addition of a slip agent or antiblock particles. In addition, any or all of the layers may be modified to provide for enhanced stabilization to prevent color change during cooking and for improved stability to prevent the film from becoming brittle or otherwise decreasing the integrity of the film.

The coextruded, multilayer, all-polyamide, heat-shrinkable, ovenable film of Example 61 was produced using the process of FIG. 1, described above. The film of Example 61 was prepared in a manner similar to the preparation of the film of Example 1, described above. In the production of the film of Example 61 parameters employed were as set forth in Example 1, except as follows:

| | | | |
|---|---|---|---|
| Total Extrudate Thickness | 18 mils | Air shoe outside diameter: | 10.2 cm |
| Surface Speed of Nip Rollers Below Trapped Bubble | 9.1 m/min | Surface Speed of Nip Rollers Above Trapped Bubble | 27.4 m/min |
| orientation factor in transverse direction | 2.0 X | orientation factor in longitudinal direction | 3.1 X |
| Total Biaxial Orientation | 6.2 X | Total thickness of heat-shrinkable film | 3.5 mils |
| Hot Bath Temperature | 60° C. | | |

The film of Example 61 had a layer arrangement and polymeric composition set forth in the table below.

Example 61

| Seal | Core | Outer |
|---|---|---|
| 86% Nylon 12 | 60% Nylon 14 | 60% Nylon 14 |
| 10% Nylon 13 | 30% Nylon 15 | 28% Nylon 15 |
| 1% STBL 1 | 10% Nylon 13 | 10% Nylon 13 |
| 3% AB&S | | 2% AB&S |
| 6 mils | 6 mils | 6 mils |

The resulting 3.5 mil heat-shrinkable film possessed good shrink (a total free shrink at 185° F. of 59 percent), high puncture strength, good optical properties, and withstood four hours in the oven at 350° F. without degradation, embrittlement, or loss of package integrity.

The films of Examples 62-68 were made in accordance with the process used to make the film of Example 2, except that the polymeric composition of the various layers were altered in accordance with the tables provided below. In addition, the absolute thicknesses and relative thicknesses of the various film layers varied as noted in the tables below. In the production of the film of Example 62, parameters employed were as set forth in Example 2, except as follows:

| | | | |
|---|---|---|---|
| Total Extrudate Thickness | 10 mils | Air shoe outside diameter: | 12.7 cm |
| Surface Speed of Nip Rollers Below Trapped Bubble | 23.2 m/min | Surface Speed of Nip Rollers Above Trapped Bubble | 59.5 m/min |
| orientation factor in transverse direction | 2.1 X | orientation factor in longitudinal direction | 2.6 X |
| Total Biaxial Orientation | 5.4 X | Total thickness of heat-shrinkable film | 2.0 mils |
| Hot Bath Temperature | 71.1° C. | | |

The films of Examples 62-68 had a layer arrangement and polymeric composition set forth in the tables below.

Example 62

| Sealant | Core | Core | Core | Outer |
|---|---|---|---|---|
| 87% Nylon 12 | 90% Nylon 1 | 90% Nylon 1 | 90% Nylon 1 | 89% Nylon 1 |
| 10% Nylon 13 | 10% Nylon 13 | 10% Nylon 13 | 10% Nylon 13 | 10% Nylon 13 |
| 2% SLIP | | | | 1% SLIP |
| 1% STBL 1 | | | | |
| 2.5 mils | | 5.5 mils | | 2 mils |

In the production of the film of Example 63, parameters employed were as set forth in Example 62, except as follows:

| | | | |
|---|---|---|---|
| Total Extrudate Thickness | 10 mils | Air shoe outside diameter: | 12.7 cm |
| Surface Speed of Nip Rollers Below Trapped Bubble | 18.9 m/min | Surface Speed of Nip Rollers Above Trapped Bubble | 49.4 m/min |
| orientation factor in transverse direction | 1.9 X | orientation factor in longitudinal direction | 2.7 X |
| Total Biaxial Orientation | 5.1 X | Total thickness of heat-shrinkable film | 2.0 mils |
| Hot Bath Temperature | 79.4° C. | | |

The film of Example 63 had a layer arrangement and polymeric composition set forth in the tables below.

Example 63

| Sealant | Core | Core | Core | Outer |
|---|---|---|---|---|
| 87% Nylon 12 | 90% Nylon 1 | Core | 90% Nylon 1 | 89% Nylon 1 |
| 10% Nylon 13 | 10% Nylon 13 | 100% Nylon 13 | 10% Nylon 13 | 10% Nylon 13 |
| 2% SLIP | | | | 1% SLIP |
| 1% STBL 1 | | | | |
| 2.5 mils | 2 mils | 1 mil | 2.5 mils | 2 mils |

The film of Example 64 had a layer arrangement and polymeric composition set forth in the tables below.

Example 64

| Sealant | Core | Core | Core | Outer |
|---|---|---|---|---|
| 87% Nylon 12 | 89% Nylon 1 | 89% Nylon 1 | 89% Nylon 1 | 89% Nylon 1 |
| 10% Nylon 2 | 10% Nylon 2 | 10% Nylon 2 | 10% Nylon 2 | 10% Nylon 2 |
| 1% STBL 1 | 1% STBL 1 | 1% STBL 1 | 1% STBL 1 | 1% STBL 1 |
| 2% AB&S | | | | |
| 2.1 mils | | 5.8 mils | | 0.6 mils |

Moreover, unless noted otherwise, the parameters employed in the process of making the films of Example 64, as well as the films of Examples 65-68 were as set forth in Example 2, except as noted otherwise in the table below. In addition, the annealing rollers operated with a surface temperature of 54.4° C.

| Example No | Air Shoe OD (cm) | Surface speed of Nip below bubble (m/min) | Surface speed of nip above bubble (m/min) | Surface speed of anneal rollers (m/min) | Hot bath temp (° C.) | MD Stretch Factor (X) | TD Stretch Factor (X) | Total Biax Orient Factor (X) | Total free shrink @ 185 F. |
|---|---|---|---|---|---|---|---|---|---|
| 64 | 12.7 | 27.4 | 51.4 | 49.2 | 65.6 | 2.25 | 2.1 | 4.7 | 84 |
| 65 | 12.7 | 24.5 | 41.9 | 38.0 | 63.9 | 2.05 | 2.3 | 4.7 | 31 |
| 66 | 12.7 | 23.9 | 47.0 | 43.2 | 65.6 | 2.2 | 2.3 | 5.0 | DNA |
| 67 | 10.2 | 22.9 | 51.1 | 46.5 | 66.7 | 2.5 | 1.9 | 4.7 | 50 |
| 68 | 10.2 | 27.3 | 56.1 | 54.0 | 73.9 | 2.3 | 1.9 | 4.3 | 59 |

The films of Examples 65-68 had a layer arrangements and polymeric compositions as set forth in the table below.

Example 65

| Sealant | Core | Core | Core | Outer |
|---|---|---|---|---|
| 87% Nylon 12 | 89% Nylon 1 | Core | 89% Nylon 1 | 89% Nylon 1 |
| 10% Nylon 2 | 10% Nylon 2 | 100% | 10% Nylon 2 | 10% Nylon 2 |
| 1% STBL 1 | 1% | Nylon | 1% | 1% |
| 2% AB&S | STBL 1 | 2 | STBL 1 | STBL 1 |
| 2.5 mils | 2 mils | 1 mil | 2.5 mils | 2 mils |

Example 66

| Sealant | Core | Core | Core | Outer |
|---|---|---|---|---|
| 67% Nylon 1 | 89% Nylon 1 | 89% Nylon 1 | 89% Nylon 1 | 89% Nylon 1 |
| 30% Nylon 2 | 10% Nylon 2 | 10% Nylon 2 | 10% Nylon 2 | 10% Nylon 2 |
| 1% STBL 1 | 1% STBL 1 | 1% STBL 1 | 1% STBL 1 | 1% STBL 1 |
| 2% AB&S | | | | |
| 2.5 mils | | 5.5 mils | | 2 mils |

Example 67

| Sealant | Core | Core | Core | Outer |
|---|---|---|---|---|
| 97% Nylon 12 | 89% Nylon 1 | 89% Nylon 1 | 89% Nylon 1 | 89% Nylon 1 |
| 1% STBL 1 | 10% Nylon 10 | 10% Nylon 10 | 10% Nylon 10 | 10% Nylon 10 |
| 2% AB&S | 1% STBL 1 | 1% STBL 1 | 1% STBL 1 | 1% STBL 1 |
| 2.5 mils | | 5.5 mils | | 2 mils |

Example 68

| Sealant | Core | Core | Core | Outer |
|---|---|---|---|---|
| 97% Nylon 12 | 89% Nylon 1 | 89% Nylon 1 | 89% Nylon 1 | 89% Nylon 1 |
| 1% STBL 1 | 10% Nylon 10 | 10% Nylon 10 | 10% Nylon 10 | 10% Nylon 10 |
| 2% AB&S | 1% STBL 1 | 1% STBL 1 | 1% STBL 1 | 1% STBL 1 |
| 2.5 mils | | 5.5 mils | | 2 mils |

Example 69

A coextruded multilayer heat-shrinkable retortable film is produced utilizing the apparatus and process set forth in FIG. 1, described above. The multilayer film has a total of 7 layers, in the following order, with the thickness of each layer of the tape (i.e., the extrudate prior to solid state orientation) shown in mils being indicated below the layer identity and resin composition identification:

| Layer Arrangement, Composition, and Thickness of Film of Example 69 | | | | | | |
|---|---|---|---|---|---|---|
| Sealant | Tie | Core | Barrier | Core | Tie | Outer |
| High melt point polymer | Tie 1 | Nylon 1 | Barrier 1 | Nylon 1 | Tie 1 | High melt point polymer |
| 1.5 mils | 1 mil | 3.25 mils | 1 mil | 3.25 mils | 1 mil | 1.5 mils |

The identity of the various resins in the film of Example 66 is as follows:

| Resin code | Resin Identity |
|---|---|
| High Melting Point Polymer | MDPE, HDPE, PEC, PA copolymer, PP Homopolymer |
| Tie 1 | Anhydride grafted LLDPE, MDPE, HDPE, PP, EVA, EMA, PEC |
| Nylon 1 | Semi-crystalline Nylon, Amorphous Nylon |
| Barrier 1 | EVOH; Retortable EVOH, Amorphous Nylon, MXD6, MXD6/MXDI, and nanocomposite barrier materials |

The extrudate is cast from an annular die (diameter of 12.7 cm) over an air shoe that provides the melt with the needed support to minimize gauge band variation. The air shoe has an outside diameter of 12.7 cm and a length of 32 cm, and emits cool air (15.6° C.) through 0.762 mm diameter holes spaced over the cylindrical surface of the air shoe, the holes being spaced apart by a distance of 14.3 mm, with the holes being arranged so that each hole inside the matrix of holes were surrounded by 6 holes. The airflow through the holes supports the film (so that it does not collapse) and cooled the film from the inside out, i.e., to assist in quenching the molten extrudate quickly to minimize crystallization. The pressure between the air shoe and the film is slightly above atmospheric pressure (i.e., about 780 mm Hg). The cool air is pumped into the hollow air shoe and out the holes, with the air then flowing down beneath the air shoe and then up out through a passageway through the center of the air shoe.

Although the air shoe assists in freezing the nylon to minimize crystal formation, most of the heat in the extrudate is removed using a water ring positioned approximately 2 inches below the annular die. The water ring emits a stream of cool water (e.g., at 7.2° C.) against the outer surface of the extrudate to produce sudden freezing of the extrudate to minimize crystallization in the nylon layers. The stream of cool water contacts the extrudate at a distance of about 2 inches downstream of the annular die. The resulting quenched tape is collapsed into lay-flat configuration and wound up onto a reel and transported to equipment for solid state orientation of the tape. The tape is then unwound and forwarded to a bath containing hot water, collapsed into lay-flat configuration, and heated to a temperature of 71° C. The tape remains immersed in the hot water for a period of 2 seconds, immediately following which the heated tape is forwarded through a first set of nip rollers and then through a second set of nip rollers, with the distance between the first and second sets of nip rollers being about 6 feet. Between the first and second sets of nip rollers, the tape is subjected to a solid state biaxial orientation. Orientation is produced by inflating the tape with a trapped bubble of air between the first and second sets of nip rollers. Additional orientation is provided by running the first set of nip rollers at a surface speed of 15 meters per minute, and the second set of nip rollers at a surface speed of 42 meters per minute. The result is 2.8× orientation in the transverse direction and 2.8× orientation in the machine direction, for a total biaxial orientation of 7.8.

Example 70

The retortable film of Example 70 was prepared in a manner similar to the preparation of the film of Example 69, described above. The film of Example 70 also has a total of 7 layers, in the following order, with the thickness of each layer of the tape (i.e., prior to solid state orientation) shown in mils being indicated below the layer identity and resin composition:

phous polyamide, polyether block amide copolymer, polyester (including polyethylene terephthalate/glycol), EVOH, polystyrene, polyolefin (e.g., polybutene, long chain branched homogeneous ethylene/alpha-olefin copolymer, and linear low density polyethylene), and ionomer resin. The crystallinity interrupter is blended with the Nylon 1. The semi-crystalline polyamide is the primary component present in the blend with the crystallilnity interrupter. The primary component makes up from 60 to 99 weight percent of the blend and the secondary component making up from 1 to 40 weight percent of the blend. The heat-shrinkable, retortable film described herein can comprise a blend of the semi-crystalline polyamide with a crystallinity interrupter as set forth above.

The annular die, air shoe, cooling air, water ring, cooling water, hot bath, immersion time, air ring, etc., and conditions, are all carried out as set forth in Example 1, above.

Example 71

The retortable film of Example 71 is prepared in a manner similar to the preparation of the film of Example 69, described above. However, the film of Example 71 is prepared by an extrusion coating process as illustrated in FIG. 5, described above. As shown in the table below, the film of Example 71 has a total of 8 layers, with the first 4 layers being coextruded from an annular die as a substrate, and the fifth through eighth layers being extrusion-coated onto the substrate, these last four layers being referred to as the coating layers. The semi-crystalline nylon is present in one of the substrate layers. As in Example 69 and Example 70, the extruded substrate portion of the film is rapidly quenched upon emerging from the die. The rapid quench is accomplished primarily by placing the water ring close to the die so that a cascade of cool water contacts the annular extrudate immediately upon emergence of the extrudate from the die. While the various layers of the substrate may be irradiated, the coating layers are not irradiated. The coating layers provide the film with a high barrier to atmospheric oxygen (and other materials), add abuse resistance, and enhance the subsequent processability (i.e., orientability) of the multilayer extrudate.

| | Layer Arrangement, Composition, and Thickness of Film of Example 70 | | | | | |
|---|---|---|---|---|---|---|
| Sealant | Tie | Core | Barrier | Core | Tie | Outer |
| High melt point polymer 1.5 mils | Tie 1 1 mil | 90% Nylon 1 + 10% crystallinity interrupter 3.25 mils | Barrier 1 1 mil | 90% Nylon 1 + 10% crystallinity interrupter 3.25 mils | Tie 1 1 mil | High melt point polymer 1.5 mils |

The identity of the various resins in the film of Example 70 is the same as in the table above in Example 69. The only additional resin, i.e., the crystallinity interrupter, comprises at least one member selected from the group consisting of: polyamide 6/12, polyamide 6/69, polyamide 6I/6T, polyamide MXD6, polyamide MXDI, polyamide 66/610, amor-

| | Layer Arrangement, Composition, and Thickness of Film of Example 71 | | | | | | |
|---|---|---|---|---|---|---|---|
| substrate Sealant | substrate Tie | substrate Core | Substrate Tie | coating Barrier | coating Tie | coating Core | coating Outer |
| High melt point polymer 3 mils | Tie 2 1 mil | Nylon 1 12 mils | Tie 2 1 mil | Barrier 1 2 mils | Tie 3 1 mil | Bulk 1 2 mils | High melt point polymer 1 mil |

The annular die used in the process has a diameter of 5 inches, and the air shoe has a diameter of 4.25 inches and a length of 13 inches. The diameter of the coating die is 3.5 inches. Otherwise, the process used to produce the film of Example 3 is as described in Example 1, above, including the cooling air, water ring, cooling water, hot bath, immersion time, and annealing apparatus and conditions. The identity of the various resins in the film of Example 71 are as follows:

| Resin code | Resin Identity |
| --- | --- |
| High Melting Point Polymer | MDPE, HDPE, PEC, PA copolymer, PP homopolymer |
| Tie 2 | Anhydride grafted LLDPE, MDPE, HDPE, PP, EVA, EMA, PEC |
| Tie 3 | EVA, EMA |
| Nylon 1 | Semi-crystalline Nylon, Amorphous Nylon |
| Interrupter 1 | polyamide 6/69, polyamide 6I/6T, polyamide MXD6, polyamide MXDI, polyamide 66/610, amorphous polyamide, polyether block amide copolymer, polyester (including polyethylene terephthalate/glycol), EVOH, polystyrene, polyolefin (e.g., polybutene, long chain branched homogeneous ethylene/alpha-olefin copolymer, and linear low density polyethylene), and ionomer resin. |
| Interrupter 1 | polyamide 6/69, polyamide 6I/6T, polyamide MXD6, polyamide MXDI, polyamide 66/610, amorphous polyamide, polyether block amide copolymer, polyester (including polyethylene terephthalate/glycol), EVOH, polystyrene, polyolefin (e.g., polybutene, long chain branched homogeneous ethylene/alpha-olefin copolymer, and linear low density polyethylene), and ionomer resin. |
| Bulk 1 | Polyolefin |
| Barrier 1 | EVOH, Retortable EVOH, Amorphous Nylon, MXD6, MXD6/MXDI, and nanocomposite barrier materials |

The resulting extrusion-coated tape is wound up onto a reel, transported to a location for solid state orientation, and then unwound and biaxially oriented in substantially the same manner described in Example 69. The resulting retortable, heat-shrinkable multilayer film is then annealed substantially as described in Example 69.

Example 72

The retortable film of Example 72 is prepared using an extrusion-coating process as described in Example 71, above. As shown in the table below, the film of Example 72 also has a total of 8 layers, with the first 4 layers being the substrate layers, and the fifth through eighth layers being the coating layers.

| Layer Arrangement, Composition, and Thickness of Film of Example 72 | | | | | | | |
| --- | --- | --- | --- | --- | --- | --- | --- |
| substrate Sealant | substrate Tie | Substrate Core | Substrate Tie | coating Barrier | coating Tie | coating Core | coating Outer |
| High melt point polymer | Tie 2 | Nylon 1 + crystalline interrupter | Tie 2 | Barrier 1 | Tie 3 | Bulk 1 | High melt point polymer |
| 3 mils | 1 mil | 12 mils | 1 mil | 2 mils | 1 mil | 2 mils | 1 mil |

The annular die, air shoe, cooling air, water ring, cooling water, hot bath, immersion time, and annealing apparatus and conditions were all carried out asset forth in Example 71, above. The identity of the various resins in the film of Example 72 is the same as in the table above in Example 71. The only additional resin, i.e., the semi-crystalline interrupter, is the same as the semi-crystalline interrupter in Example 70, above. Otherwise, the process used to produce the film of Example 72 is as described in Example 71, above.

Example 73

A coextruded multilayer heat-shrinkable retortable film was produced utilizing the apparatus and process set forth in FIGS. 1, 2, and 3, described above. The multilayer film had a total of 7 layers, in the following order, with the thickness of each layer of the tape (i.e., prior to solid state orientation) indicated below the layer identity and resin composition identification:

| Layer Arrangement, Composition, and Thickness of Film of Example 73 | | | | | | |
| --- | --- | --- | --- | --- | --- | --- |
| Sealant MDPE 1 | Tie Tie 4 | Core Nylon 2 | Barrier EVOH 1 | Core Nylon 2 | Tie Tie 4 | Outer MDPE 1 |
| 1.5 mils | 1 mil | 3.25 mils | 1 mil | 3.25 mils | 1 mil | 1.5 mils |

The identity of the various resins in the film of Example 73 was as follows:

| Resin code | Resin Identity |
| --- | --- |
| MDPE1 | Dow Dowlex ® 2037 0.935 D |
| Tie 4 | Equistar Plexar ® PX3227 |
| Nylon 2 | BASF Ultramid ® B40 |
| EVOH 1 | EVAL LC-E105A |

The 7-layer extrudate (i.e., tape) was coextruded (i.e., downward cast) from an annular die (diameter of 5 inches) over an air shoe that provided the emerging melt stream with the needed support to minimize gauge band variation in the resulting tape. The air shoe had an outside diameter of 4.25 inches and a length of 13 inches, and emitted cool air (15.6° C.) through 0.030 inch diameter holes spaced over the outer cylindrical surface of the air shoe, the holes being spaced apart by a distance of 0.5625 inch, with the holes being arranged so that each hole inside the matrix of holes were surrounded by 6 holes. The airflow through the holes supported the film (so that it did not collapse due to impingement of a flow of cool water thereon, as described below) and cooled the film from the inside out, i.e., to assist in "freezing" the nylon quickly to minimize crystallization of the nylon. The pressure between the air shoe and the inside surface of the tape was slightly above atmospheric pressure (i.e., about 1.03 atmosphere). The cool air was pumped into the hollow air shoe and out the small holes terminating the passageways leading from the internal chamber within the air shoe to the outer surface thereof. The cool air flowed downward in the small gap (about 0.005 inch) between the tape and the outer surface of the air shoe, the cool air then passing into and upwardly through the centrally located pipe, after which the air passed out of the upper end of the pipe and into the environment.

Although the air shoe assisted in freezing the polyamide to minimize crystallization thereof, most of the heat in the extrudate emerging from the die was removed by a stream of cool water emitted from a water ring positioned approximately 2 inches downstream of the annular die. The water ring emitted a stream of cool water (about 7.2° C.) against the outer surface of the extrudate to produce sudden freezing (i.e., quenching) of the polymers in the various film layers. The sudden quenching was employed particularly for the purpose of quickly quenching (and thereby minimize the crystallization) of the semi-crystalline polyamide in each of the two core layers identified in the table above. The water ring was sized so that its inside surface was from 1-2 inches from the extrudate. The water ring was positioned so that the annular stream of cool water it emitted contacted the extrudate about 2 inches downstream of the point at which the extrudate emerged from the annular die. The water was emitted from the water ring as a stream in an initially horizontal direction, with the stream arcing downward slightly before making contact with the extrudate. This very rapid quenching process, coupled with a minimization of dwell time in a hot water bath before orientation and the relatively low temperature of the hot bath (described below), the positioning and emission of the cool air from an air ring (also described below), all assist in orienting the extrudate in a manner resulting in the heat-shrinkability, and other properties, set forth below.

Beneath the die, the quenched tape was collapsed into lay-flat configuration and wound up onto a reel. The reel of quenched tape in lay-flat configuration was then transported to a location for solid-state orientation. The tape was then unwound and forwarded to a bath containing hot water at a temperature of 71° C. The tape was continuously forwarded through the bath with a residence time of about 2 seconds of immersion in the hot water, following which the resulting heated tape was immediately forwarded through a first set of nip rollers followed by a second set of nip rollers, with the distance between the first and second sets of nip rollers being about 6 feet. The tape was biaxially-oriented between the upper and lower sets of nip rollers by passing the tape around a trapped bubble of air. Biaxial orientation was produced by both (a) inflating the tape with the trapped bubble of air between the sets of nip rollers, and (b) running the first set of nip rollers at a surface speed of 15 meters per minute, and running the second set of nip rollers at a surface speed of 42 meters per minute. The result was about 2.8× orientation in the transverse direction and about 2.8× orientation in the machine direction, for a total biaxial orientation of about 7.8×. The resulting retortable, annular, heat-shrinkable, coextruded film was not annealed.

The resulting retortable, heat-shrinkable, coextruded film exhibited a high total free shrink at 185° F., a high abrasion resistance, a high puncture strength, and was able to withstand retort conditions of 250° F. for 90 minutes. At this condition a total shrink of 51% was experienced. The table below provides the gauge and free shrink of the retortable, heat-shrinkable film of Example 73.

| Film of Example No. | Film Gauge (mils) | % free shrink at 185° F. (L + T) |
|---|---|---|
| 70 | 2.1 | 26 + 25 |

Examples 74-78

Examples 74-78 were five additional heat-shrinkable, retortable films produced utilizing the apparatus and process set forth in FIGS. 1, 2, and 3, described above, i.e., as set forth in Example 70, above. Each of the films of Examples 74-78 had a total of 7 layers, in the following order, with the percent thickness of each layer of the tape and film being indicated at the bottom of the layer composition description.

| | Layer Arrangement, Composition, and Thickness of Films of Examples 74-78 | | | | | | |
|---|---|---|---|---|---|---|---|
| | Outer layer | Tie layer | Bulk layer | Barrier layer | Bulk layer | Tie layer | Outer layer |
| Example 71 | MDPE 1 | Tie 4 | 90% Nylon 1 10% Amorphous Nylon | Amorphous Nylon | 90% Nylon 1 10% Amorphous Nylon | Tie 4 | MDPE 1 |
| % of film | 12 | 8 | 26 | 8 | 26 | 8 | 12 |
| Example 72 | 65% MDPE 30% HDPE 5% Slip 1 | Tie 4 | 90% Nylon 1 10% Amorphous Nylon | Amorphous Nylon | 90% Nylon 1 10% Amorphous Nylon | Tie 4 | 65% MDPE 30% HDPE 5% slip |

-continued

Layer Arrangement, Composition, and Thickness of Films of Examples 74-78

|  | Outer layer | Tie layer | Bulk layer | Barrier layer | Bulk layer | Tie layer | Outer layer |
|---|---|---|---|---|---|---|---|
| % of film | 12 | 8 | 26 | 8 | 26 | 8 | 12 |
| Example 73 | LLDPE 1 | Tie 4 | 90% Nylon 1 10% Amorphous Nylon | Amorphous Nylon | 90% Nylon 1 10% Amorphous Nylon | Tie 4 | LLDPE 1 |
| % of film | 12 | 8 | 26 | 8 | 26 | 8 | 12 |
| Example 74 | P-E Cop | Tie 4 | 90% Nylon 1 10% Amorphous Nylon | Amorphous Nylon | 90% Nylon 1 10% Amorphous Nylon | Tie 4 | P-E Cop |
| % of film | 12 | 8 | 26 | 8 | 26 | 8 | 12 |
| Example 75 | 50% P-E Copolymer 44% homo VLDPE 6% slip & antiblock | Tie 4 | 90% Nylon 1 10% Amorphous Nylon | Amorphous Nylon | 90% Nylon 1 10% Amorphous Nylon | Tie 4 | 50% P-E Copolymer 44% homo VLDPE 6% slip & antiblock |
| % of film | 012 | 8 | 26 | 8 | 26 | 8 | 12 |

The identity of the various resins in the films of Examples 74-78 are set forth in the table below. Resin codes set forth in the table above, but not identified in the resin identity table below, are as set forth in the resin identity table in Example 73.

| Resin code | Resin Identity |
|---|---|
| Amorphous Nylon | Selar ® PA 3426 amorphous nylon 1.19 g/cc (DuPont) |
| HDPE | Fortiflex ® T60-500-119 high density polyethylene; 0.961 g/cc, 6.0 g/10 min (Ineos) |
| Slip 1 | 10850 antiblock and slip in LLDPE; 0.95 g/cc; 1.8 g/10 min (Ampacet) |
| LLDPE 1 | Dowlex ® 2045.03 linear low density polyethylene; 0.92 g/cc, 1.1 g/10 min (Dow) |
| P-E Copolymer | ED 01-03 propylene-ethylene copolymer; 0.90 g/cc; 8 g/10 min; 134° C. mp (Total Petrochemicals) |
| Homo VLDPE | Single site catalyzed Exact ® 3128 ethylene/butene copolymer; 0.900 g/cc; 1.3 g/10 min (ExxonMobil) |
| Slip & Antiblock | 102804 antiblock and slip in HDPE; 1.02 g/cc, 7.1 g/10 min (Ampacet) |

The table below provides the thickness and total free shrink for the retortable, heat-shrinkable film of Examples 74-78:

| Film of Example No. | Film Gauge (mils) | % free shrink at 185° F. (L + T) |
|---|---|---|
| 71 | 2.9 | 27 + 37 |
| 72 | 2.7 | 28 + 32 |
| 73 | 3.4 | 35 + 43 |
| 74 | 2.8 | 20 + 27 |
| 75 | 2.9 | 20 + 24 |

Example 79

An extrusion-coated, heat-shrinkable retortable film was produced utilizing the apparatus and process set forth in FIG. 5, described above. The film had a total of 8 layers, in the following order, with the thickness of each layer of the tape (i.e., prior to solid state orientation) indicated below the layer identity and resin composition identification:

Layer Arrangement, Composition, and Thickness of Film of Example 79

| substrate Sealant | substrate Tie | substrate Core | substrate Tie | coating Barrier | coating Tie | coating Core | coating Outer |
|---|---|---|---|---|---|---|---|
| MDPE 2 3 mils | Tie 5 1 mil | Nylon 2 12 mils | Tie 5 1 mil | PVDC 2 mil | Tie 6 1 mil | Bulk 1 2 mils | MDPE 2 1 mil |

The identity of the various resins in the film of Example 79 was as follows:

| Resin code | Resin Identity |
|---|---|
| MDPE 2 | Dow Dowlex ® 2035 0.937 D |
| Tie 5 | Equistar Plexar ® PX1007 |
| Nylon 2 | BASF Ultramid ® B40 |
| Tie 6 | ExxonMobil Escorene ® LD761.36 |
| Bulk 1 | Exxon Mobile Exceed ® 1012 |
| PVDC | Dow Saran ® 806 |

The four-layer substrate extrudate was extruded (i.e., downward cast) from an annular die (diameter of 5 inches) over an air shoe that provided the emerging melt stream with the needed support to minimize gauge band variation in the resulting tape. The air shoe had an outside diameter of 4.25 inches and a length of 13 inches, and emitted cool air (15.6° C.) through 0.030 inch diameter holes spaced over the outer cylindrical surface of the air shoe, the holes being spaced apart by a distance of 0.563 inch, with the holes being arranged so that each hole inside the matrix of holes were surrounded by 6 holes. The airflow through the holes supported the film (so that it did not collapse due to impingement of a flow of cool water thereon, as described below) and cooled the film from the inside out, i.e., to assist in "freezing" the semi-crystalline polyamide quickly to minimize crystallization of the semi-crystalline polyamide. The pressure between the air shoe and the inside surface of the tape was slightly above atmospheric pressure (i.e., about 1.03 atmosphere). The cool air was pumped into the hollow air shoe and out the small holes terminating the passageways leading from the internal chamber within the air shoe to the outer surface thereof. The cool air flowed downward in the small gap (about 0.005 inch) between the tape and the outer surface of the air shoe, the cool air then passing into and upwardly through the centrally-located pipe, after which the air passed out of the upper end of the pipe and into the environment.

Although the air shoe assisted in freezing the semi-crystalline polyamide to minimize crystallization thereof, most of the heat in the extrudate emerging from the die was removed by a stream of cool water emitted from a water ring positioned approximately 2 inches downstream of the annular die. The water ring emitted a stream of cool water (about 7.2° C.) against the outer surface of the extrudate to produce sudden freezing (i.e., quenching) of the polymers in the various film layers. The sudden quenching was employed particularly for the purpose of quickly quenching (and thereby minimize the crystallization) the semi-crystalline polyamide in the core layer of the substrate, i.e., the core layer identified in the table above. The cool water contacted the extrudate at a distance of approximately 2 inches downstream of the annular die. This very rapid quenching process, coupled with a minimization of dwell time in a downstream hot water bath (described below), the positioning and emission of the cool air from an air ring (also described below), all assist in orienting the extrudate in a manner resulting in the heat-shrinkablility, and other properties, set forth below.

Beneath the die, the quenched substrate tape was collapsed into lay-flat configuration. The resulting irradiated annular tape, in lay-flat configuration, was directed through two sets of nip rollers having a trapped bubble of air therebetween, with the annular tape being reconfigured from lay-flat configuration to round configuration by being directed around the trapped bubble of air. See FIG. 5. The resulting round annular substrate was then directed through a vacuum chamber, immediately following which the round annular substrate was passed through an extrusion-coating die, which extruded a 4-layer coating stream onto and around the outside surface of the reconfigured annular substrate. The resulting 8-layer extrusion-coated tape was then forwarded through and cooled by an air ring, and then reconfigured back to lay-flat configuration by being forwarded through the second of the pairs of nip rollers, with the extrusion-coated tape then being wound up on a roll. Again, see FIG. 5.

The substrate tape was not significantly drawn (either longitudinally or transversely) as it was directed around the trapped bubble of air associated with the extrusion coating apparatus. The surface speed of the nip rollers downstream of the trapped bubble was about the same as the surface speed of the nip rollers upstream of the trapped bubble. Furthermore, the annular substrate tape was inflated only enough to provide a substantially circular tubing without significant transverse orientation, i.e., without transverse stretching. The extrusion coating was carried out in a manner in accordance with U.S. Pat. No. 4,278,738, to BRAX et. al., referred to above.

The roll of 8-layer, annular, extrusion-coated tape was transported to a location for solid-state orientation. The tape was then unwound and forwarded to a bath containing hot water at a temperature of 71° C. The tape was continuously forwarded through the bath with a residence time of about 2 seconds of immersion in the hot water, following which the resulting heated tape was immediately forwarded through a first set of nip rollers followed by a second set of nip rollers, with the distance between the first and second sets of nip rollers being about 6 feet. The tape was biaxially-oriented between the upper and lower sets of nip rollers by passing the tape around a trapped bubble of air. Biaxial orientation was produced by both (a) inflating the tape with the trapped bubble of air between the sets of nip rollers, and (b) running the first set of nip rollers at a surface speed of 15 meters per minute, and running the second set of nip rollers at a surface speed of 38 meters per minute. The result was about 2.5× orientation in the transverse direction and about 2.5× orientation in the machine direction, for a total biaxial orientation of about 6.25×. The resulting retortable, heat-shrinkable, extrusion-coated film exhibited a high total free shrink at 185° F., a high abrasion resistance, and a high puncture strength, and was able to withstand retort conditions of 250° F. for 90 minutes.

Examples 80-83

The films of Examples 80-83 were made in accordance with the process used to make the film of Example 1, except that the polymeric composition of the various layers were altered in accordance with the tables provided below. In addition, the absolute thicknesses and relative thicknesses of the various film layers varied as noted in the tables below. In the production of the film of Example 80, parameters employed were as set forth in Example 1, except as follows:

| | |
|---|---|
| Total Extrudate Thickness | 20 mils |
| Surface Speed of Nip Rollers Below Trapped Bubble | 30.4 m/min |
| Air shoe outside diameter: | 10.2 cm |
| Surface Speed of Nip Rollers Above Trapped Bubble | 77.1 m/min |
| orientation factor in transverse direction | 2.6 X |
| orientation factor in longitudinal direction | 2.8 X |
| Total Biaxial Orientation | 7.3 X |
| Total thickness of heat-shrinkable film | 2.5 mils |
| Hot Bath Temperature | 71.1° C. |

The film of Example 80 had a layer arrangement and polymeric composition set forth in the tables below.

Example 80

| Sealant | Barrier | Core | Outer |
|---|---|---|---|
| 98% Nylon 12 | 69% Nylon 1 | 89% Nylon 1 | 89% Nylon 1 |
| 1% STBL 1 | 30% Nylon 10 | 10% Nylon 10 | 10% Nylon 10 |
| 1% SLIP | 1% STBL 1 | 1% STBL 1 | 1% STBL 1 |
| 5 mils | 4 mils | 8 mils | 3 mils |

Moreover, unless noted otherwise, the parameters employed in the process of making the films of Example 80, as well as the films of Examples 81-83 were as set forth in Example 1, except as noted otherwise in the table below.

| Example No. | Total Extrudate Thickness (mils) | Air Shoe outside diameter (cm) | Surface speed of Nip below bubble (m/min) | Surface speed of nip above bubble (m/min) | Hot bath temp (° C.) |
|---|---|---|---|---|---|
| 81 | 15 | 10.2 | 24.5 | 16.2 | 72.8 |
| 82 | 20 | 10.2 | 23.9 | 19.3 | 79.4 |
| 83 | 20 | 10.2 | 22.9 | 24.5 | 71.1 |

| Example No. | Machine Direction Stretch Factor (X) | Transverse Direction Stretch Factor (X) | Total Biaxial Orientation Factor (X) | Total thickness of heat-shrinkable film (mils) | Total free shrink @ 185° F. |
|---|---|---|---|---|---|
| 81 | 2.65 | 2.8 | 7.4 | 2.5 | 61 |
| 82 | 2.8 | 2.6 | 7.3 | 2.6 | 63 |
| 83 | 3 | 2.6 | 7.8 | 2.6 | 75 |

The films of Examples 81-83 had a layer arrangements and polymeric compositions as set forth in the table below.

Example 81

| Sealant | Barrier | Core | Outer |
|---|---|---|---|
| 98% Nylon 12 | 69% Nylon 1 | 89% Nylon 1 | 89% Nylon 1 |
| 1% STBL 1 | 30% Nylon 19 | 10% Nylon 19 | 10% Nylon 19 |
| 1% SLIP | 1% STBL 1 | 1% STBL 1 | 1% STBL 1 |
| 3.75 mils | 3 mils | 6 mils | 2.25 mils |

Example 82

| Sealant | Barrier | Core | Outer |
|---|---|---|---|
| 98% Nylon 12 | 69% Nylon 1 | 89% Nylon 1 | 89% Nylon 1 |
| 1% STBL 1 | 30% Nylon 2 | 10% Nylon 2 | 10% Nylon 2 |
| 1% SLIP | 1% STBL 1 | 1% STBL 1 | 1% STBL 1 |
| 5 mils | 4 mils | 8 mils | 3 mils |

Example 83

| Sealant | Core | Core | Outer |
|---|---|---|---|
| 98% Nylon 12 | 89% Nylon 1 | 89% Nylon 1 | 89% Nylon 1 |
| 1% STBL 1 | 10% Nylon 2 | 10% Nylon 2 | 10% Nylon 2 |
| 1% SLIP | 1% STBL 1 | 1% STBL 1 | 1% STBL 1 |
| 5 mils | 4 mils | 8 mils | 3 mils |

Analyses were performed to determine the Transmission Absorbance $A_{1199}:A_{1170}$ Ratio for various examples set forth above, as well as for several polyamide-containing films of the prior art. The results are set forth in the table below.

Analyses were performed to determine the Transmission Absorbance $A_{1199}:A_{1170}$ Ratio for various examples set forth above, as well as for several polyamide-containing films of the prior art. The results are set forth in the table below.

FTIR Transmission Absorbance $A_{1199}:A_{1170}$ Ratio for Various Examples Above

| Example No | $A_{1199}$ | $A_{1170}$ | $A_{1199}:A_{1170}$ Ratio | Moisture Barrier Layer on each side of Polyamide Layer | Conditioned for 24 hrs | wt % polyamide $\geq 80\%$ (total film basis) |
|---|---|---|---|---|---|---|
| 3 | 13.911 | 10.79 | 1.29 | Yes | Yes | No |
| 4 | 21.294 | 14.913 | 1.43 | Yes | Yes | No |
| 6 | 23.891 | 14.484 | 1.65 | Yes | Yes | No |
| 8 | 23.681 | 16.896 | 1.40 | Yes | Yes | No |
| 9 | 23.901 | 17.266 | 1.38 | Yes | Yes | No |
| 10 | 25.895 | 17.961 | 1.44 | Yes | Yes | No |
| 13 | 28.496 | 17.499 | 1.63 | Yes | Yes | No |
| 14 | 29.921 | 18.966 | 1.58 | Yes | Yes | No |
| 15 | 20.531 | 14.429 | 1.42 | Yes | Yes | No |
| 20 | 22.402 | 21.062 | 1.06 | Yes | Yes | No |
| 30 | 25.047 | 16.805 | 1.49 | Yes | Yes | No |
| 31 | 25.192 | 16.111 | 1.56 | Yes | Yes | No |
| 37 | 24.318 | 15.047 | 1.62 | Yes | Yes | No |
| 39 | 23.611 | 14.549 | 1.62 | Yes | Yes | No |
| 40 | 22.107 | 15.399 | 1.44 | Yes | Yes | No |
| 42 | 11.34 | 14.179 | 0.80 | Yes | Yes | No |
| 44 | 24.441 | 21.61 | 1.13 | Yes | Yes | No |
| 45 | 24.923 | 20.982 | 1.19 | Yes | Yes | No |
| 46 | 18.193 | 16.685 | 1.09 | Yes | Yes | No |
| 47 | 20.915 | 20.084 | 1.04 | Yes | Yes | No |
| 48 | 19.951 | 15.553 | 1.28 | Yes | Yes | No |
| 50 | 16.752 | 22.875 | 0.73 | Yes | Yes | No |
| 52 | 19.692 | 18.157 | 1.08 | Yes | Yes | No |
| 54 | 21.961 | 22.91 | 0.96 | Yes | Yes | No |
| 57 | 16.149 | 13.691 | 1.18 | Yes | Yes | No |
| Pechiney Film #1 | 30.16 | 13.456 | 2.24 | Yes | Yes | No |
| Pechiney Film #2 | 18.465 | 10.709 | 1.72 | Yes | Yes | No |
| Pechiney Film #3 | 20.165 | 11.849 | 1.70 | Yes | Yes | No |
| CMS Film #1 | 4.718 | 5.98 | 0.79 | Yes | Yes | No |
| CMS Film #2 | 2.389 | 3.535 | 0.68 | Yes | Yes | No |
| Kureha Film | 2.536 | 2.16 | 1.17 | Yes | Yes | No |
| Curwood Film | 2.819 | 2.106 | 1.34 | Yes | Yes | No |
| Vector Film | 21.084 | 7.811 | 2.70 | No | No | Yes |
| 62 | 14.508 | 9.666 | 1.50 | No | No | Yes |
| 63 | 15.198 | 11.593 | 1.31 | No | No | Yes |
| 64 | 14.526 | 13.489 | 1.08 | No | No | Yes |
| 65 | 13.605 | 13.180 | 1.03 | No | No | Yes |
| 66 | 13.253 | 14.492 | 0.91 | No | No | Yes |
| 67 | 16.265 | 14.372 | 1.13 | No | No | Yes |
| 68 | 17.098 | 14.560 | 1.17 | No | No | Yes |
| 80 | 30.308 | 19.440 | 1.56 | No | No | Yes |
| 81 | 22.085 | 16.669 | 1.32 | No | No | Yes |
| 82 | 35.572 | 23.893 | 1.49 | No | No | Yes |
| 83 | 32.503 | 22.341 | 1.45 | No | No | Yes |
| M&Q Film | 11.838 | 16.669 | 2.41 | No | No | Yes |

As can be seen from the table above, the films of Examples 3, 4, 6, 8, 9, 10, 13, 14, 15, 20, 30, 31, 37, 39, 40, 42, 44, 45, 46, 47, 48, 50, 52, 54, 57, 62, 63, 64, 65-68, and 80-83 all exhibited an FTIR transmission absorbance $A_{1199}/A_{1170}$ ratio of less than or equal to 1.65. The FTIR analysis was not performed on any the films of Examples 1, 2, 5, 7, 11, 12, 16-19, 21-29, 32-36, 38, 41, 43, 49, 51, 53, 55, 56, 58-61, and 69-79. As to Pechiney Films #1, #2, and #3, the Vector film, and the film from M&Q, these films were tested with a conventional FTIR analysis (i.e., non-microscopic FTIR), and each had an FTIR transmission absorbance $A_{1199}/A_{1170}$ ratio greater than 1.65.

As to the CMS#1 film, the CMS#2 film, the Kureha film, and the Curwood film, while each of these films exhibited an FTIR Transmission Absorbance $A_{1199}/A_{1170} \leq 1.65$, analysis revealed that none of these films contained a semi-crystalline polyamide in an amount of at least 35 percent, based on total film volume. The CMS#1 film contained 27 volume percent of a blend of nylon 6 and an amorphous polyamide, i.e., polyamide 6I6T; the amount of the blend that was nylon 6 was not determined. The CMS#2 film contained 30 volume percent of a blend of nylon 6 and an amorphous polyamide, i.e., polyamide 6I6T; the amount of nylon 6 was not determined. The Kureha film contained 31 volume percent of a blend of nylon 6 and nylon 6I6T; the amount of nylon 6 was not determined. The Curwood film contained 19% nylon 6.

What is claimed is:

1. A multilayer, heat-shrinkable film comprising a layer containing at least one semi-crystalline polyamide selected from the group consisting of polyamide 6, polyamide 66, polyamide 6/66, and polyamide 6/12, wherein upon conditioning the film at 120° F. and at least 80 percent relative humidity for 24 hours, the layer containing the at least one semi-crystalline polyamide exhibits an FTIR Transmission Absorbance Ratio:

$$\frac{A_{1199}}{A_{1170}} \leq 1.65,$$

wherein $A_{1199}$ is determined by integrating a peak area between 1223.6 cm$^{-1}$ and 1186.0 cm$^{-1}$ with a baseline made by connecting points on the curve at 1223.6 cm$^{-1}$ and 1186.0 cm$^{-1}$ with a straight line, and wherein $A_{1170}$ is determined by integrating a peak area between 1186.0 cm$^{-1}$ and 1152.5 cm$^{-1}$ with a baseline made by connecting points on the curve at 1186.0 cm$^{-1}$ and 1152.5 cm$^{-1}$ with a straight line, with the multilayer film comprising a total semi-crystalline polyamide content of at least 35 volume percent based on total film volume, the multilayer film having a total free shrink at 185° F. of at least 35 percent as measured using ASTM D-2732.

2. The multilayer, heat-shrinkable film according to claim 1, wherein the layer containing the at least one semi-crystalline polyamide exhibits an FTIR Transmission Absorbance Ratio:

$$\frac{A_{1199}}{A_{1170}} \leq 1.60.$$

3. The multilayer, heat-shrinkable film according to claim 1, wherein the layer containing the at least one semi-crystalline polyamide exhibits an FTIR Transmission Absorbance Ratio:

$$\frac{A_{1199}}{A_{1170}} \leq 1.50.$$

4. The multilayer, heat-shrinkable film according to claim 1, wherein the layer containing the at least one semi-crystalline polyamide exhibits an FTIR Transmission Absorbance Ratio:

$$\frac{A_{1199}}{A_{1170}} \leq 1.45.$$

5. The multilayer, heat-shrinkable film according to claim 1, wherein the film has been annealed.

6. The multilayer, heat-shrinkable film according to claim 1, wherein the film has a first layer that is an outer layer and that comprises polyolefin, and a second layer comprising the at least one semi-crystalline polyamide, with the first outer layer serving as a barrier to the transmission of atmospheric moisture therethrough.

7. The multilayer, heat-shrinkable film according to claim 6, further comprising a third layer that is a second outer film layer, the third layer comprising polyolefin, the third layer also serving as a barrier to the transmission of atmospheric moisture therethrough, so that the second layer has a moisture barrier layer on each side thereof.

8. The multilayer, heat-shrinkable film according to claim 1, wherein the total semi-crystalline polyamide content is at least 45 volume percent, based on total film volume.

9. The multilayer, heat-sealable film according to claim 1, wherein the film comprises:
   (A) a first layer, the first layer being an outer film layer which serves as a heat seal layer, the first layer comprising at least one member selected from the group consisting of (i) a polyolefin having a density of from 0.88 g/cm$^3$ to 0.917 g/cm$^{3'}$, and (ii) ionomer resin;
   (B) a second layer that is the layer comprising at least one semi-crystalline polyamide, with the at least one semi-crystalline polyamide making up at least 50 weight percent of the second layer, based on total layer weight;
   the multilayer, heat-shrinkable film exhibiting a percent haze as measured using ASTM D 1003-00, and a percent transparency as measured using ASTM D 1746-97, as follows:

% Transparency $\geq 5.33$(% Haze)$-31.5$.

10. The multilayer, heat-shrinkable film according to claim 9, wherein the film exhibits a haze of less than 7.5 percent, measured using ASTM D 1003-00.

11. The multilayer, heat-shrinkable film according to claim 10, wherein the film exhibits a transparency of at least 15 percent, measured using ASTM D 1746-97.

12. The multilayer, heat-shrinkable film according to claim 1, wherein the multilayer film comprises at least one semi-crystalline polyamide selected from the group consisting of polyamide 6/12 having a melting point of at least 125° C., polyamide 6, polyamide 66, polyamide 6/66, and the multilayer, heat-shrinkable film has a total semi-crystalline polyamide content of at least 35 volume percent based on total film volume wherein the semi-crystalline nylon is at least one member selected from the group consisting of polyamide 6/12 having a melting point of at least 125° C., polyamide 6, polyamide 66, polyamide 6/66.

13. The multilayer, heat-shrinkable film according to claim 12, wherein the film comprises at least one semi-crystalline polyamide selected from the group consisting of polyamide 6/12 having a melting point of at least 165° C., polyamide 6, polyamide 66, polyamide 6/66, and the multilayer, heat-shrinkable film has a total semi-crystalline polyamide content of at least 35 volume percent based on total film volume wherein the semi-crystalline nylon is at least one member selected from the group consisting of polyamide 6/12 having a melting point of at least 165° C., polyamide 6, polyamide 66, polyamide 6/66.

14. The multilayer, heat-shrinkable film according to claim 1, wherein the film comprises at least one semi-crystalline polyamide selected from the group consisting of polyamide 6, polyamide 66, and polyamide 6/66, and the multilayer, heat-shrinkable film has a total semi-crystalline polyamide content of at least 35 volume percent based on total film volume wherein the semi-crystalline nylon is at least one member selected from the group consisting of polyamide 6, polyamide 66, and polyamide 6/66.

15. The multilayer, heat-shrinkable film according to claim 1, wherein the total semi-crystalline polyamide content is at least 40 volume percent, based on total film volume.

16. The multilayer, heat-shrinkable film according to claim 9, wherein the film further comprises:
(A) a third layer that serves as a barrier layer, the third layer comprising at least one member selected from the group consisting of hydrolyzed ethylene/vinyl acetate copolymer, polyvinylidene chloride, amorphous polyamide, polyamide MXD6, polyester, and polyacrylonitrile; and
(B) a fourth layer that serves as a tie layer, the fourth layer being between the first layer and the third layer.

17. The multilayer, heat-shrinkable film according to claim 16, wherein the first layer is a first outer layer, the fourth layer is a first tie layer, and the second layer is directly adhered to the third layer, and the multilayer film further comprises a fifth layer that is a second outer layer a sixth layer that serves as a second tie layer, the sixth layer being between the fifth layer and third layer.

18. The multilayer, heat-shrinkable film according to claim 17, wherein the film has the following layer arrangement:
seal/first tie/polyamide/barrier/second tie/second outer
wherein the seal layer is the first layer, the first tie layer is the fourth layer, the polyamide layer is the second layer, the barrier layer is the third layer, the second tie layer is the sixth layer, and the outer layer is the fifth layer.

19. The multilayer, heat-shrinkable film according to claim 18, wherein the polyamide layer is a first polyamide layer, and the film further comprises a seventh layer that is a second polyamide layer, and the film has the following layer arrangement:
seal/first tie/first polyamide/barrier/second polyamide/second tie/second outer.

20. The multilayer, heat-shrinkable film according to claim 19 wherein the second outer layer comprises at least one member selected from the group consisting of ethylene/alpha-olefin copolymer, olefin homopolymer, propylene/ethylene copolymer, polyamide, polyester, ethylene/unsaturated ester copolymer, and ionomer resin.

21. The multilayer, heat-shrinkable film according to claim 19 wherein all of the film layers are arranged symmetrically with respect to the polymeric composition of each film layer.

22. The multilayer, heat-shrinkable film according to claim 19, wherein the first layer comprises at least one member selected from the group consisting of:

(a) heterogeneous ethylene/alpha-olefin copolymer having a density of from 0.900 g/cm$^3$ to 0.917 g/cm$^3$,
(b) homogeneous ethylene/alpha-olefin copolymer having a density of from 0.880 g/cm$^3$ to 0.917 g/cm$^3$, and
(c) ionomer resin.

23. The multilayer, heat-shrinkable film according to claim 1, wherein the film exhibits a gloss, as measured using ASTM D 2457-97, of from 60% to 100%.

24. The multilayer, heat-shrinkable film according to claim 1, wherein the layer containing at least one semi-crystalline polyamide comprises a blend of a primary component present and a secondary component, the primary component making up from 60 to 99 weight percent of the blend and the secondary component making up from 1 to 40 weight percent of the blend, the secondary component comprising at least one member selected from the group consisting of polyamide 6/69, polyamide MXD6, polyamide MXDI, polyamide 66/610, amorphous polyamide, polyether block amide copolymer, polyester, EVOH, polystyrene, polyolefin, and ionomer resin.

25. The heat-shrinkable film according to claim 1, wherein the layer comprising the at least one semi-crystalline polyamide comprises polyamide 6.

26. The heat-shrinkable film according to claim 25, wherein the layer comprising the polyamide 6 further comprises amorphous polyamide.

27. A multilayer heat-shrinkable film having a total free shrink at 185° F. of at least 10 percent as measured using ASTM D-2732, the multilayer heat-shrinkable film having a total semi-crystalline polyamide content of at least 50 volume percent based on total film volume, and a total polyamide content of at least 80 volume percent based on total film volume, wherein the semi-crystalline polyamide is at least one member selected from the group consisting of polyamide 6, polyamide 66, polyamide 6/66, and polyamide 6/12, wherein the film exhibits an FTIR Transmission Absorbance Ratio:

$$\frac{A_{1199}}{A_{1170}} \leq 1.65,$$

and wherein $A_{1199}$ is determined by integrating a peak area between 1223.6 cm$^{-1}$ and 1186.0 cm$^{-1}$ with a baseline made by connecting points on the curve at 1223.6 cm$^{-1}$ and 1186.0 cm$^{-1}$ with a straight line, and wherein $A_{1170}$ is determined by integrating a peak area between 1186.0 cm$^{-1}$ and 1152.5 cm$^{-1}$ with a baseline made by connecting points on the curve at 1186.0 cm$^{-1}$ and 1152.5 cm$^{-1}$ with a straight line.

28. The multilayer, heat-shrinkable film according to claim 27, wherein the film exhibits a total free shrink, at 185° F., of at least 35 percent.

29. The multilayer heat-shrinkable film according to claim 27, comprising:
(A) a first layer that is a heat-seal layer, the first layer comprising a blend of the semi-crystalline polyamide and at least one member selected from the group consisting of amorphous polyamide, ethylene/vinyl alcohol copolymer, polyamide MXD6, and ionomer resin; and
(B) a second layer comprising a polyamide having a melting point greater than 210° C.

30. The multilayer, heat-shrinkable film according to claim 27, wherein at least one film layer comprises a blend of (i) the semi-crystalline polyamide and (ii) at least one member selected from the group consisting of amorphous polyamide, ethylene/vinyl alcohol copolymer, polyamide MXD6, and ionomer resin.

31. The multilayer heat-shrinkable film according to claim 27, comprising:
   (A) a first layer that is a heat-seal layer, the first layer comprising a polyamide having a melting point of up to 210° C.; and
   (B) a second layer comprising a polyamide having a melting point greater than 210° C.

32. The multilayer, heat-shrinkable film according to claim 31, wherein the first layer further comprises amorphous polyamide.

33. The multilayer, heat-shrinkable film according to claim 31, wherein the first layer and/or the second layer comprises at least one member selected from the group consisting of ethylene/vinyl alcohol copolymer, polyamide MXD6, and amorphous polyamide, and ionomer resin.

34. The multilayer, heat-shrinkable film according to claim 31, further comprising a third layer that comprises at one member selected from the group consisting of ethylene/vinyl alcohol copolymer, polyamide MXD6, and amorphous polyamide.

35. The multilayer, heat-shrinkable film according to claim 31, wherein the first layer further comprises a blend of at one member selected from the group consisting of ethylene/vinyl alcohol copolymer, and polyamide MXD6.

* * * * *